US008599456B2

(12) United States Patent
Hirayama et al.

(10) Patent No.: US 8,599,456 B2
(45) Date of Patent: Dec. 3, 2013

(54) IMAGE PROCESSING APPARATUS, IMAGE FORMING APPARATUS, IMAGE PROCESSING METHOD, AND COMPUTER-READABLE RECORDING MEDIUM ON WHICH IMAGE PROCESSING PROGRAM IS RECORDED

(75) Inventors: Yasutaka Hirayama, Osaka (JP); Makio Gotoh, Osaka (JP); Masanori Minami, Osaka (JP); Masakazu Ohira, Osaka (JP); Takafumi Hosogi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 502 days.

(21) Appl. No.: 12/917,166

(22) Filed: Nov. 1, 2010

(65) Prior Publication Data

US 2011/0102869 A1    May 5, 2011

(30) Foreign Application Priority Data

Oct. 30, 2009  (JP) .............................. P2009-251482
Oct. 30, 2009  (JP) .............................. P2009-251484

(51) Int. Cl.
*G03F 3/08*         (2006.01)
*H04N 1/60*         (2006.01)
*H04N 1/40*         (2006.01)
*G06K 9/00*         (2006.01)

(52) U.S. Cl.
USPC ............ 358/520; 358/1.9; 358/3.22; 382/162

(58) Field of Classification Search
USPC ................ 358/1.9, 520, 518, 515, 500, 3.22; 382/162, 167
See application file for complete search history.

(56) References Cited

U.S. PATENT DOCUMENTS

| | | | |
|---|---|---|---|
| 5,680,230 A | | 10/1997 | Kaburagi et al. |
| 5,729,362 A | * | 3/1998 | Deishi et al. .................. 358/520 |
| 5,754,697 A | * | 5/1998 | Fu et al. ........................ 382/232 |
| 5,930,009 A | * | 7/1999 | Sato et al. ..................... 358/518 |
| 6,268,939 B1 | * | 7/2001 | Klassen et al. ................ 358/518 |
| 6,995,865 B1 | * | 2/2006 | Motomura ..................... 358/1.9 |
| 7,006,686 B2 | * | 2/2006 | Hunter et al. ................. 382/162 |
| 7,016,077 B2 | * | 3/2006 | Semba et al. .................. 358/1.9 |

(Continued)

FOREIGN PATENT DOCUMENTS

| | | |
|---|---|---|
| CN | 101166225 A | 4/2008 |
| CN | 101272445 A | 9/2008 |

(Continued)

*Primary Examiner* — Madelein A Nguyen
(74) *Attorney, Agent, or Firm* — Birch, Stewart, Kolasch & Birch, LLP

(57) ABSTRACT

A two color process section included in the image processing apparatus includes a luminance and chroma calculation section, an image-data determination section, and an output-color generation section. The luminance and chroma calculation section calculates a luminance value and a chroma value based on input image data. The image-data determination section determines the input image data, the chroma value of which is equal to or greater than a predetermined threshold, as first input image data constituting a chromatic color in a two-color image and determines the input image data, the chroma value of which is less than the threshold, as second input image data constituting an achromatic color in the two-color image. The output-color generation section generates image data of CMY from the first input image data based on the chroma value and the luminance value and generates image data of CMY from the second input image data based on the luminance value.

11 Claims, 35 Drawing Sheets

(56) References Cited

U.S. PATENT DOCUMENTS

| | | | |
|---|---|---|---|
| 7,177,465 B1* | 2/2007 | Takahira | 382/166 |
| 7,522,308 B2* | 4/2009 | Ueda | 358/1.9 |
| 7,529,006 B2* | 5/2009 | Itagaki et al. | 358/519 |
| 2002/0136447 A1* | 9/2002 | Link et al. | 382/163 |
| 2003/0007687 A1* | 1/2003 | Nesterov et al. | 382/167 |
| 2005/0243353 A1* | 11/2005 | Kawai et al. | 358/1.9 |
| 2006/0082832 A1* | 4/2006 | Shoda et al. | 358/3.26 |
| 2006/0082846 A1* | 4/2006 | Sakakibara et al. | 358/518 |
| 2006/0152765 A1 | 7/2006 | Adachi | |
| 2006/0165285 A1 | 7/2006 | Adachi | |
| 2007/0041627 A1* | 2/2007 | Douglass | 382/133 |
| 2007/0257944 A1* | 11/2007 | Miller et al. | 345/694 |
| 2007/0285685 A1* | 12/2007 | Hirayama | 358/1.9 |
| 2008/0043260 A1* | 2/2008 | Ramanath et al. | 358/1.9 |
| 2008/0055677 A1* | 3/2008 | Minamino | 358/514 |
| 2008/0055682 A1* | 3/2008 | Minamino | 358/520 |
| 2008/0094517 A1 | 4/2008 | Takeuchi et al. | |
| 2008/0181491 A1* | 7/2008 | Bala et al. | 382/162 |
| 2008/0231921 A1 | 9/2008 | Dokuni | |
| 2008/0298688 A1* | 12/2008 | Cheong et al. | 382/224 |
| 2009/0028426 A1* | 1/2009 | Maki | 382/164 |
| 2010/0053697 A1* | 3/2010 | Kubota | 358/449 |
| 2010/0098333 A1* | 4/2010 | Aoyagi | 382/166 |
| 2010/0103438 A1* | 4/2010 | Hauf et al. | 358/1.9 |
| 2010/0202000 A1* | 8/2010 | Gotoh | 358/1.9 |
| 2010/0277770 A1* | 11/2010 | Yao | 358/3.06 |
| 2011/0102867 A1* | 5/2011 | Ohira et al. | 358/504 |

FOREIGN PATENT DOCUMENTS

| | | |
|---|---|---|
| JP | 5-48894 A | 2/1993 |
| JP | 5-68166 | 3/1993 |
| JP | 8-84268 A | 3/1996 |
| JP | 2002-232708 A | 8/2002 |
| JP | 2004-320447 A | 11/2004 |
| JP | 2004-328292 A | 11/2004 |
| JP | 2006-197037 A | 7/2006 |
| JP | 2006-203703 A | 8/2006 |
| JP | 2007-228115 A | 9/2007 |
| JP | 2008-67068 A | 3/2008 |

* cited by examiner

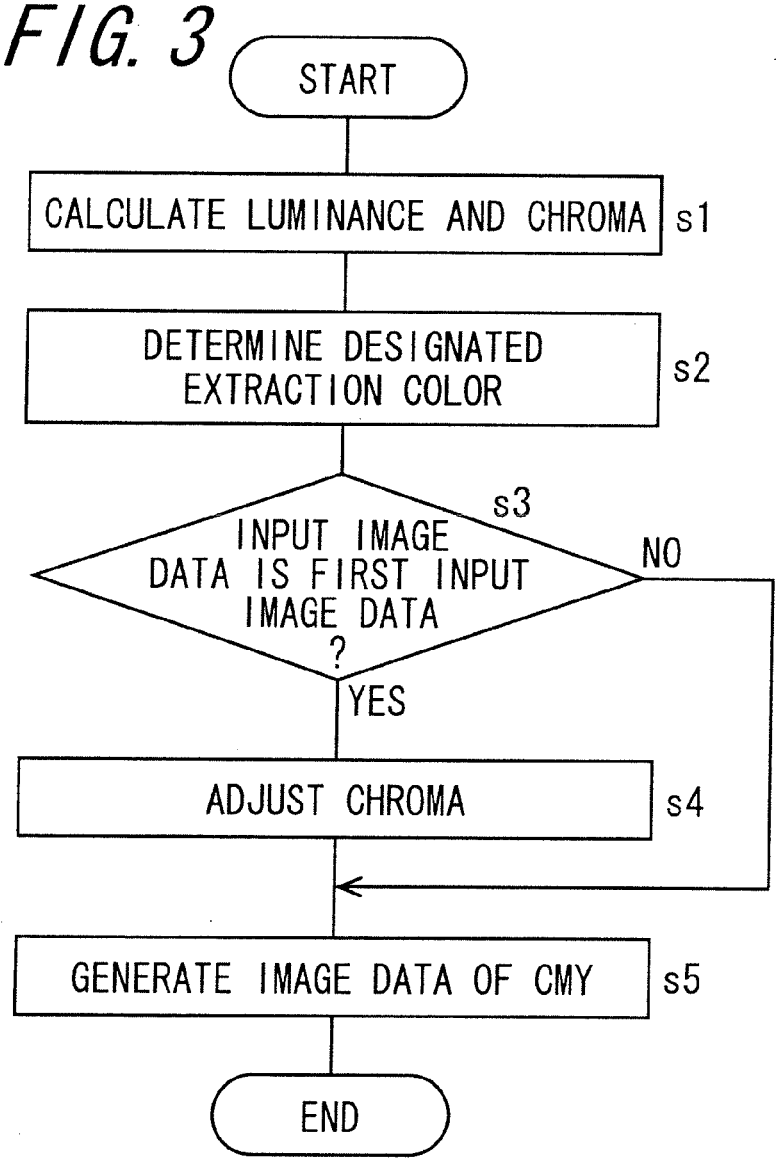

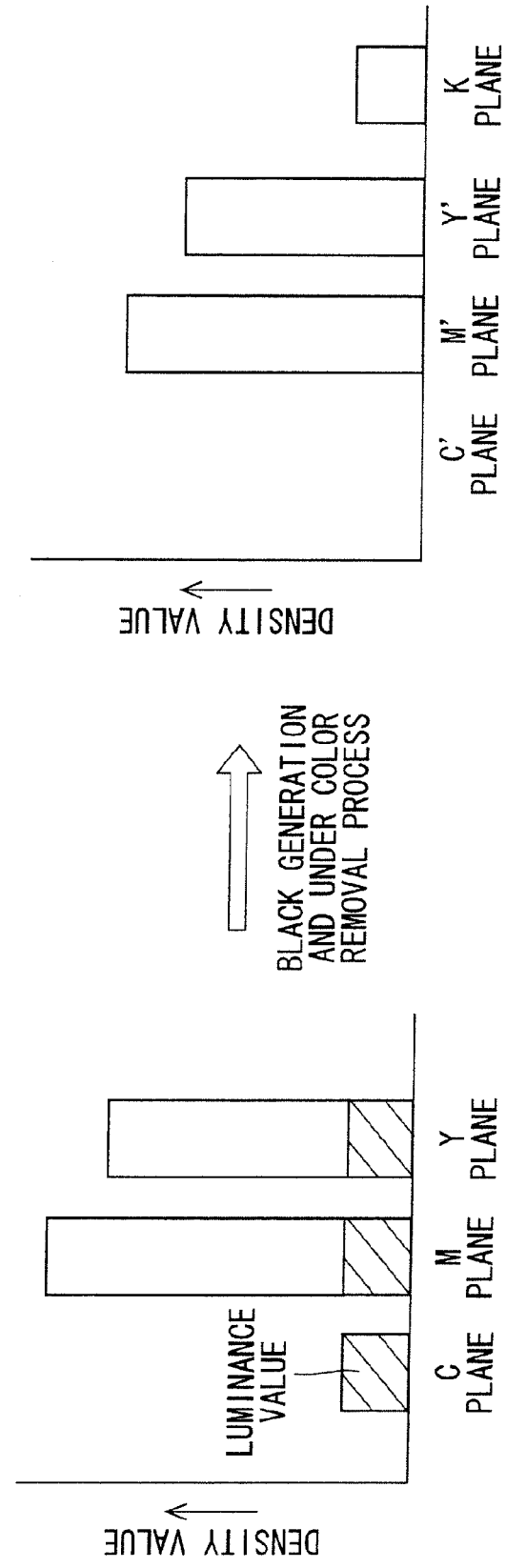

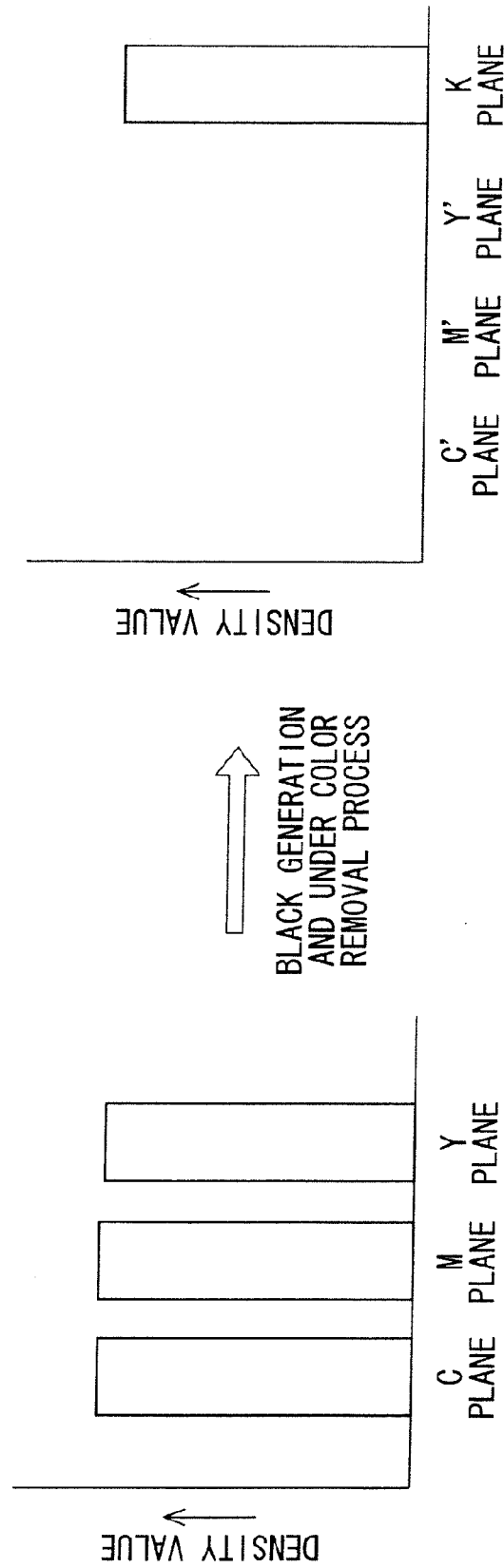

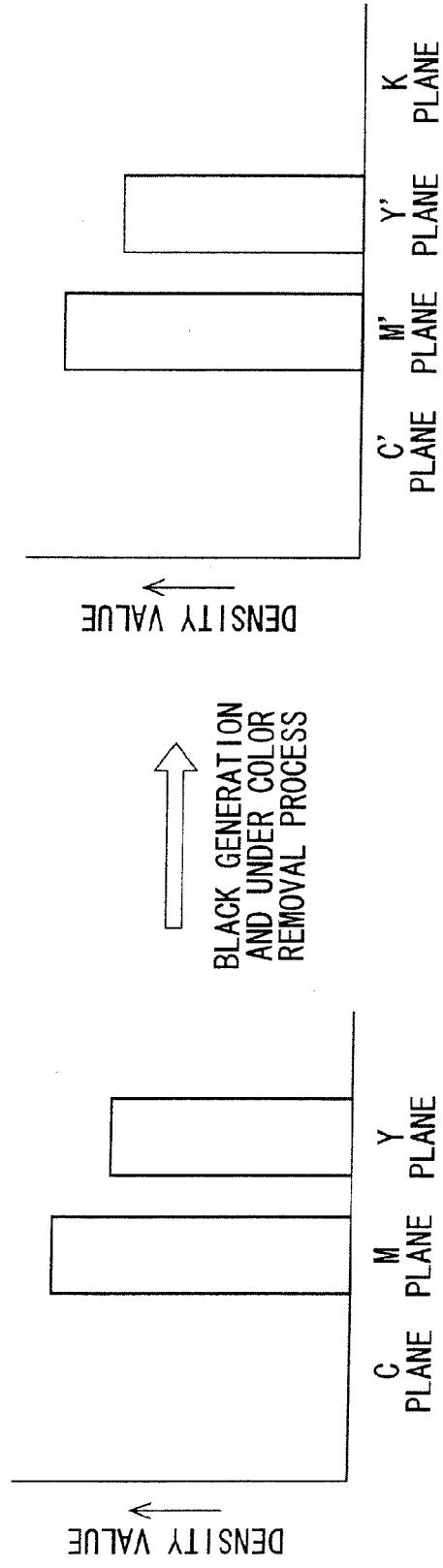

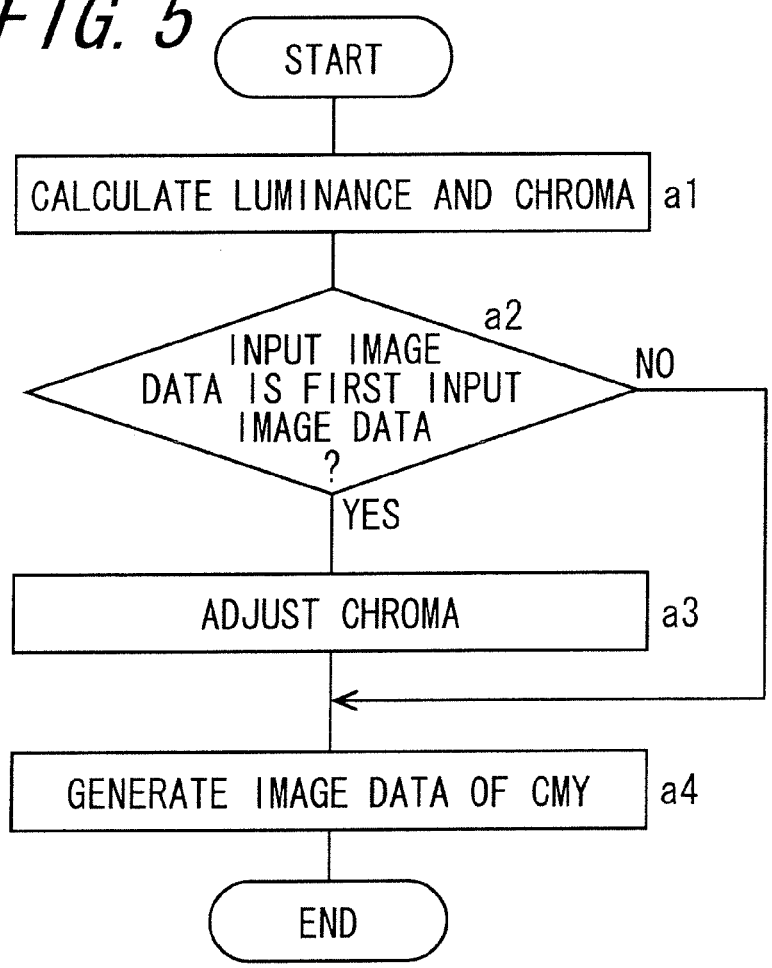

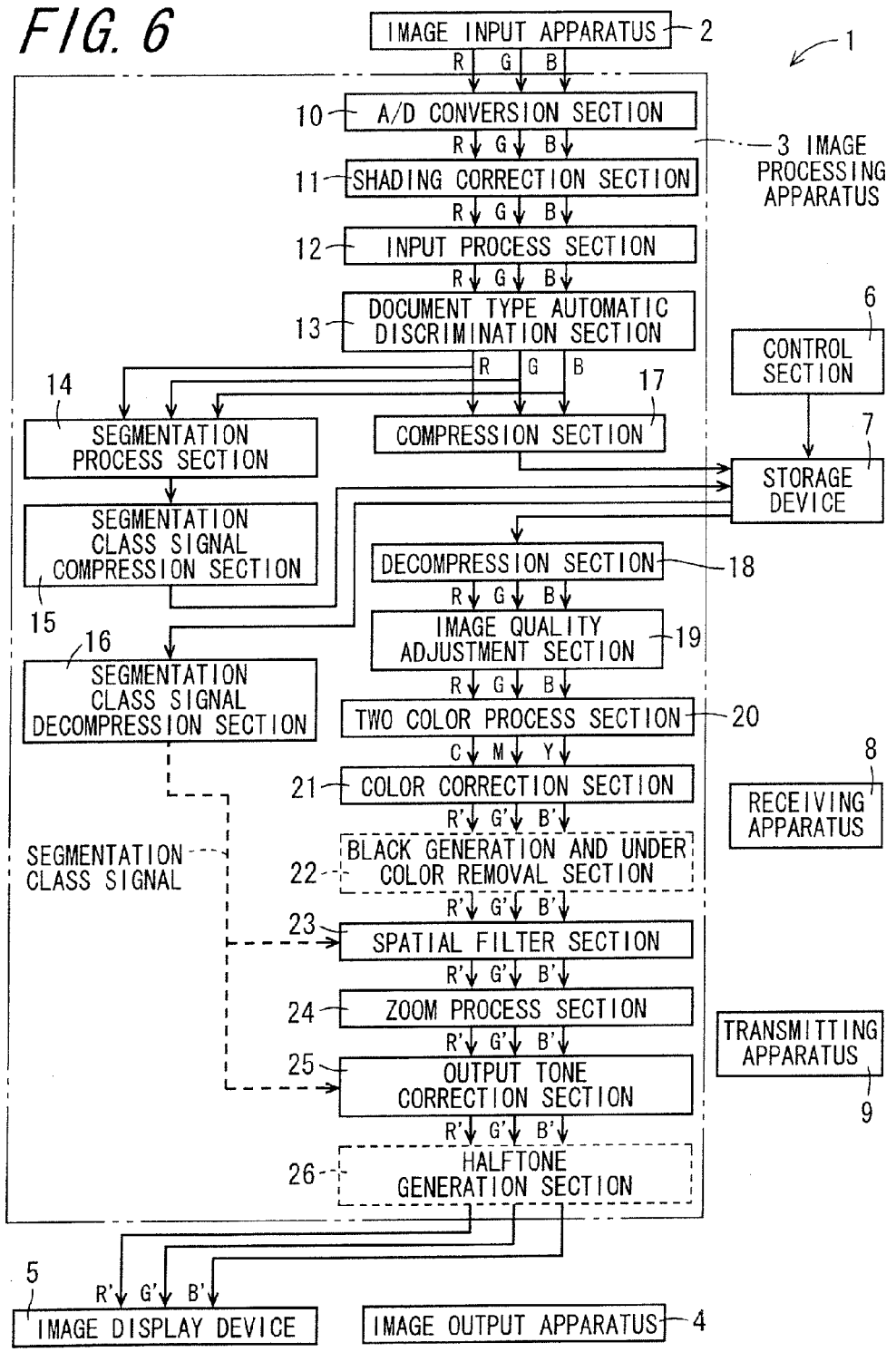

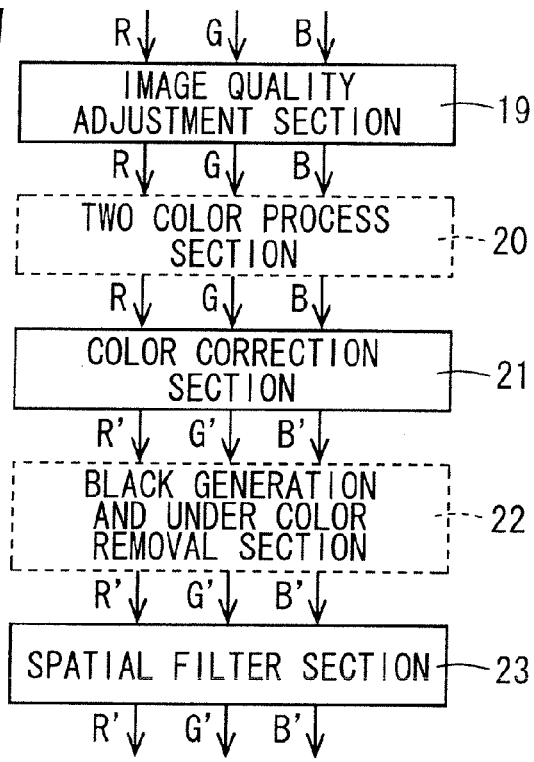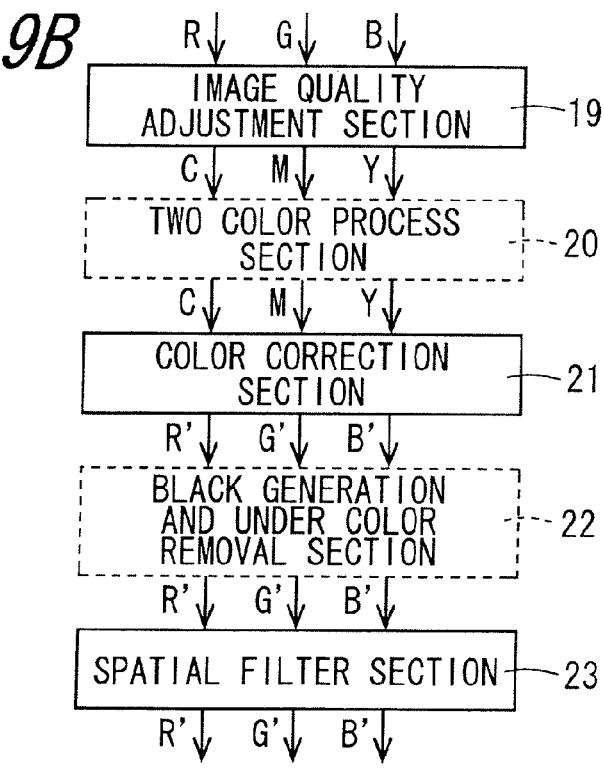

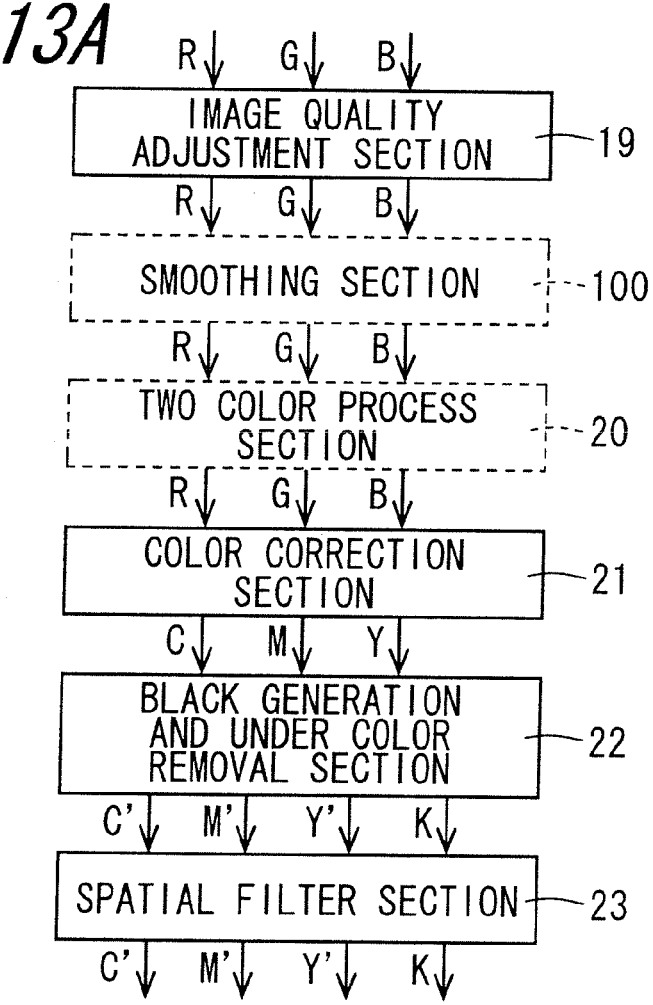

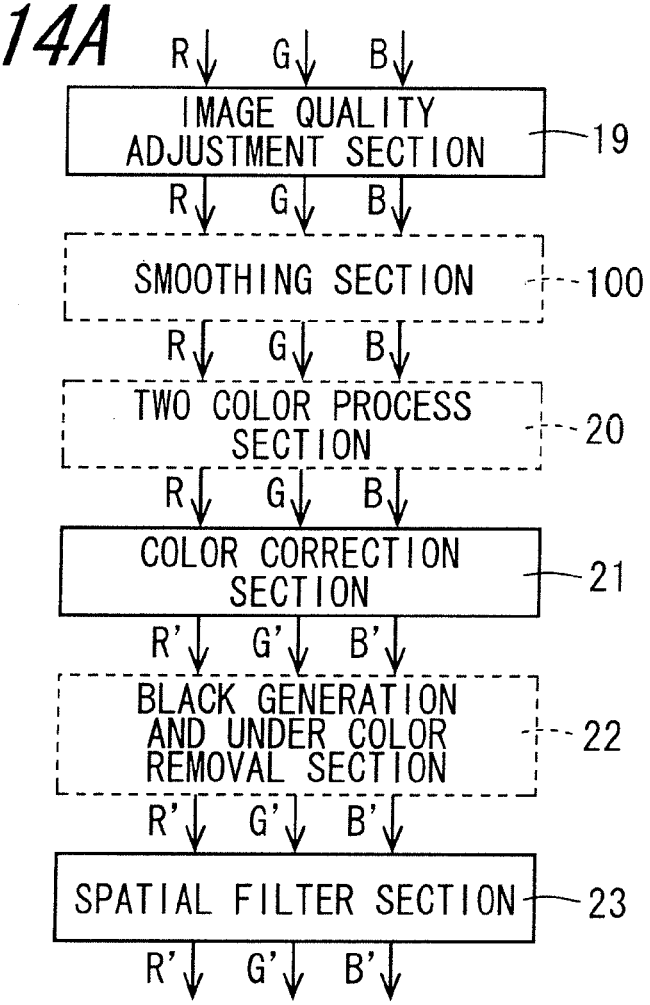

FIG. 15A ⟵F1

| 0 | 3 | 3 | 3 | 0 |
|---|---|---|---|---|
| 3 | 5 | 6 | 5 | 3 |
| 3 | 6 | 8 | 6 | 3 |
| 3 | 5 | 6 | 5 | 3 |
| 0 | 3 | 3 | 3 | 0 |

FIG. 15B ⟵F2

| 2 | 4 | 5 | 6 | 5 | 4 | 2 |
|---|---|---|---|---|---|---|
| 4 | 7 | 9 | 10 | 9 | 7 | 4 |
| 5 | 9 | 12 | 13 | 12 | 9 | 5 |
| 6 | 10 | 13 | 14 | 13 | 10 | 6 |
| 5 | 9 | 12 | 13 | 12 | 9 | 5 |
| 4 | 7 | 9 | 10 | 9 | 7 | 4 |
| 2 | 4 | 5 | 6 | 5 | 4 | 2 |

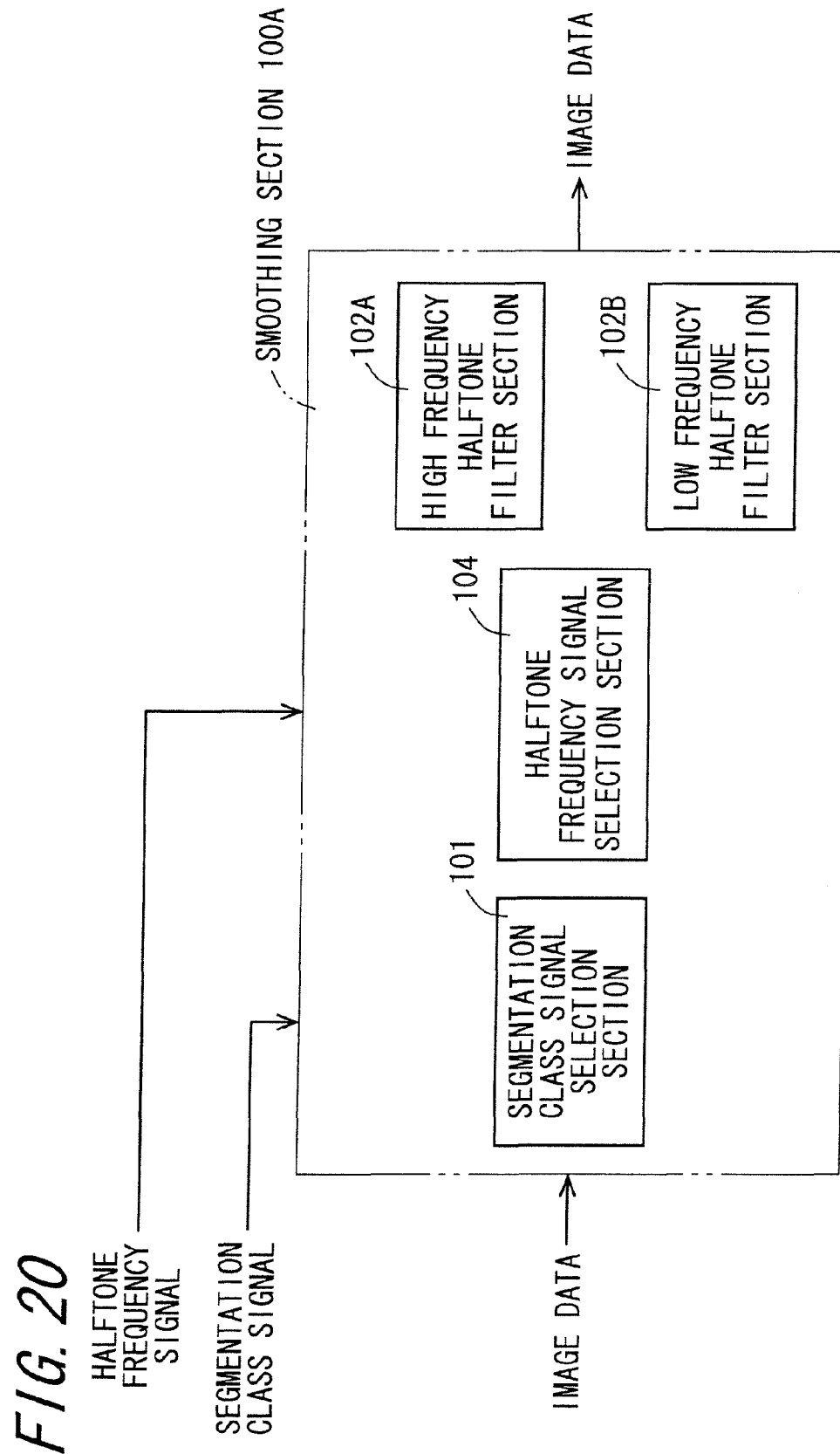

| 37952 | 1182 | 2389 | 1560 | 623 | 177 | 378 | 783 |
|---|---|---|---|---|---|---|---|
| 59 | 1773 | 3456 | 1252 | 886 | 555 | 547 | 447 |
| 735 | 2023 | 4129 | 1432 | 1053 | 670 | 565 | 589 |
| 1319 | 439 | 757 | 271 | 146 | 117 | 93 | 153 |
| 239 | 185 | 318 | 144 | 87 | 36 | 30 | 57 |
| 123 | 443 | 1005 | 312 | 324 | 98 | 171 | 151 |
| 332 | 125 | 217 | 132 | 56 | 74 | 34 | 56 |
| 295 | 108 | 128 | 52 | 54 | 38 | 41 | 28 |

| 35390 | 70 | 86 | 154 | 124 | 410 | 390 | 193 |
|---|---|---|---|---|---|---|---|
| 127 | 88 | 110 | 142 | 36 | 30 | 30 | 47 |
| 58 | 75 | 148 | 369 | 43 | 43 | 23 | 68 |
| 588 | 682 | 1401 | 4429 | 761 | 407 | 327 | 377 |
| 130 | 43 | 80 | 433 | 120 | 60 | 38 | 37 |
| 195 | 76 | 27 | 331 | 40 | 62 | 23 | 90 |
| 692 | 132 | 96 | 325 | 76 | 81 | 92 | 47 |
| 174 | 78 | 77 | 291 | 14 | 61 | 35 | 47 |

| 33687 | 47 | 70 | 126 | 264 | 142 | 207 | 310 |
|---|---|---|---|---|---|---|---|
| 47 | 35 | 56 | 38 | 321 | 50 | 55 | 53 |
| 15 | 53 | 3 | 204 | 385 | 30 | 82 | 65 |
| 36 | 59 | 95 | 202 | 697 | 152 | 146 | 49 |
| 26 | 140 | 242 | 819 | 3057 | 656 | 461 | 399 |
| 107 | 23 | 56 | 164 | 560 | 112 | 74 | 22 |
| 27 | 102 | 117 | 99 | 371 | 32 | 87 | 76 |
| 93 | 20 | 92 | 65 | 173 | 90 | 48 | 52 |

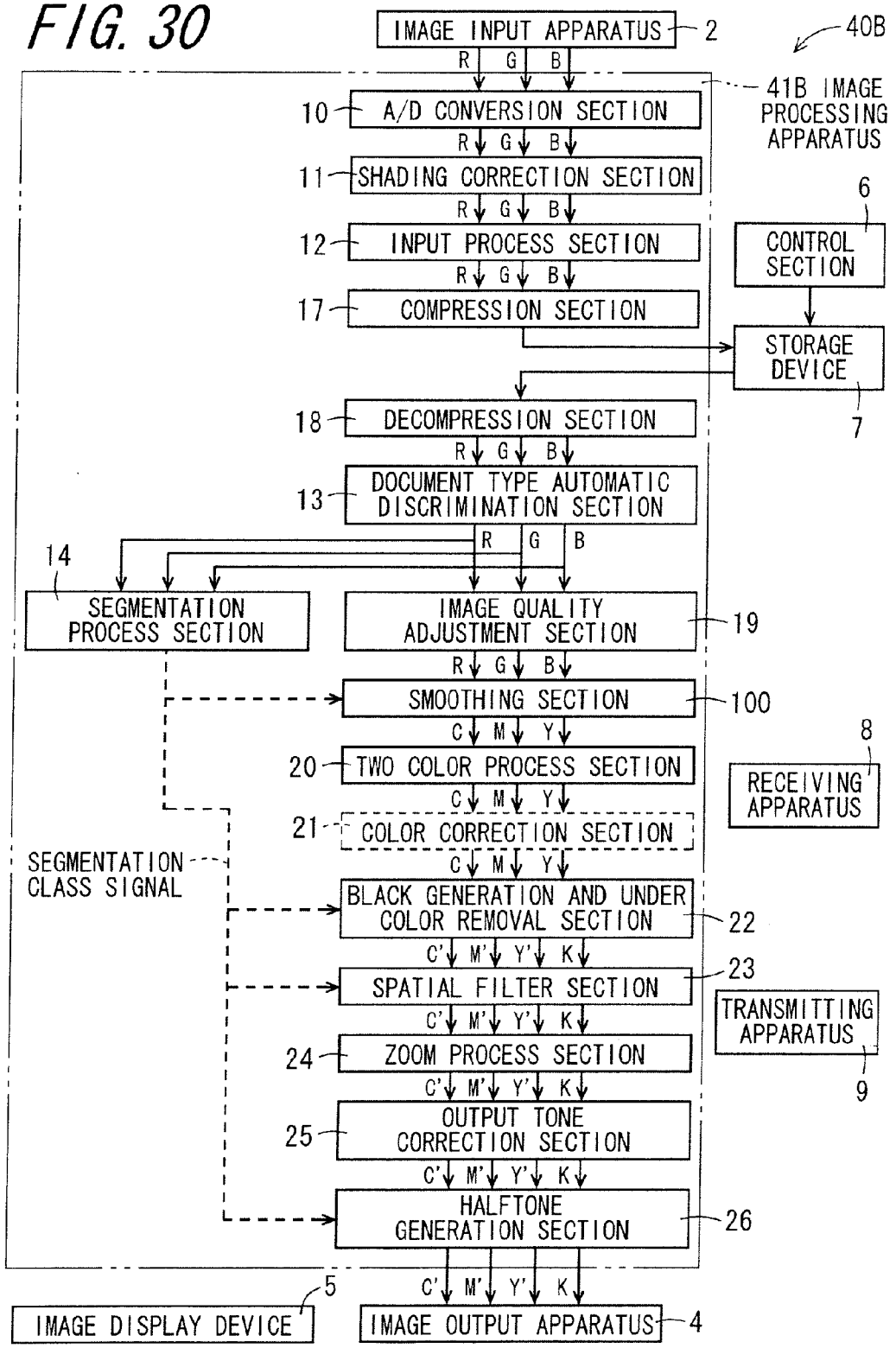

IMAGE PROCESSING APPARATUS, IMAGE FORMING APPARATUS, IMAGE PROCESSING METHOD, AND COMPUTER-READABLE RECORDING MEDIUM ON WHICH IMAGE PROCESSING PROGRAM IS RECORDED

CROSS-REFERENCE TO RELATED APPLICATION

This application claims priority to Japanese Patent Application No. 2009-251482, which was filed on Oct. 30, 2009, and No. 2009-251484, which was filed on Oct. 30, 2009, the contents of which are incorporated herein by reference in their entirety.

BACKGROUND OF THE INVENTION

1. Field of the Invention

The present invention relates to an image processing apparatus for processing an image, an image forming apparatus, an image processing method, and a computer-readable recording medium on which an image processing program is recorded.

2. Description of the Related Art

Among image forming apparatuses such as a digital color copying machine and a multifunction peripheral, some image forming apparatuses have a two-color mode for outputting a two-color image besides a full-color mode for outputting a full-color image and a monochrome mode for outputting a monochrome image.

In the two-color mode, the image forming apparatus outputs all chromatic colors in an original document or a chromatic color (e.g., red), which a user designates in advance by extracting the chromatic color from the original document, in the chromatic color (e.g., red) designated by the user in advance and outputs portions of other colors in the original document in an achromatic color (black). Consequently, the image forming apparatus can obtain, while reducing an amount of use of color materials to be smaller than that in the full-color mode, an output image having better color expression than that in the monochrome mode.

DESCRIPTION OF THE RELATED ART

An image processing apparatus that can output a two-color image is disclosed in Japanese Unexamined Patent Publication JP-A 2008-67068. The image processing apparatus disclosed in JP-A 2008-67068 includes a data processor that generates image data containing two-color pixels. At the time of generating two-color print image data containing red and black from input RGB (R: red, G: green, and B: blue) data, the data processor recognizes each pixel as one of red and black in the two-color print based on the density data of the input colors R, G, and B and calculates the density data of the recognized red and black based on calculation methods applied to red and black, respectively.

However, in the image processing apparatus disclosed in JP-A 2008-67068, since different image processes depending on red and black are performed on the input RGB data to generate output image data, a so-called tone gap, which is a problem in that a variation in color tone is visible in a boundary between a chromatic portion of red and an achromatic portion of black, occurs in the two-color output image containing red and black.

SUMMARY OF THE INVENTION

An object of the invention is to provide an image processing apparatus which can reduce a tone gap between a chromatic portion and an achromatic portion in a two-color image at the time of outputting the two-color image containing two colors which are a chromatic color and an achromatic color, as well as an image forming apparatus, an image processing method, and a recording medium on which an image processing program is recorded.

The invention provides an image processing apparatus comprising:

a two color process section that converts input image data of RGB inputted by reading an original document into image data of CMY used to output a two-color image containing two colors which are a chromatic color and an achromatic color, the two color process section including:

a luminance and chroma calculation section that calculates a luminance value and a chroma value based on the input image data of RGB;

an image-data determination section that determines the input image data, the chroma value of which is equal to or greater than a predetermined threshold, as first input image data constituting the chromatic color in the two-color image and determines the input image data, the chroma value of which is less than the threshold, as second input image data constituting the achromatic color in the two-color image; and an output-color generation section that generates the image data of CMY from the first input image data based on the chroma value and the luminance value and generates the image data of CMY from the second input image data based on the luminance value.

According to the invention, the image processing apparatus includes a two color process section that converts input image data of RGB into image data of CMY for outputting a two-color image containing two colors which are a chromatic color and an achromatic color. The two color process section includes a luminance and chroma calculation section, an image-data determination section, and an output-color generation section. The luminance and chroma calculation section calculates a luminance value and a chroma value based on the input image data of RGB. The image-data determination section determines the input image data, the chroma value of which is equal to or greater than a predetermined threshold, as first input image data constituting the chromatic color of the two-color image and determines the input image data, the chroma value of which is less than the threshold, as second input image data constituting the achromatic color of the two-color image. The output-color generation section generates the image data of CMY from the first input image data based on the chroma value and the luminance value and generates the image data of CMY from the second input image data based on the luminance value.

In this way, since the output-color generation section included in the two color process section of the image processing apparatus generates the image data of CMY from the first input image data constituting the chromatic color of the two-color image based on the chroma value and the luminance value, the minimum value of the densities of the C, M, and Y planes is not zero and thus it is possible to generate a K (black) signal. Accordingly, the image processing apparatus can reduce a tone gap between the chromatic portion and the achromatic portion in the two-color image.

Further, in the invention, it is preferable that the two color process section further includes an extraction-color determination section that determines whether the input image data corresponds to an extraction color which is designated as a chromatic color to be outputted by a user and which is extracted from the original document based on the pixel values of the R, G, and B planes (components), and the image-data determination section determines the input image data, the chroma value of which is equal to or greater than the predetermined threshold and which is determined as corresponding to the extraction color by the extraction-color determination section, as the first input image data.

According to the invention, the two color process section of the image processing apparatus further includes the extraction-color determination section. The extraction-color determination section determines whether the input image data corresponds to an extraction color which is designated as the chromatic color to be outputted by a user and which is extracted from the original document based on the pixel values of the R, G, and B planes. The image-data determination section determines the input image data, the chroma value of which is equal to or greater than the predetermined threshold and which is determined as corresponding to the extraction color by the extraction-color determination section, as the first input image data.

Accordingly, the image processing apparatus can output the two-color image in which a color in the original document designated by the user is a chromatic color and the other colors are achromatic colors, thereby reducing the tone gap between the chromatic portion and the achromatic portion in the two-color image.

Further, in the invention, it is preferable that the two color process section further includes a chroma adjustment process section that adjusts the chroma value to increase the chroma of the first input image data, and the output-color generation section generates the image data of CMY from the first input image data based on the chroma value adjusted by the chroma adjustment process section and the luminance value and generates the image data of CMY from the second input image data based on the luminance value.

According to the invention, the two color process section of the image processing apparatus further includes the chroma adjustment process section. The chroma adjustment process section adjusts the chroma value so as to increase the chroma of the first input image data. The output-color generation section generates the image data of CMY from the first input image data based on the chroma value adjusted by the chroma adjustment process section and the luminance value and generates the image data of CMY from the second input image data based on the luminance value.

In this way, the output-color generation section included in the two color process section of the image processing apparatus generates the image data of CMY from the first input image data constituting the chromatic color of the two-color image based on the chroma value adjusted by the chroma adjustment process section and the luminance value. Accordingly, even when the differences in the pixel values in the R, G, and B planes between the pixels of the input image data are small, it is possible to generate the image data of CMY with a high density difference. For example, when the differences in the pixel values in the R, G, and B planes are read as small by a scanner (for example, blue or green signals) and it is intended to output a gray-scale image, the chroma adjustment process can be performed.

Further, in the invention, the image processing apparatus further comprises a smoothing section that performs a smoothing process on a predetermined pixel in the image data of RGB before the conversion process in the two color process section.

According to the invention, the smoothing section performs the smoothing process on a predetermined pixel in the image data of RGB. When the image data includes composite gray data, the smoothing section performs an averaging process by performing the smoothing process on a pixel constituting the composite gray data as the predetermined pixel to add color information of the peripheral pixels to color information of the pixel constituting the composite gray data. Accordingly, the two color process section can determine the pixel constituting the composite gray data as the achromatic color. Therefore, the image processing apparatus according to the invention can convert the image data containing the composite gray data into image data which can be used to print a two-color image and to form a gray image with high image quality.

Further, in the invention, it is preferable that the image processing apparatus further comprises a halftone determination section that determines whether a pixel in the image data of RGB is a halftone-area pixel before the conversion process in the two color process section, and the smoothing section sets the pixel determined as the halftone-area pixel by the halftone determination section as the predetermined pixel and performs the smoothing process on the predetermined pixel.

According to the invention, the image processing apparatus further includes the halftone determination section and the smoothing section performs the smoothing process on the pixel which is determined as the halftone-area pixel by the halftone determination section. Therefore, the image processing apparatus according to the invention can convert the input image data containing the composite gray data into two-color printing image data which can be used to form a gray image with high image quality, without making a text area or a continuous tone image area blur.

Further, in the invention, it is preferable that the image processing apparatus further comprises a halftone frequency information acquisition section that acquires information on a halftone frequency for the predetermined pixel, and the smoothing section changes a strength of smoothing to perform the smoothing process based on the information acquired by the halftone frequency information acquisition section.

According to the invention, the image processing apparatus further includes the halftone frequency information acquisition section and the smoothing section changes the strength of smoothing based on the information acquired by the halftone frequency information acquisition section and performs the smoothing process. Accordingly, the smoothing section can perform the optimal smoothing process on each image data. Therefore, the image processing apparatus according to the invention can convert the input image data containing the composite gray data into two-color printing image data which can be used to form a gray image with higher image quality.

Further, in the invention, it is preferable that the smoothing section changes a strength of smoothing when an instruction signal instructing to change the strength of smoothing is inputted from an outside of the image processing apparatus.

According to the invention, the smoothing section changes the strength of smoothing when an instruction signal instructing to change the strength of smoothing is inputted from an outside of the image processing apparatus, for example, by a user. Accordingly, the smoothing section can perform the optimal smoothing process on each image data in accordance with the instruction from the outside. Therefore, the image processing apparatus according to the invention can convert the input image data containing the composite gray data into two-color printing image data which can be used to form a gray image with higher image quality.

The invention further provides an image forming apparatus comprising the image processing apparatus mentioned above.

According to the invention, the image forming apparatus includes the image processing apparatus mentioned above. Accordingly, the image forming apparatus can form a two-color image with a reduced tone gap between the chromatic portion and the achromatic portion.

Further, since the image processing apparatus according to the invention is included, it is possible to form a gray image with high image quality in printing a two-color image.

The invention further provides an image processing method comprising:

a two color process step of converting input image data of RGB inputted by reading an original document into image data of CMY used to output a two-color image containing two colors which are a chromatic color and an achromatic color, the two color process step including:

a luminance and chroma calculation step of calculating a luminance value and a chroma value based on the input image data of RGB;

an image data determination step of determining the input image data, the chroma value of which is equal to or greater than a predetermined threshold, as first input image data constituting the chromatic color in the two-color image and determining the input image data, the chroma value of which is less than the threshold, as second input image data constituting the achromatic color in the two-color image; and an output-color generation step of generating the image data of CMY from the first input image data based on the chroma value and the luminance value and generating the image data of CMY from the second input image data based on the luminance value.

According to the invention, the image processing method includes a two color process step of converting input image data of RGB into image data of CMY for outputting a two-color image containing two colors which are a chromatic color and an achromatic color. The two color process step includes a luminance and chroma calculation step, an image data determination step, and an output-color generation step. In the luminance and chroma calculation step, a luminance value and a chroma value is calculated based on the input image data of RGB. In the image data determination step, the input image data, the chroma value of which is equal to or greater than a predetermined threshold, is determined as first input image data constituting the chromatic color of the two-color image and the input image data, the chroma value of which is less than the threshold, is determined as second input image data constituting the achromatic color of the two-color image. In the output-color generation step, the image data of CMY is generated from the first input image data based on the chroma value and the luminance value and the image data of CMY is generated from the second input image data based on the luminance value.

In this way, since the image data of CMY is generated from the first input image data constituting the chromatic color of the two-color image based on the chroma value and the luminance value in the output-color generation step included in the two color process step of the image processing method, the minimum value of densities of C, M, and Y planes is not zero and thus it is possible to generate a K (black) signal. Accordingly, in the image processing method, it is possible to reduce a tone gap between the chromatic portion and the achromatic portion in the two-color image.

Further, in the invention, it is preferable that the image processing method further comprises a smoothing step of performing a smoothing process on a predetermined pixel in the image data of RGB before the conversion process in the two color process step, and in the two color process step, the smoothed input image data of RGB is converted into the image data of CMY for forming the two-color image containing two colors which are a chromatic color and an achromatic color.

According to the invention, the smoothing process is performed on a predetermined pixel in the image data of RGB in the smoothing step. In the smoothing step, when the image data includes the composite gray data, an averaging process is performed by performing the smoothing process on the pixel constituting the composite gray data as the predetermined pixel to add color information of peripheral pixels to color information of the pixel constituting the composite gray data. Accordingly, in the two color process step, it is possible to determine the pixel constituting the composite gray data as an achromatic color. Therefore, in the image processing method according to the invention, it is possible to convert the input image data containing the composite gray data into image data which can be used to print a two-color image and to form a gray image with high image quality.

The invention further provides a computer-readable recording medium on which is recorded an image processing program for causing a computer to serve as the two color process section of the image forming apparatus mentioned above.

According to the invention, the image processing program is a program for causing a computer to serve as the two color process section of the image forming apparatus mentioned above. The image processing program can control the image processing capable of reducing the tone gap between the chromatic portion and the achromatic portion in a two-color image using software. In addition, the image processing program can control the image processing of converting the input image data containing the composite gray data into image data which is used to print a two-color image and to form a gray image with high image quality using software.

Further, the recording medium is a computer-readable recording medium on which the image processing program is recorded. Therefore, it is possible to realize the image processing apparatus on the computer according to the program read out from the computer-readable recording medium.

BRIEF DESCRIPTION OF THE DRAWINGS

Other and further objects, features, and advantages of the invention will be more explicit from the following detailed description taken with reference to the drawings wherein:

FIG. 3 is a flowchart illustrating a flow of processes executed by the two color process section in a color selection mode;

FIGS. 4A to 4C are diagrams schematically showing density values of the planes of the image data of CMY generated by the two color process section and density values of planes of the image data of C'M'Y'K generated by the black generation and under color removal section;

FIG. 5 is a flowchart for explaining a process procedure of processes executed by the two color process section in a chromatic color extraction mode;

FIG. 6 is a diagram for explaining processes performed when the image forming apparatus displays a preview;

FIGS. 9A and 9B are diagrams for explaining processes in performing preview display in the full-color mode and the single-color mode;

FIGS. 13A and 13B are diagrams illustrating the image processing in the full-color mode and the single-color mode;

FIGS. 14A and 14B are diagrams for explaining processes in performing preview display in the full-color mode and the single-color mode;

FIGS. 15A and 15B are diagrams illustrating a smoothing filter F1 and a smoothing filter F2;

FIG. 20 is a block diagram illustrating the configuration of a smoothing section;

FIG. 23 is a diagram illustrating intensity spectrum R3a;

FIG. 26 is a diagram illustrating intensity spectrum R7a;

FIG. 28 is a diagram illustrating intensity spectrum R11a;

FIG. 30 is a block diagram illustrating the configuration of an image forming apparatus according to a fifth embodiment of the invention.

DETAILED DESCRIPTION

Figure 1:
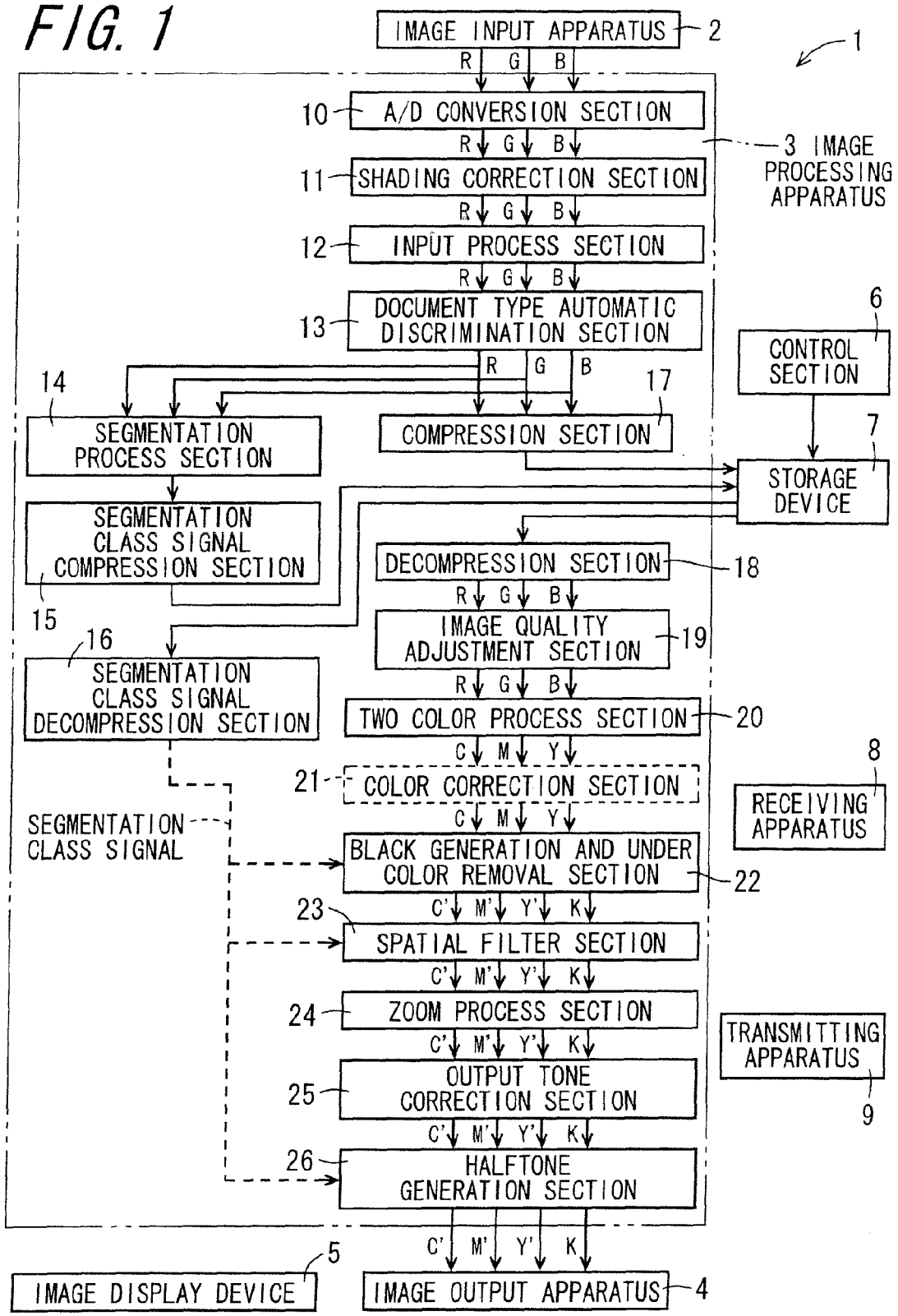
FIG. 1 is a block diagram illustrating the configuration of an image forming apparatus according to a first embodiment of the invention.

Now referring to the drawings, preferred embodiments of the invention are described below.

FIG. 1 is a block diagram illustrating the configuration of an image forming apparatus 1 according to a first embodiment of the invention. The image forming apparatus 1 is a digital color multifunction peripheral that executes, when any one mode among a copier mode, a print mode, a facsimile transmission mode, a facsimile reception mode, and an image sending mode is selected, the selected mode.

The copier mode (a copying mode) is a mode for reading image data (reading an original document and generating image data) and printing an image of the image data on a sheet. The print mode is a mode for printing an image of image data transmitted from a terminal apparatus connected to the image forming apparatus 1 on a sheet. The facsimile transmission mode includes a normal facsimile mode for transmitting image data obtained by reading an original document to an external apparatus through a telephone line and an Internet facsimile mode for transmitting the image data via the Internet with the image data attached to an electronic mail. The facsimile reception mode is a mode for receiving image data from the external apparatus by facsimile and printing an image of the received image data on a sheet. The image sending mode includes (1) a mode for transmitting image data generated by reading an original document to a designated address with the image data attached to an electronic mail (a scan to e-mail mode), (2) a mode for transmitting image data generated by reading an original document to a folder designated by an operator (a user) (a scan to ftp mode), and (3) a mode for transmitting image data generated by reading an original document to a USB memory or the like inserted in the image forming apparatus 1 (a scan to usb mode).

The image forming apparatus 1 executes, when the operator (the user) designates the copier mode or the print mode from an operation panel or the like, based on the designation by the user, operation of any one of a monochrome mode for outputting a monochrome image, a full-color mode for outputting a full-color image, a single-color mode for outputting a single-color image formed of only one color desired by the user, and a two-color mode for outputting a two-color image formed of one chromatic color desired by the user and an achromatic color (black).

In the copier mode or the print mode, the image forming apparatus 1 outputs, when the single-color mode is designated from the operation panel or the like, a single-color image and outputs, when the two-color mode is designated, a two-color image. In the single-color mode, the image forming apparatus 1 outputs, when a desired one color is designated out of R (red), G (green), B (blue), C (cyan), M (magenta), and Y (yellow) from the operation panel or the like, a single-color image formed of only the designated one color.

In the two-color mode, the image forming apparatus 1 executes operation of a chromatic color extraction mode or a color selection mode based on designation by the user from the operation panel or the like. The image forming apparatus 1 extracts, when the chromatic color extraction mode is designated from the operation panel or the like, all chromatic colors in an original document, outputs all the chromatic colors in a chromatic color designated by the user in advance (a designated output color), and outputs other color portions in the original document in an achromatic color (black). The image forming apparatus 1 extracts, when the color selection mode is designated from the operation panel or the like, a chromatic color designated by the user in advance (a designated extraction color) from the original document, outputs color belonged to the designated extraction color in a chromatic color designated by the user in advance (a designated output color), and outputs other color portions in the original document in the achromatic color (black). In the image forming apparatus 1, as each of the designated extraction color and the designated output color, desired one color is designated out of R (red), G (green), B (blue), C (cyan), M (magenta), and Y (yellow) from the operation panel or the like.

In this embodiment, in the copier mode, the image forming apparatus 1 can set an automatic discrimination mode. When the automatic discrimination mode is set, the image forming apparatus 1 performs an automatic color selection process (ACS) for determining whether a copying target is a color original document or a monochrome original document. When the copying target is discriminated as a color original document, the image forming apparatus 1 performs an output process in the full-color mode. When the copying target is discriminated as a monochrome original document, the image forming apparatus 1 performs the output process in the monochrome mode.

The image forming apparatus 1 includes an image input apparatus 2, the image processing apparatus 3 according to the invention, an image output apparatus 4, an image display device 5, a control section 6, a storage device 7, a receiving apparatus 8, and a transmitting apparatus 9.

The image input apparatus 2 is an image reading section capable of inputting color image data in the copier mode, facsimile transmission mode, and the image sending mode. The image input apparatus 2 reads an original document and generates image data. More specifically, the image input apparatus 2 is realized by a scanner including a CCD (Charge Coupled Device) image sensor. The image input apparatus 2 reads, with the CCD image sensor, a reflected light image from an original document as analog signals of RGB (R: red, G: green, B: blue) and outputs analog image data of RGB to the image processing apparatus 3. Even when any one of the full-color mode, the single-color mode, and the two-color mode is selected, the image input apparatus 2 reads an original document image in full-color. Even when the automatic color selection process is performed in the image processing apparatus 3, the image input apparatus 2 reads an original document image in full-color.

As explained in detail later, the image processing apparatus 3 is an integrated circuit that applies image processing to image data (an image signal) inputted from the image input apparatus 2. The image processing apparatus 3 includes an ASIC (Application Specific Integrated Circuit). In the copier mode, the facsimile transmission mode, and the image sending mode, the image processing apparatus 3 applies the image processing to image data inputted from the image input apparatus 2. In the print mode, the image processing apparatus 3 applies the image processing to image data transmitted from a terminal apparatus. In the facsimile reception mode, the image processing apparatus 3 applies the image processing to image data received from an external apparatus. In the copier mode, the print mode, and the facsimile reception mode, the image processing apparatus 3 transmits the image data subjected to the image processing to the image output apparatus 4. In the facsimile transmission mode, the image processing apparatus 3 transmits the image data subjected to the image processing to the transmitting apparatus 9. In the "scan to e-mail" mode of the image sending mode, the image processing apparatus 3 transmits the image data subjected to the image processing to a mail process section (not shown). In the "scan to ftp" mode, the image processing apparatus 3 transmits the image data subjected to the image processing to a predetermined folder. In the "scan to usb" mode, the image processing apparatus 3 transmits the image data subjected to the image processing to a predetermined USB memory.

The image output apparatus 4 is realized by a printer of an electrophotographic system, an ink-jet system, or the like. The image output apparatus 4 prints (forms) an output image on a recording material (e.g., a recording sheet) based on the image data subjected to the image processing by the image processing apparatus 3. In this embodiment, "printing" means any one of printing in the print mode, printing in the copier mode, and printing in the facsimile reception mode.

The image display device 5 is a liquid crystal display included in the operation panel (not shown) of the image forming apparatus 1 and is a display section capable of displaying a color image. The image display device 5 is covered with a touch panel and has a function of an input interface of the image forming apparatus 1. Specifically, a GUI (graphical user interface) or an operation guide for inputting various commands to the image forming apparatus 1 is displayed on the image display device 5.

In the copier mode or the facsimile reception mode, the image forming apparatus 1 according to this embodiment can display a preview of a printing target image on the image display device 5 before executing printing. In the facsimile transmission mode or the image sending mode, the image forming apparatus 1 according to this embodiment can display a preview of a transmission target image on the image display device 5 before executing transmission. In the copier mode or the image sending mode, when the full-color mode is selected, the image forming apparatus 1 displays a preview of a full-color image on the image display device 5. When the single-color mode is selected, the image forming apparatus 1 displays a preview of a single-color image on the image display device 5. When the two-color mode is selected, the image forming apparatus 1 displays a preview of a two-color image on the image display device 5. The image display device is not limited to the liquid crystal display and may be a display section other than the liquid crystal display (e.g., an organic EL display or a plasma display).

The receiving apparatus 8 is an apparatus that is connected to a telephone line or the Internet and receives image data from an external apparatus through facsimile communication. The transmitting apparatus 9 is an apparatus that is connected to the telephone line or the Internet and transmits image data inputted by the image input apparatus 2 to an external apparatus through facsimile transmission.

The storage device 7 is a hard disk drive for temporarily storing image data treated in the image processing apparatus 3. The control section 6 is a computer including a processor such as a CPU (Central Processing Unit) or a DSP (Digital Signal Processor). The control section 6 collectively controls various kinds of hardware included in the image forming apparatus 1. The control section 6 also has a function of controlling data transfer among the kinds of hardware included in the image forming apparatus 1.

The image processing apparatus 3 according to the invention includes blocks of an A/D (analog/digital) conversion section 10, a shading correction section 11, an input process section 12, a document type automatic discrimination section 13, a segmentation process section 14, a compression section 17, a segmentation class signal compression section 15, a decompression section 18, a segmentation class signal decompression section 16, an image quality adjustment section 19, a two color process section 20, a color correction section 21, a black generation and under color removal section 22, a spatial filter section 23, a zoom process section 24, an output tone correction section 25, and a halftone generation section 26.

Contents of processing executed in the blocks of the image processing apparatus 3 in the copier mode, the facsimile transmission mode, the facsimile reception mode, and the image sending mode are explained in detail below. In the image processing apparatus 3 according to this embodiment, there are blocks that operate when a certain mode "a" is selected and do not operate when a mode "b" different from the mode "a" is selected. The mode "a" and the mode "b" are any ones of the copier mode, the facsimile transmission mode, the facsimile reception mode, and the image sending mode. In the image processing apparatus 3, there are also blocks that change process contents according to a selected mode (the full-color mode, the single-color mode, or the two-color mode). Further, there are blocks that operate during a process of image data for printing (for transmission) outputted to the image output apparatus 4 and do not operate during a process of information outputted to the image display device 5 even if a selected mode (the full-color mode, the single-color mode, or the two-color mode) is the same and blocks that change process contents during the process of the information outputted to the image display device 5 and during the process of the image data for printing (for transmission) outputted to the image output apparatus 4. Therefore, in the following explanation, process contents executed in the blocks included in the image processing apparatus 3 are explained for each of the modes. The process contents during the print process (or during the transmission process) and during the preview display are separately explained.

(1) Image Processing Operation in the Two-Color Mode (1-1) During Printing Process (During an Image Print Job)

The image processing operation of the image processing apparatus 3 when the copy mode and the two-color mode are designated will be described with reference to FIG. 1.

The image processing apparatus 3 sequentially sends analog image data of RGB (R: red, G: green, and B: blue) (RGB analog signals) inputted from the image input apparatus 2 to the A/D conversion section 10, the shading correction section 11, the input process section 12, the document type automatic discrimination section 13, the segmentation process section 14, and the compression section 17 and temporarily stores the RGB analog image data in the storage device 7. Thereafter, the image data read from the storage device 7 is sequentially sent to the decompression section 18, the image quality adjustment section 19, the two color process section 20, the color correction section 21, the black generation and under color removal section 22, the spatial filter section 23, the zoom process section 24, the output tone correction section 25, and the halftone generation section 26 and is sent to the image output apparatus 4 as digital color signals of CMYK (C: cyan, M: magenta, Y: yellow and K: black). In the two-color mode, the operation of the color correction section 21 of the image processing apparatus 3 is not performed and skipped.

The A/D conversion section 10 converts analog image data of RGB inputted from the image input apparatus 2 into digital image data (RGB digital signals) and sends the digital image data to the shading correction section 11. The shading correction section 11 applies a process for removing distortion, which occurs in an illuminating system, a focusing system, and an imaging system of the image input apparatus 2, to the digital RGB image data sent from the A/D conversion section 10. The input process section 12 applies a tone conversion process such as a γ correction process to each of the image data of RGB sent from the shading correction section 11.

The document type automatic discrimination section 13 performs, based on the image data of RGB (density signals of RGB) subjected to the tone conversion process such as γ correction by the input process section 12, determination of a type of an original document read by the image input apparatus 2. As the type of the original document to be determined, there are a text document, a printed-picture document, a text and printed-picture document in which a text and a printed-picture are mixed, and the like. The document type automatic discrimination section 13 can also perform, based on the image data, automatic color selection process (ACS: Auto Color Selection), which is a process for discriminating whether a read original document is a color original document or a monochrome original document, and a process for determining whether the document is a blank page document (an empty document). The image data of RGB outputted from the document type automatic discrimination section 13 is inputted to the segmentation process section 14 and the compression section 17.

The segmentation process section 14 performs, based on the image data of RGB sent from the document type automatic discrimination section 13, for each of pixels of an input image, discriminating into what kind of image area the pixel is classified and generating a segmentation class signal indicating a result of the discrimination. As the image area discriminated by the segmentation process section 14, there are a black text area, a color text area, a halftone dot area, and the like. The segmentation process section 14 may adopt a form for determining an image area for each of blocks including plural pixels rather than a form for determining an image area for each of the pixels.

The compression section 17 performs a process for encoding the image data of RGB sent from the document type automatic discrimination section 13. The encoding is performed based on, for example, a JPEG (Joint Photographic Experts Group) system.

The segmentation class signal compression section 15 applies a compression process to the segmentation class signal generated for each of the pixels. The compression process in the segmentation class signal compression section 15 is performed based on, for example, an MMR (Modified Modified Reed) system or an MR (Modified Reed) system, which is a lossless compression method.

The control section 6 causes the storage device 7 to temporarily store therein an encoded code (the encoded image data) outputted from the compression section 17 and a segmentation class signal code (the compressed segmentation class signal) outputted from the segmentation class signal compression section 15 and manages the encoded code and the segmentation class signal code as filing data. When a copy output operation is instructed, the control section 6 reads out the encoded code and the segmentation class signal code corresponding to the encoded code from the storage device 7 and passes the encoded code and the segmentation class signal code to the decompression section 18 and the segmentation class signal decompression section 16, respectively.

The control section 6 enters a storage address or a data name of the encoded code and a storage address of the segmentation class signal code in a management table in association with each other. In other words, the control section 6 performs control of readout or writing of the encoded code and the segmentation class signal code using the management table.

The decompression section 18 applies a decompression process to the encoded code to thereby decompress the encoded code into image data of RGB. The segmentation class signal decompression section 16 applies a decompression process to the segmentation class signal code. The segmentation class signal decompression section 16 passes a decoded segmentation class signal to the black generation and under color removal section 22. The black generation and under color removal section 22 performs selecting of image processing content according to a type of an image area.

The image quality adjustment section 19 performs detection of a page background and performs page background removal correction concerning the image data of RGB sent from the decompression section 18. The image quality adjustment section 19 performs, based on setting information inputted from the operation panel (not shown) by the operator (the user), adjustment of balance of RGB (color adjustment and overall color adjustment for a tinge of red and a tinge of blue), brightness, and saturation. Image data outputted from the image quality adjustment section 19 is image data of RGB in the two-color mode.

When the two-color mode is selected, the two color process section 20 performs a process for converting the image data of RGB sent from the image quality adjustment section 19 into image data of CMY (C: cyan, M: magenta, Y: yellow). When the full-color mode is selected, the two color process section 20 directly passes, without applying any process to the image data of RGB outputted from the image quality adjustment section 19, the image data to the color correction section 21 (i.e., not performed). When the single-color mode is selected, the two color process section 20 directly passes, without applying any process to the image data of CMY outputted from the image quality adjustment section 19, the image data to the color correction section 21.

Figure 2:
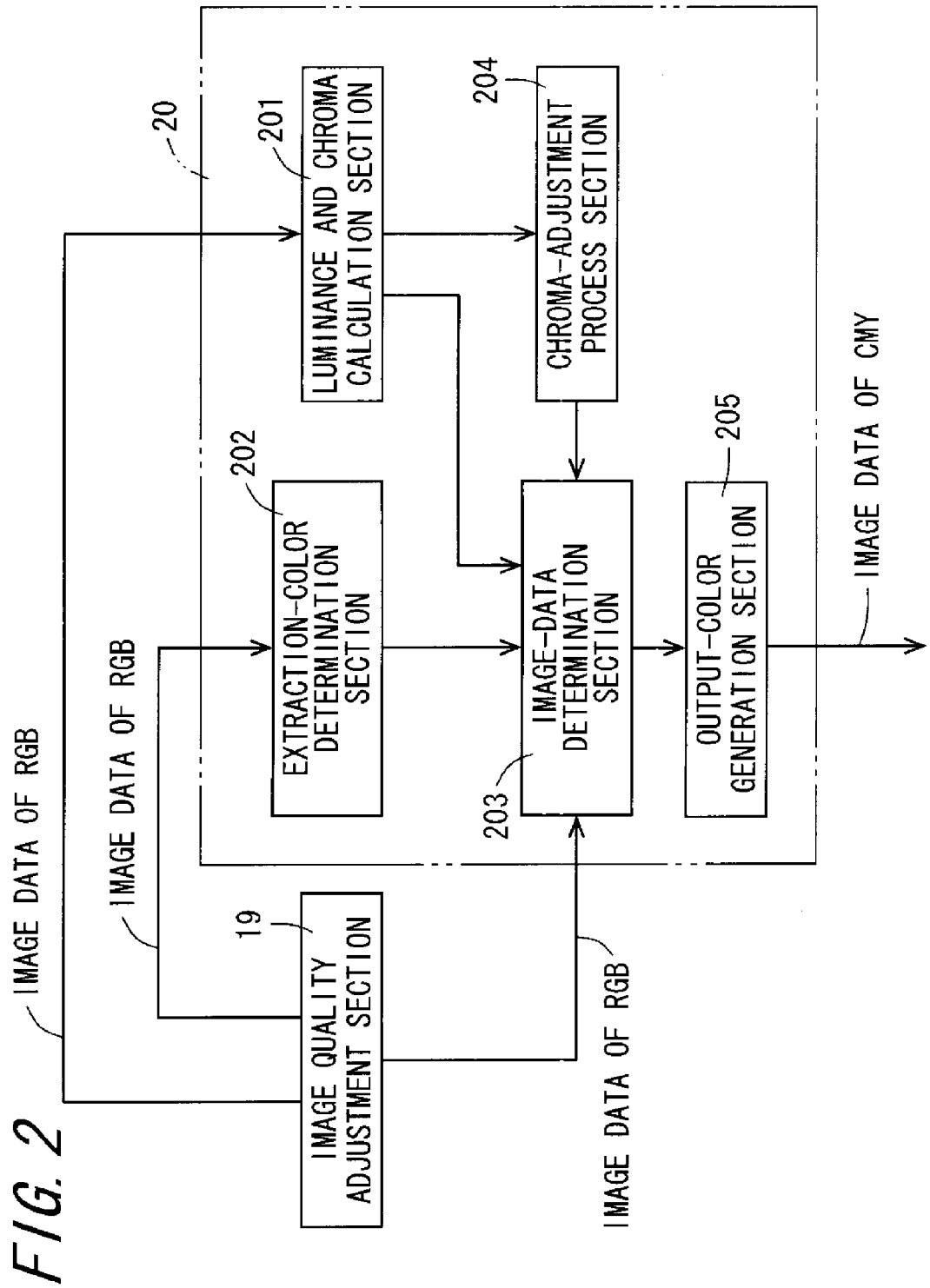
FIG. 2 is a block diagram illustrating the configuration of a two color process section.

FIG. 2 is a block diagram illustrating the configuration of the two color process section 20. The two color process section 20 converts the image data of RGB sent from the image quality adjustment section 19 into image data of CMY for outputting a two-image data formed of two colors of a chromatic color and an achromatic color. The two color process section 20 includes a luminance and chroma calculation section 201, an extraction-color determination section 202, an image-data determination section 203, a chroma-adjustment process section 204, and an output-color generation section 205.

As explained above, in the two-color mode, the image forming apparatus 1 executes operation in the chromatic color extraction mode or the color selection mode based on designation by the user from the operation panel or the like. Processes by the two color process section 20 in the two-color mode are explained below separately for the chromatic color extraction mode and the color selection mode.

When the color selection mode is designated from the operation panel or the like in the image forming apparatus 1, the image processing apparatus 3 extracts a chromatic color designated in advance by the user (a designated extraction color) from an original document, outputs color belonged to the designated extraction color in a chromatic color designated by the user in advance (a designated output color), and outputs other color portions in the original document in an achromatic color (black). As each of the designated extraction color and the designated output color, desired one color is designated out of R (red), G (green), B (blue), C (cyan), M (magenta), and Y (yellow) from the operation panel or the like.

FIG. 3 is a flowchart for explaining a process procedure of processing executed by the two color process section 20 in the color selection mode. The image processing method according to the invention is executed by the image processing apparatus 3 and the two color process step in the image processing method is executed by the two color process section 20. The two color process step executed by the two color process section 20 in the color selection mode includes a luminance and chroma calculation step, an extraction color determination step, an image data determination step, a chroma adjustment process step, and an output-color generation step.

In the luminance and chroma calculation step of step s1, the luminance and chroma calculation section 201 calculates a luminance value and a chroma value with respect to the image data of RGB sent from the image quality adjustment section 19. The calculation of the luminance value (Lum) by the luminance and chroma calculation section 201 is performed by using the following conversion formula (1).

$$\text{Lum} = \text{Coefficient}\_R \times \text{In}\_R + \text{Coefficient}\_G \times \text{In}\_G + \text{Coefficient}\_B \times \text{In}\_B \quad (1)$$

In the conversion formula (1), In_R, In_G, and In_B respectively represent pixel values of R, G, and B planes of the RGB image data sent from the image quality adjustment section 19. Coefficient_R, Coefficient_G, and Coefficient_B in the conversion formula (1) are conversion coefficients set in advance. Coefficient_R, Coefficient_G, and Coefficient_B only have to be set in such a manner as Coefficient_R=0.3, Coefficient_G=0.6, and Coefficient_B=0.1.

The calculation of the chroma value (Chroma) by the luminance and chroma calculation section 201 is performed by using the following conversion formula (2).

$$\text{Chroma} = \text{Max}(\text{In}\_R, \text{In}\_G, \text{In}\_B) - \text{Min}(\text{In}\_R, \text{In}\_G, \text{In}\_B) \quad (2)$$

In the conversion formula (2), In_R, In_G, and In_B respectively represent pixel values of the R, G, and B planes of the RGB image data sent from the image quality adjustment section 19.

In the extraction color determination step of step s2, the extraction-color determination section 202 determines, based on comparison of a magnitude relation of the pixel values of the R, G, and B planes, whether the RGB image data sent from the image quality adjustment section 19 is input image data corresponding to a chromatic color in an original document designated by the user in advance (a designated extraction color). Specifically, the extraction-color determination section 202 determines whether the RGB image data is the input image data corresponding to the designated extraction color using Table 1.

TABLE 1

| | | | Designated extraction color | | | |
|---|---|---|---|---|---|
| R (red) | G (green) | B (blue) | C (cyan) | M (magenta) | Y (yellow) |
| In_R > R_JudgeR | In_R < G_JudgeR | In_R < B_JudgeR | In_R < C_JudgeR | In_R > M_JudgeR | In_R > Y_JudgeR |
| In_G < R_JudgeG | In_G > G_JudgeG | In_G < B_JudgeG | In_G > C_JudgeG | In_G < M_JudgeG | In_G > Y_JudgeG |
| In_B < R_JudgeB | In_B < G_JudgeB | In_B > B_JudgeB | In_B > C_JudgeB | In_B > M_JudgeB | In_B < Y_JudgeB |

For example, when the user designates R (red) as the designated extraction color, the extraction-color determination section 202 determines, referring to a column of "R (red)" in Table 1, that the RGB image data is input image data corresponding to the designated extraction color (R: red) when In_R>R_JudgeR, In_G<R_JudgeG, and In_B<R_JudgeB are satisfied. Otherwise, the extraction-color determination section 202 determines that the RGB image data is input image data not corresponding to the designated extraction color.

In_R, In_G, and In_B in Table 1 represent the pixel values of the R, G, and B planes of the RGB image data sent from the image quality adjustment section 19. R_JudgeR, R_JudgeG, and R_JudgeB in Table 1 are thresholds set in advance when the designated extraction color is R (red). G_JudgeR, G_JudgeG, and G_JudgeB are thresholds set in advance when the designated extraction color is G (green). B_JudgeR, B_JudgeG, and B_JudgeB are thresholds set in advance when the designated extraction color is B (blue). C_JudgeR, C_JudgeG, and C_JudgeB are thresholds set in advance when the designated extraction color is C (cyan). M_JudgeR, M_JudgeG, and M_JudgeB are thresholds set in advance when the designated extraction color is M (magenta). Y_JudgeR, Y_JudgeG, and Y_JudgeB are thresholds set in advance when the designated extraction color is Y (yellow). The thresholds are set as, for example, values shown in Table 2.

TABLE 2

| R_JudgeR | 200 | G_JudgeR | 40 | B_JudgeR | 40 | C_JudgeR | 40 | M_JudgeR | 200 | Y_JudgeR | 200 |
|---|---|---|---|---|---|---|---|---|---|---|---|
| R_JudgeG | 40 | G_JudgeG | 200 | B_JudgeG | 40 | C_JudgeG | 40 | M_JudgeG | 200 | Y_JudgeG | 200 |
| R_JudgeB | 40 | G_JudgeB | 40 | B_JudgeB | 200 | C_JudgeB | 200 | M_JudgeB | 200 | Y_JudgeB | 40 |

In the image-data determination step of step s3, the image-data determination section 203 determines, based on the chroma value calculated by the luminance and chroma calculation section 201 and a result of the determination by the extraction-color determination section 202, whether the RGB image data sent from the image quality adjustment section 19 is first input image data or second input image data.

Specifically, when the chroma value of the RGB input image data calculated by the luminance and chroma calculation section 201 is equal to or larger than a predetermined threshold (e.g., 20) and the RGB input image data is determined as corresponding to the designated extraction color by the extraction-color determination section 202, the image-data determination section 203 determines the RGB input image data as the first input image data forming a chromatic color in a two-color image. When the RGB input image data is other than the first input image data, i.e., the RGB input image data satisfies at least one of a condition that the chroma value calculated by the luminance and chroma calculation section 201 is smaller than the predetermined threshold (e.g., 20) and a condition that the RGB input image data is determined as not corresponding to the designated extraction color by the extraction-color determination section 202, the image-data determination section 203 determines that the RGB input image data is the second input image data forming an achromatic color in the two-color image.

In the chroma-adjustment process step of step s4, the chroma-adjustment process section 204 adjusts the chroma value to increase chroma for the RGB input image data determined as the first input image data by the image-data determination section 203. Specifically, the chroma-adjustment process section 204 applies a chroma adjustment process to the first input image data using the following conversion formula (3). The chroma-adjustment process section 204 does not apply the chroma adjustment process to the second input image data.

$$Out\_Chroma = Coefficient\_Int \times In\_Chroma \quad (3)$$

Out_Chroma in the conversion formula (3) represents a chroma value after the chroma adjustment process by the chroma-adjustment process section 204. In_Chroma represents a chroma value calculated by the luminance and chroma calculation section 201. Coefficient_Int is a constant (e.g., 1.5) set in advance.

In the output-color generation step of step s5, the output-color generation section 205 generates image data of CMY. Specifically, as indicated by the following conversion formula (4), the output-color generation section 205 generates, with respect to the first input image data, image data of CMY based on the chroma value (Out_Chroma) after the chroma adjustment process by the chroma-adjustment process section 204 and the luminance value (Lum) calculated by the luminance and chroma calculation section 201.

$$Out\_C = 255 - Lum + Out\_Chroma \times Coefficient\_OutR$$

$$Out\_M = 255 - Lum + Out\_Chroma \times Coefficient\_OutG$$

$$Out\_Y = 255 - Lum + Out\_Chroma \times Coefficient\_OutB \quad (4)$$

Out_C, Out_M, and Out_Y in the conversion formula (4) represent density values of planes of the CMY image data generated by the output-color generation section 205. Coefficient_OutR, Coefficient_OutG, and Coefficient_OutB in the conversion formula (4) are conversion coefficients set in advance according to an output color designated by the user and are set based on Table 3.

TABLE 3

| | | Designated output color | | | | | |
|---|---|---|---|---|---|---|---|
| Adjustment plane | | R (red) | G (green) | B (blue) | C (cyan) | M (magenta) | Y (yellow) |
| R (red) | Coefficient_OutR | 0 | 1 | 1 | 1 | 0 | 0 |
| G (green) | Coefficient_OutG | 1 | 0 | 1 | 0 | 1 | 0 |
| B (blue) | Coefficient_OutB | 1 | 1 | 0 | 0 | 0 | 1 |

For example, when the user designates R (red) as the designated output color, the output-color generation section 205 refers to values of Coefficient_OutR, Coefficient_OutG, and Coefficient_OutB belonging to a column of "R (red)" in Table 3 and selects Coefficient_OutR=0, Coefficient_OutG=1, and Coefficient_OutB=1.

As indicated by the following conversion formula (5), the output-color generation section 205 generates, with respect to the second input image data, image data of CMY based on the luminance value (Lum) calculated by the luminance and chroma calculation section 201.

$$Out\_C = 255 - Lum$$

$$Out\_M = 255 - Lum$$

$$Out\_Y = 255 - Lum \quad (5)$$

Out_C, Out_M, and Out_Y in the conversion formula (5) represent density values of the planes of the CMY image data generated by the output-color generation section 205.

The two color process section 20 passes the image data of CMY generated as explained above to the color correction section 21. When the two-color mode is selected, the color correction section 21 directly passes, without applying any process to the image data of CMY outputted from the two color process section 20, the image data to the black generation and under color removal section 22.

When the two-color mode is selected, the black generation and under color removal section 22 performs black generation for generating, based on the following conversion formula (6), image data of K (black) from the image data of CMY outputted from the color correction section 21, i.e., the image data of CMY generated by the two color process section 20.

$$K = \min(C, M, Y) \tag{6}$$

When the two-color mode is selected, as indicated by the following conversion formula (7), the black generation and under color removal section 22 subtracts the image data of K (black) from the image data of CMY outputted from the color correction section 21 to generate image data of C'M'Y' that is new image data of CMY.

$$C' = C - K$$

$$M' = M - K$$

$$Y' = Y - K \tag{7}$$

As explained above, in the two-color mode, the black generation and under color removal section 22 generates the image data of K (black) with respect to the image data of CMY generated by the two color process section 20 and applies an under color removal process to the image data of CMY to generate the image data of C'M'Y'K.

Density (pixel) values of the CMY image data generated by the two color process section 20 and the C'M'Y'K image data generated by the black generation and under color removal section 22 are explained with reference to FIGS. 4A to 4C.

FIGS. 4A to 4C are diagrams schematically showing density values of the planes of the image data of CMY generated by the two color process section 20 and density values of planes of the image data of C'M'Y'K generated by the black generation and under color removal section 22. FIG. 4A shows a relation between density values of CMY image data generated with respect to the first input image data by the two color process section 20 and density values of C'M'Y'K image data generated after the black generation and under color removal process by the black generation and under color removal section 22. FIG. 4B shows a relation between density values of CMY image data generated with respect to the second input image data by the two color process section 20 and density values of C'M'Y'K image data generated after the black generation and under color removal process by the black generation and under color removal section 22. FIG. 4C shows a relation between density values of CMY image data generated with respect to the first input image data in the image processing apparatus of the related art and density values of C'M'Y'K image data generated after the black generation and under color removal process by the black generation and under color removal section 22.

For example, when the designated extraction color is designated as R (red) and the designated output color is designated as R (red) in the color selection mode, as shown in FIG. 4A, the output-color generation section 205 included in the two color process section 20 of the image processing apparatus 3 generates, based on a chroma value and a luminance value, image data of CMY with respect to the first input image data forming a chromatic color (R: red) in a two-color image. A minimum of density values of C, M, and Y planes is not zero. The black generation and under color removal section 22 can generate a K (black) signal. As shown in FIG. 4B, the output-color generation section 205 generates, based on the luminance value, CMY image data having equal density values of C, M, and Y planes with respect to the second input image data forming an achromatic color in the two-color image. The black generation and under color removal section 22 generates a K (black) signal and generates C'M'Y'K image data, density values of C', M', and Y' planes of which are zero, through the black generation and under color removal process.

As explained above, in the image processing apparatus 3 according to this embodiment, the output-color generation section 205 generates, based on a chroma value and a luminance value, CMY image data, a minimum of density values of C, M, and Y planes of which is not zero, with respect to the first input image data. Therefore, it is also possible to generate a K (black) signal with respect to the first input image data forming a chromatic color in a two-color image. Therefore, the image processing apparatus 3 can reduce a so-called tone gap that is a deficiency in which a change in a color tint is conspicuous in a boundary portion between a chromatic color portion and an achromatic color portion in the two-color image.

On the other hand, since the image processing apparatus of the related art generates CMY image data with respect to the first input image data using only the chromatic value, for example, when the designated extraction color is designated as R (red) and the designated output value is designated as R (red), as shown in FIG. 4C, CMY image data, a density value of a C plane of which is zero, is generated. Therefore, when the image processing apparatus of the related art applies the black generation and under color removal process to the CMY image data generated with respect to the first input image data, a K (black) signal is not generated and a density value of a K plane is zero. Therefore, in the image processing apparatus of the related art, a large tone gap occurs between a chromatic color portion and an achromatic color portion in a two-color image.

In this embodiment, the output-color generation section 205 included in the two color process section 20 generates, based on a chroma value and a luminance value after the chroma adjustment process by the chroma-adjustment process section 204, image data of CMY with respect to the first input image data. Therefore, even when a difference in pixel values in R, G, and B planes is small among pixels of RGB input image data, it is possible to generate image data of CMY with a density difference set high.

FIG. 5 is a flowchart for explaining a process procedure of processes executed by the two color process section 20 in the chromatic color extraction mode. The two color process step executed by the two color process section 20 in the chromatic color extraction mode includes a luminance and chroma calculation step, an image-data determination step, a chroma-adjustment process step, and an output-color generation step.

When the chromatic color extraction mode is designated from the operation panel or the like in the image forming apparatus 1, the image processing apparatus 3 extracts all chromatic colors in an original document, outputs all the chromatic colors in a chromatic color designated in advance by the user (a designated output color), and outputs other color portions in the original document in an achromatic color (black). As the designated output color, desired one color is designated out of R (red), G (green), B (blue), C (cyan), M (magenta), and Y (yellow) from the operation panel or the like.

In the luminance and chroma calculation step of step a1, the luminance and chroma calculation section 201 calculate a luminance value and a chroma value with respect to image data of RGB sent from the image quality adjustment section 19. The calculation of the luminance value (Lum) by the luminance and chroma calculation section 201 is performed by using the conversion formula (1). The calculation of the chroma value (Chroma) by the luminance and chroma calculation section 201 is performed by using the conversion formula (2). In the chromatic color extraction mode, the determination process by the extraction-color determination section 202 is not performed.

In the image-data determination step of step a2, the image-data determination section 203 determines, based on the chroma value calculated by the luminance and chroma calculation section 201, whether the RGB image data sent from the image quality adjustment section 19 is the first input image data or the second input image data.

Specifically, when the chroma value calculated by the luminance and chroma calculation section 201 is equal to or larger than a predetermined threshold (e.g., 20), the image-data determination section 203 determines the RGB input image data as the first input image data forming a chromatic color in a two-color image. When the RGB input image data is other than the first input image data, i.e., the chroma value calculated by the luminance and chroma calculation section 201 is smaller than the predetermined threshold (e.g., 20), the image-data determination section 203 determines that the RGB input image data is the second input image data forming an achromatic color in the two-color image.

In the chroma-adjustment process step of step a3, the chroma-adjustment process section 204 adjusts the chroma value to increase chroma for the RGB input image data determined as the first input image data by the image-data determination section 203. Specifically, the chroma-adjustment process section 204 applies a chroma adjustment process to the first input image data using the conversion formula (3). The chroma-adjustment process section 204 does not apply the chroma adjustment process to the second input image data.

In the output-color generation step of step a4, the output-color generation section 205 generates image data of CMY. Specifically, as indicated by the conversion formula (4), the output-color generation section 205 generates, with respect to the first input image data, image data of CMY based on the chroma value (Out_Chroma) after the chroma adjustment process by the chroma-adjustment process section 204 and the luminance value (Lum) calculated by the luminance and chroma calculation section 201. As indicated by the conversion formula (5), the output-color generation section 205 generates, with respect to the second input image data, image data of CMY based on the luminance value (Lum) calculated by the luminance and chroma calculation section 201.

The two color process section 20 passes the image data of CMY generated as explained above to the color correction section 21. When the two-color mode is selected, the color correction section 21 directly passes, without applying any process to the image data of CMY outputted from the two color process section 20, the image data to the black generation and under color removal section 22.

In the chromatic color extraction mode, the black generation and under color removal section 22 applies a black generation and under color removal process the same as that in the color selection mode to the image data of CMY generated by the two color process section 20 to generate image data of C'M'Y'K.

In the chromatic color extraction mode, the output-color generation section 205 included in the two color process section 20 of the image processing apparatus 3 generates, based on the chroma value and the luminance value, image data of CMY with respect to the first input image data forming the chromatic color in the two-color image. Therefore, a minimum of density values of C, M, and Y planes is not zero. The output-color generation section 205 can generate a K (black) signal. Therefore, the image processing apparatus 3 can reduce a tone gap between a chromatic color portion and an achromatic color portion in the two-color image.

The spatial filter section 23 applies, based on a segmentation class signal, a spatial filter process (edge enhancement process, smoothing process, etc.) by a digital filter to the image data of C'M'Y'K outputted from the black generation and under color removal section 22. In other words, the spatial filter section 23 executes, based on the segmentation class signal, different image processing for each of image areas.

The zoom process section 24 applies, based on a magnification command (information indicating the magnification of a print image) inputted by the operator (the user) from the operation panel, an image expansion and reduction process to the image data of C'M'Y'K outputted from the spatial filter section 23. The output tone correction section 25 applies the output γ correction process for output to a recording material such as a recording sheet to the image data of C'M'Y'K outputted from the zoom process section 24. The halftone generation section 26 applies, using an error diffusion method or a dither method, a tone reproduction process (halftone generation process) necessary for printing an image in the image output apparatus 4 to the image data of C'M'Y'K outputted from the output tone correction section 25.

The image data of C'M'Y'K outputted from the halftone generation section 26 is passed to the image output apparatus 4. The image output apparatus 4 prints a two-color image of the image data on the recording sheet.

(1-2) During Preview Display

FIG. 6 is a diagram for explaining processes performed when the image forming apparatus 1 displays a preview. A preview display operation performed by the image processing apparatus 3 when the copier mode and the two-color mode are designated is explained with reference to FIG. 6.

During preview display, in the image processing apparatus 3, processes by the A/D conversion section 10, the shading correction section 11, the input process section 12, the document type automatic discrimination section 13, the segmentation process section 14, the compression section 17, the segmentation class signal compression section 15, the decompression section 18, the image quality adjustment section 19, and the two color process section 20 are the same as the processes performed during the above-mentioned print process. Therefore, explanation thereof is omitted below.

As shown in FIG. 6, during the preview display, the segmentation class signal decompression section 16 passes a decoded segmentation class signal to the spatial filter section 23 and the output tone correction section 25. During the preview display in the two-color mode, the color correction section 21 performs a process for converting the image data of CMY outputted from the two color process section 20 into image data of R'G'B'. In other words, the color correction section 21 performs a process for converting image data of CMY adapted to a printing characteristic of print processing into image data of R'G'B' adapted to a display characteristic of the image display device 5. The process for converting the image data of CMY into the image data of R'G'B' is realized by creating an LUT (lookup table) in which input values (CMY) and output values (R'G'B') are associated with each other and looking up the output values from the created LUT.

During the preview display, the black generation and under color removal section 22 directly passes, without applying any process to the image data of R'G'B' outputted from the color correction section 21, the image data to the spatial filter section 23 at the later stage. During the preview display, the spatial filter section 23 applies, based on the segmentation class signal, a spatial filter process (edge enhancement process, smoothing process, etc.) by a digital filter to the image data of R'G'B' outputted from the black generation and under color removal section 22. In other words, in the same manner as during the print process, the spatial filter section 23 executes different image processing for each of image areas based on the segmentation class signal.

During the preview display, the zoom process section 24 performs a down-sampling process for converting the number of pixels of an image formed by the image data of R'G'B' outputted from the spatial filter section 23 into the number of pixels of the image display device 5 (a process for reducing the number of pixels). The image display device 5 included in the operation panel of the image forming apparatus 1 is usually an extremely small display having low resolution compared with the resolution of image data to be printed. Therefore, during the preview display, the image data needs to be down-sampled during the preview display. The zoom process section 24 applies an image expansion and reduction process based on a magnification command (information indicating display magnification, e.g., fixed magnification such as 2 to 4 times) inputted from the operation panel included in the image forming apparatus 1.

During the preview display, the output tone correction section 25 applies, based on the segmentation class signal, an output γ correction process to the image data of R'G'B' outputted from the zoom process section 24. More specifically, the output tone correction section 25 selects, based on the segmentation class signal, a gamma curve different according to the image areas and varies content of the output γ correction process for each of the image areas. For example, a gamma curve corresponding to the display characteristic of the image display device 5 is selected for an area other than a text. A gamma curve for clearly displaying the text is selected for a text area.

Figure 7A:
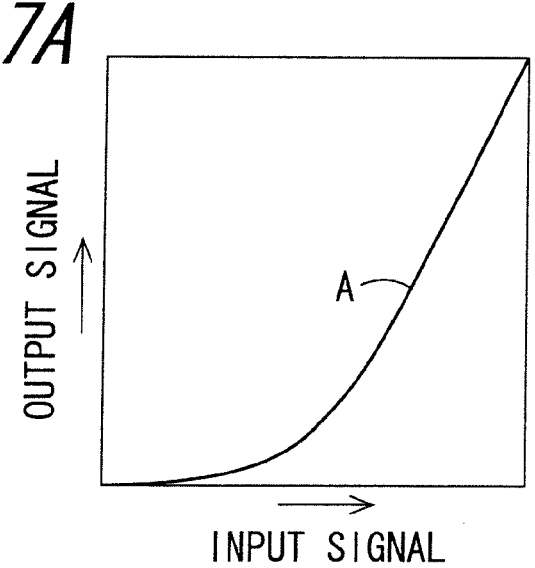
FIGS. 7A and 7B are graphs of examples of gamma curves used by an output tone correction section.
Figure 7B:
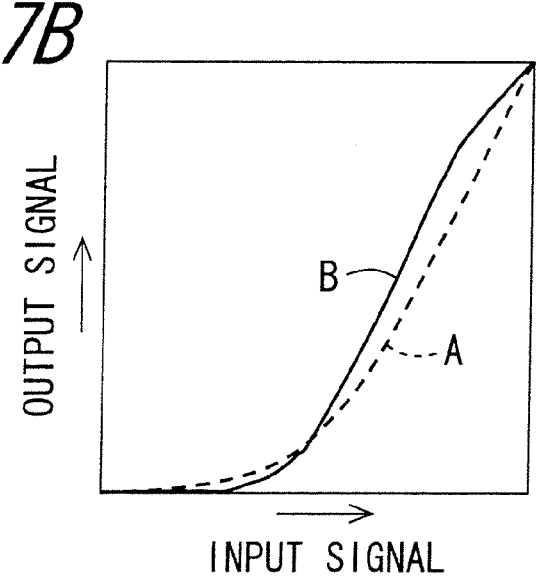

FIGS. 7A and 7B are graphs of examples of gamma curves used by the output tone correction section 25. FIG. 7A is a graph of a gamma curve corresponding to the display characteristic of the image display device 5. A curve indicated by a solid line in FIG. 7B is a gamma curve for clearly displaying a text. A curve indicated by a broken line in FIG. 7B is a gamma curve corresponding to the display characteristic of the image display device 5 and is shown for comparison with the gamma curve for clearly displaying a text. In this embodiment, the output tone correction section 25 selects a gamma curve based on the segmentation class signal. However, the output tone correction section 25 may perform output tone correction using only the gamma curve shown in FIG. 7A without selecting a gamma curve based on the segmentation class signal.

During the preview display, the halftone generation section 26 directly passes, without applying any process to the image data of R'G'B' outputted from the output tone correction section 25, the image data to the image display device 5 at the later stage. Consequently, the image display device 5 can display a preview of a copy target image based on the image data of R'G'B'.

Although the output γ correction process is executed by the output tone correction section 25, it may be executed by the image quality adjustment section 19.

In the above explanation, the process for performing preview display when the copier mode is selected is explained. However, when the image sending mode is selected, preview display may be performed by selecting signal conversion and processes according to the mode.

(2) Image Processing Operation in the Full-Color Mode and the Single-Color Mode (2-1) During Print Process (During an Image Print Job)

Figure 8A:
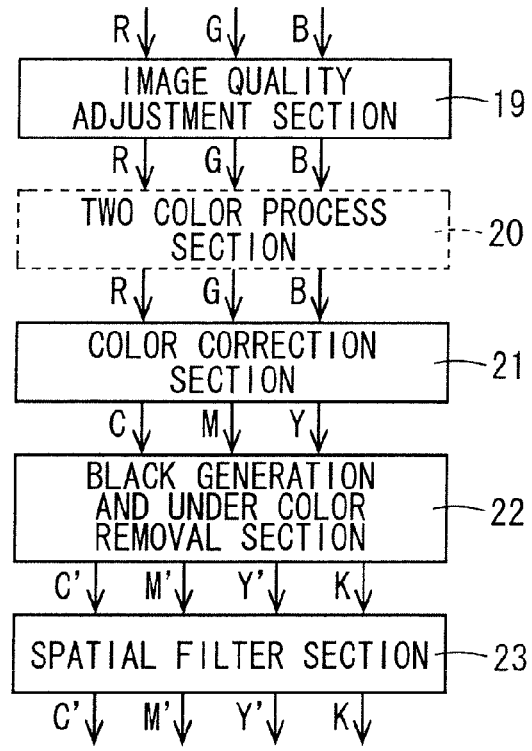
FIGS. 8A and 8B are diagrams illustrating the image processing in a full-color mode and a single-color mode.
Figure 8B:
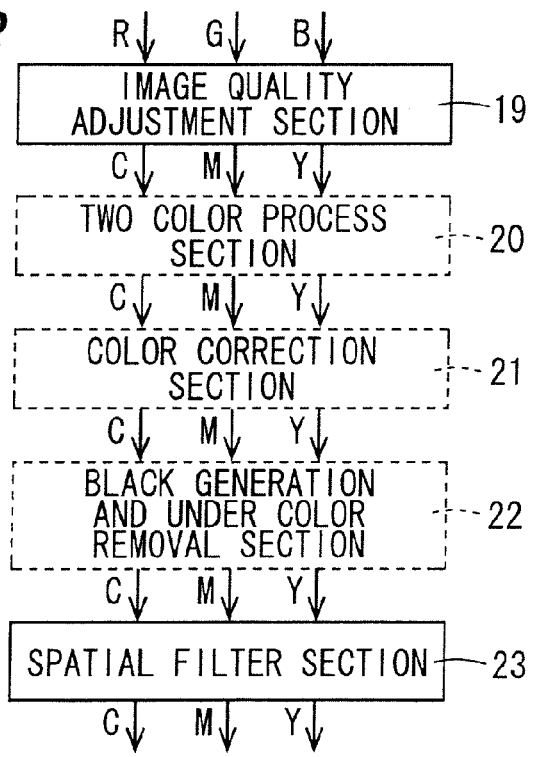

An image processing operation performed by the image processing apparatus 3 when the copier mode and the full-color mode or the copier mode and the single-color mode are designated is explained with reference to FIGS. 8A and 8B. FIGS. 8A and 8B are diagrams for explaining image processing in the full-color mode and the single-color mode. FIG. 8A is a diagram for explaining the image processing in the full-color mode. FIG. 8B is a diagram for explaining the image processing in the single-color mode. In the full-color mode and the single-color mode, in the image processing apparatus 3, processes by the A/D conversion section 10, the shading correction section 11, the input process section 12, the document type automatic discrimination section 13, the segmentation process section 14, the compression section 17, the segmentation class signal compression section 15, the decompression section 18, and the segmentation class signal decompression section 16 are the same as the processes in the two-color mode. Therefore, explanation thereof is omitted below.

First, in the full-color mode, the image quality adjustment section 19 performs detection of a page background and performs page background removal correction concerning the image data of RGB sent from the decompression section 18. The image quality adjustment section 19 performs, based on setting information inputted from the operation panel by the operator (the user), adjustment of balance of RGB (color adjustment and overall color adjustment for a tinge of red and a tinge of blue), brightness, and saturation. Image data outputted from the image quality adjustment section 19 is image data of RGB in the full-color mode.

When the full-color mode is selected, as shown in FIG. 8A, the two color process section 20 directly passes, without applying any process to the image data of RGB outputted from the image quality adjustment section 19, the image data to the color correction section 21.

When the full-color mode is selected, the color correction section 21 performs a color correction process for converting the image data of RGB outputted from the two color process section 20 into image data of CMY and applies a process for improving color reproducibility to the image data. The color correction process is realized by creating an LUT (lookup table) in which input values (RGB) and output values (CMY) are associated with each other and looking up the output values from the created LUT.

When the full-color mode is selected, the black generation and under color removal section 22 performs black generation for generating image data of K (black) from the image data of CMY outputted from the color correction section 21 and subtracts the image data of K (black) from the original image data of CMY to generate image data of C'M'Y' that is new image data of CMY. As explained above, in the full-color mode, the black generation and under color removal section 22 generates the image data of K (black) with respect to the image data of CMY generated by the color correction section 21 and applies the under color removal process to the image data of CMY to generate the image data of C'M'Y'K.

The spatial filter section 23 applies, based on a segmentation class signal, a spatial filter process (edge enhancement process, smoothing process, etc.) by a digital filter to the image data of C'M'Y'K outputted from the black generation and under color removal section 22. In other words, the spatial filter section 23 executes, based on the segmentation class signal, different image processing for each of image areas.

The zoom process section 24 applies, based on a magnification command (information indicating the magnification of a print image) inputted by the operator (the user) from the operation panel, an image expansion and reduction process to the image data of C'M'Y'K outputted from the spatial filter section 23. The output tone correction section 25 applies the output γ correction process for output to a recording material such as a recording sheet to the image data of C'M'Y'K outputted from the zoom process section 24. The halftone generation section 26 applies, using an error diffusion method or a dither method, a tone reproduction process (halftone generation process) necessary for printing an image in the image output apparatus 4 to the image data of C'M'Y'K outputted from the output tone correction section 25. The image data of C'M'Y'K outputted from the halftone generation section 26 is passed to the image output apparatus 4. The image output apparatus 4 prints a two-color image of the image data on the recording sheet.

The image processing operation by the image processing apparatus 3 in the single-color mode is explained with reference to FIG. 8B.

When the single-color mode is selected, the image quality adjustment section 19 performs a process for converting the image data of RGB outputted from the decompression section 18 into image data of CMY that are complementary colors of RGB. The conversion processing from the image data of RGB into the image data of CMY in the single-color mode is executed by using the following conversion formula (8).

$$\begin{pmatrix} C \\ M \\ Y \end{pmatrix} = \begin{pmatrix} r1 \cdot a1 & r1 \cdot a2 & r3 \cdot a3 \\ r2 \cdot a1 & r2 \cdot a2 & r2 \cdot a3 \\ r3 \cdot a1 & r3 \cdot a2 & r3 \cdot a3 \end{pmatrix} \times \begin{pmatrix} R \\ G \\ B \end{pmatrix} + \begin{pmatrix} r1 \cdot c \\ r2 \cdot c \\ r3 \cdot c \end{pmatrix} \quad (8)$$

[In the formula, a1=−0.23046875, a2=−0.79296875, a3=0.0234375, and c=255.]

Conversion coefficients r1 to r3 in the conversion formula (8) are decided based on Table 4.

TABLE 4

| Adjusted plane | | Designated output color | | | | | |
|---|---|---|---|---|---|---|---|
| | | R (red) | G (green) | B (blue) | C (cyan) | M (magenta) | Y (yellow) |
| C (cyan) | r1 | 0 | 1 | 1 | 1 | 0 | 0 |
| M (magenta) | r2 | 1 | 0 | 1 | 0 | 1 | 0 |
| Y (yellow) | r3 | 1 | 1 | 0 | 0 | 0 | 1 |

For example, when the operator (the user) designates C (cyan) as a desired output color in the single-color mode, the image quality adjustment section 19 refers to values of r1 to r3 belonging to a column of "C (cyan)" in Table 4 and selects r1=1, r2=0, and r3=0. When the single-color mode is selected, an output from the image quality adjustment section 19 is image data of CMY.

Adjustment of saturation executed by the image quality adjustment section 19 can be realized by, after changing values of r1 to r3 and a1 to a3 of a matrix of the conversion formula (8), using the matrix. Therefore, concerning the adjustment of saturation and the conversion process for image data in the single-color mode (conversion from RGB to CMY), the matrix can be shared and an image processing circuit can be shared. Therefore, in this embodiment, the adjustment of saturation and the conversion process for image data in the single-color mode are performed by the same process section (the image quality adjustment section).

When the single-color mode is selected, the two color process section 20, the color correction section 21, and the black generation and under color removal section 22 directly pass, without applying any process to the image data of CMY outputted from the image quality adjustment section 19, the image data to the spatial filter section 23 as shown in FIG. 8B.

The zoom process section 24 applies, based on a magnification command (information indicating the magnification of a print image) inputted by the operator (the user) from the operation panel, an image expansion and reduction process to the image data of C'M'Y' outputted from the spatial filter section 23. The output tone correction section 25 applies the output γ correction process for output to a recording material such as a recording sheet to the image data of C'M'Y' outputted from the zoom process section 24. The halftone generation section 26 applies, using the error diffusion method or the dither method, the tone reproduction process (the halftone generation process) necessary for printing an image in the image output apparatus 4 to the image data of C'M'Y' outputted from the output tone correction section 25. The image data of C'M'Y' outputted from the halftone generation section 26 is passed to the image output apparatus 4. The image output apparatus 4 prints a full color image of the image data on the recording sheet.

(2-2) During Preview Display

A preview display operation performed by the image processing apparatus 3 when the copier mode and the full-color mode or the copier mode and the single-color mode are designated is explained with reference to FIGS. 9A and 9B. FIGS. 9A and 9B are diagrams for explaining processes in performing preview display in the full-color mode and the single-color mode. FIG. 9A is a diagram for explaining processes in the full-color mode. FIG. 9B is a diagram for explaining processes in the single-color mode. In the full-color mode and the single-color mode, in the image processing apparatus 3, processes by the A/D conversion section 10, the shading correction section 11, the input process section 12, the document type automatic discrimination section 13, the segmentation process section 14, the compression section 17, the segmentation class signal compression section 15, the decompression section 18, and the segmentation class signal decompression section 16 are the same as the processes in the two-color mode. Therefore, explanation thereof is omitted below.

First, in the full-color mode, the image quality adjustment section 19 performs detection of a page background and performs page background removal correction concerning the image data of RGB sent from the decompression section 18. The image quality adjustment section 19 performs, based on setting information inputted from the operation panel by the operator (the user), adjustment of balance of RGB (color adjustment and overall color adjustment for a tinge of red and a tinge of blue), brightness, and saturation. Image data outputted from the image quality adjustment section 19 is image data of RGB in the full-color mode.

When the full-color mode is selected, as shown in FIG. 9A, the two color process section 20 directly passes, without applying any process to the image data of RGB outputted from the image quality adjustment section 19, the image data to the color correction section 21.

During preview display in the full-color mode, the color correction section 21 performs a process for converting the image data of RGB outputted from the two color process section 20 into image data of R'G'B'. The image data of RGB inputted to the color correction section 21 is data adapted to a color space of the image input apparatus 2 (the scanner). The color correction section 21 performs a process for converting the image data of RGB into image data of R'G'B' adapted to a color space of the image display device 5.

In other words, the color correction section 21 performs a process for converting image data of RGB adapted to an image reading characteristic of the image input apparatus 2 into image data of R'G'B' adapted to the display characteristic of the image display device 5. The process for converting the image data of RGB into the image data of R'G'B' is realized by creating an LUT in which input values (RGB) and output values (R'G'B') are associated with each other and looking up the output values from the created LUT. In this embodiment, in the full-color mode, the image processing circuit is shared in the conversion process from the image data of RGB into the image data of CMYK during the print process and the conversion process from the image data of RGB into the image data of R'G'B' during the preview display.

The black generation and under color removal section 22 directly passes, without applying any process to the image data of R'G'B' outputted from the color correction section 21, the image data to the spatial filter section 23 at the later stage. During the preview display, the spatial filter section 23 applies, based on a segmentation class signal, the spatial filter process (the edge enhancement process, the smoothing process, etc.) by the digital filter to the image data of R'G'B' outputted from the black generation and under color removal section 22. In other words, in the same manner as during the print process, the spatial filter section 23 executes different image processing for each of image areas based on the segmentation class signal.

Processes by the zoom process section 24, the output tone correction section 25, and the halftone generation section 26 at the later stage than the spatial filter section 23 during the preview display in the full-color mode are the same as the processes during the preview display in the two-color mode. Therefore, explanation thereof is omitted.

A preview display operation by the image processing apparatus 3 in the single-color mode is explained with reference to FIG. 9B.

During the preview display in the single-color mode, in the same manner as during the print process in the single-color mode, the image quality adjustment section 19 performs the process for converting the image data of RGB outputted from the decompression section 18 into image data of CMY that are complementary colors of RGB. When the single-color mode is selected, as shown in FIG. 9B, the two color process section 20 directly passes, without applying any process to image data of CMY outputted from the image quality adjustment section 19, the data to the color correction section 21.

During the preview display in the single-color mode, the color correction section 21 performs a process for converting the image data of CMY outputted from the two color process section 20 into image data of R'G'B'. In other words, the color correction section 21 performs a process for converting image data of CMY adapted to the printing characteristic of the print process into image data of R'G'B' adapted to the display characteristic of the image display device 5. The process for converting the image data of CMY into the image data of R'G'B' is realized by creating an LUT in which input values (CMY) and output values (R'G'B') are associated with each other and looking up the output values from the created LUT.

During the preview display, the black generation and under color removal section 22 directly passes, without applying any process to the image data of R'G'B' outputted from the color correction section 21, the image data to the spatial filter section 23 at the later stage. During the preview display, the spatial filter section 23 applies, based on a segmentation class signal, the spatial filter process (the edge enhancement process, the smoothing process, etc.) by a digital filter to the image data of R'G'B' outputted from the black generation and under color removal section 22. In other words, in the same manner as during the print process, the spatial filter section 23 executes different image processing for each of image areas based on the segmentation class signal.

Processes by the zoom process section 24, the output tone correction section 25, and the halftone generation section 26 at the later stage than the spatial filter section 23 during the preview display in the single-color mode are the same as the processes during the preview display in the two-color mode. Therefore, explanation thereof is omitted.

Figure 10:
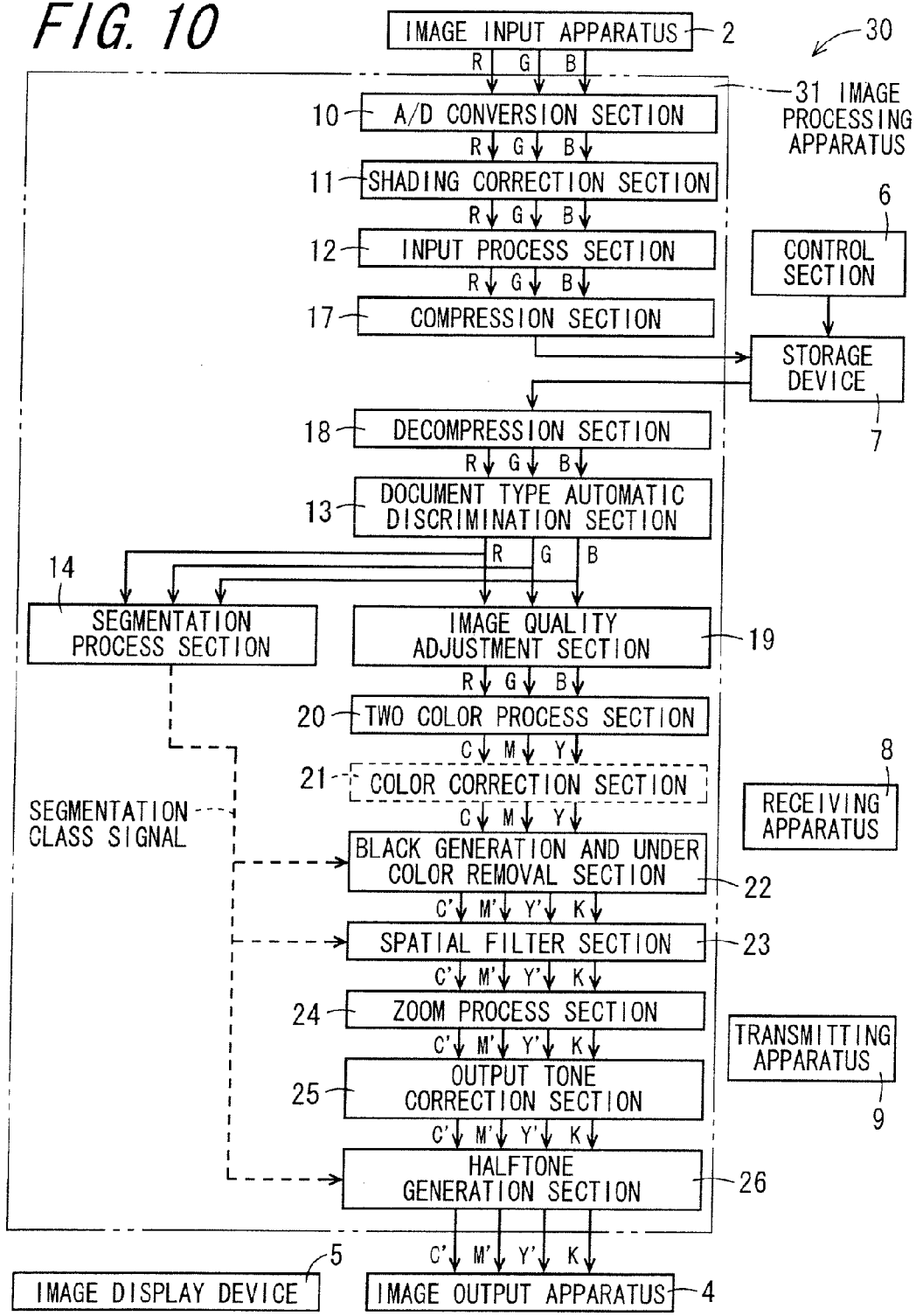
FIG. 10 is a block diagram showing the configuration of an image forming apparatus according to a second embodiment of the invention.

FIG. 10 is a block diagram showing the configuration of an image forming apparatus 30 according to a second embodiment of the invention. The image forming apparatus 30 is similar to the image forming apparatus 1. Components corresponding to those of the image forming apparatus 1 are denoted by the same reference numerals and signs, and explanation thereof is omitted. The image forming apparatus 30 includes an image processing apparatus 31 instead of the image processing apparatus 3 included in the image forming apparatus 1.

Before applying a segmentation process and a document type discrimination process to analog image data of RGB sent from the image input apparatus 2, the image processing apparatus 31 included in the image forming apparatus 30 encodes image data of RGB and temporarily stores the encoded image data of RGB in the storage device 7. The image processing apparatus 31 reads out the encoded image data from the storage device 7, decodes the encoded image data, and applies the document type discrimination process by the document type automatic discrimination section 13 and the segmentation process by the segmentation process section 14 to the decoded image data.

Figure 11:
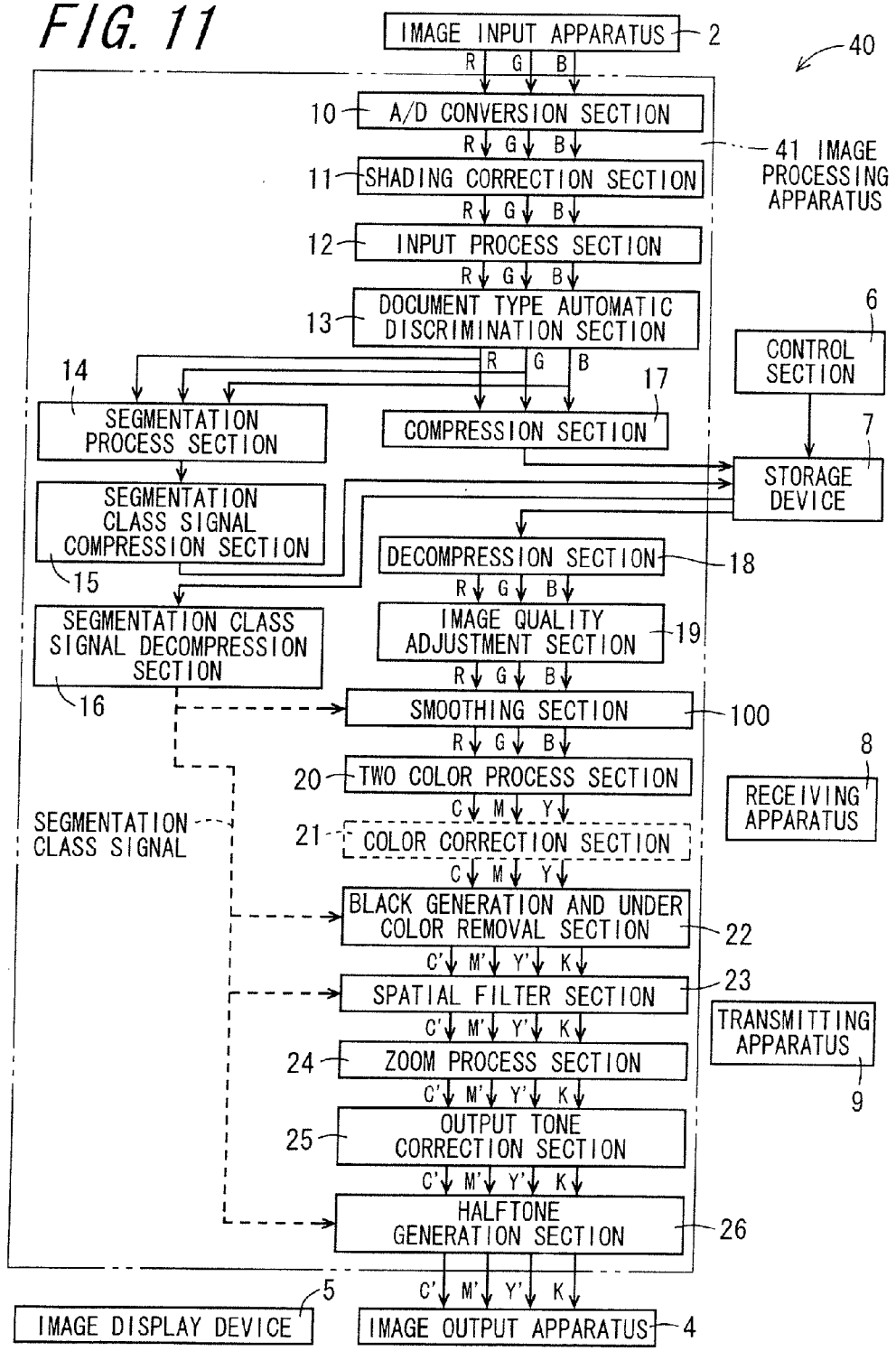
FIG. 11 is a block diagram illustrating the configuration of an image forming apparatus according to a third embodiment of the invention.

FIG. 11 is a block diagram illustrating the configuration of an image forming apparatus 40 according to a third embodiment of the invention. The image forming apparatus 40 is similar to the image forming apparatus 1 mentioned above. Components corresponding to those of the image forming apparatus 1 are denoted by the same reference numerals and signs, and explanation thereof is omitted. The image forming apparatus 40 includes an image processing apparatus 41 instead of the image processing apparatus 3 included in the image forming apparatus 1.

The image processing apparatus 41 according to this embodiment includes blocks of the A/D (Analog/Digital) converter 10, the shading correction section 11, the input process section 12, the document type automatic discrimination section 13, the segmentation process section 14, the compression section 17, the segmentation class signal compression section 15, the decompression section 18, the segmentation class signal decompression section 16, the image quality adjustment section 19, the smoothing section 100, the two color process section 20, the color correction section 21, the black generation and under color removal section 22, the spatial filter section 23, the zoom process section 24, the output tone correction section 25, and the halftone generation section 26.

Although details will be described later, the image processing apparatus 41 includes the smoothing section 100 and the two color process section 20. The two color process section 20 is a two color process section that converts input image data of RGB into image data of CMY which is image data used to form a two-color image containing two colors which are a chromatic color and an achromatic color. The smoothing section 100 is a smoothing section that performs a smoothing process on a predetermined pixel in the image data of RGB before the conversion process in the two color process section 20.

(1) Image Processing Operation in the Two-Color Mode (1-1) During Printing Process (During an Image Print Job)

When the two-color mode is selected, the smoothing section 100 performs the smoothing process on a predetermined pixel in the image data of RGB sent from the image quality adjustment section 19. The details of the smoothing section 100 will be described later.

When the two-color mode is selected, the two color process section 20 performs a process for converting the image data of RGB sent from the smoothing section 100 into image data of CMY (C: cyan, M: magenta, Y: yellow). When the full-color mode is selected, the smoothing section 100 and the two color process section 20 directly pass, without applying any process to the image data of RGB outputted from the image quality adjustment section 19, the image data to the color correction section 21 (i.e., not performed). When the single-color mode is selected, the smoothing section 100 and the two color process section 20 directly pass, without applying any process to the image data of CMY outputted from the image quality adjustment section 19, the image data to the color correction section 21.

(1-2) During Preview Display

Figure 12:
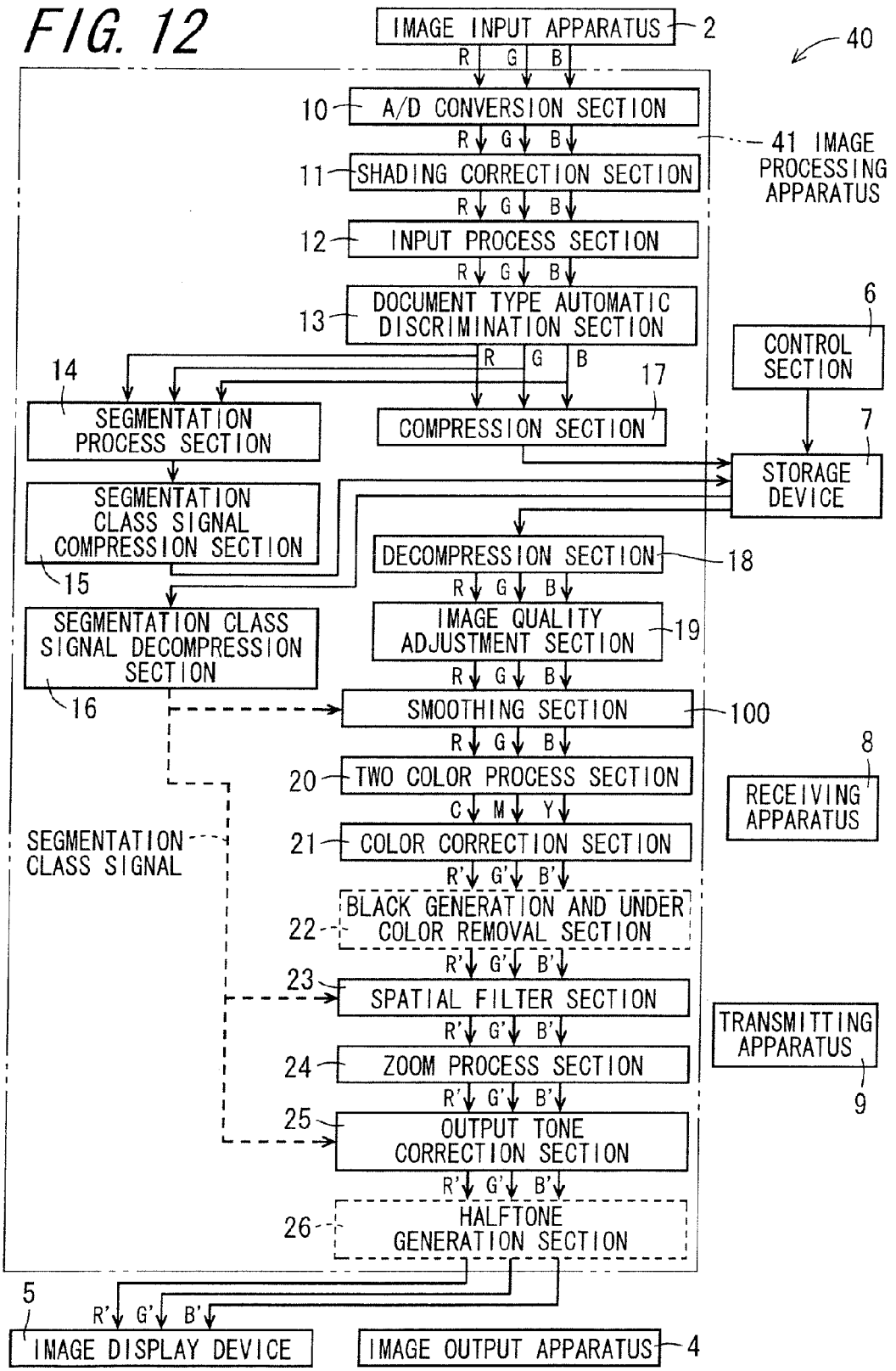
FIG. 12 is a diagram for explaining processes performed when the image forming apparatus displays a preview.

FIG. 12 is a diagram for explaining processes performed when the image forming apparatus 40 displays a preview. A preview display operation performed by the image processing apparatus 41 when the copier mode and the two-color mode are designated is the same as the case of the first embodiment. Therefore, explanation thereof will be omitted.

(2) Image Processing Operation in the Full-Color Mode and the Single-Color Mode (2-1) During Printing Process (During an Image Print Job)

Figure 13B:
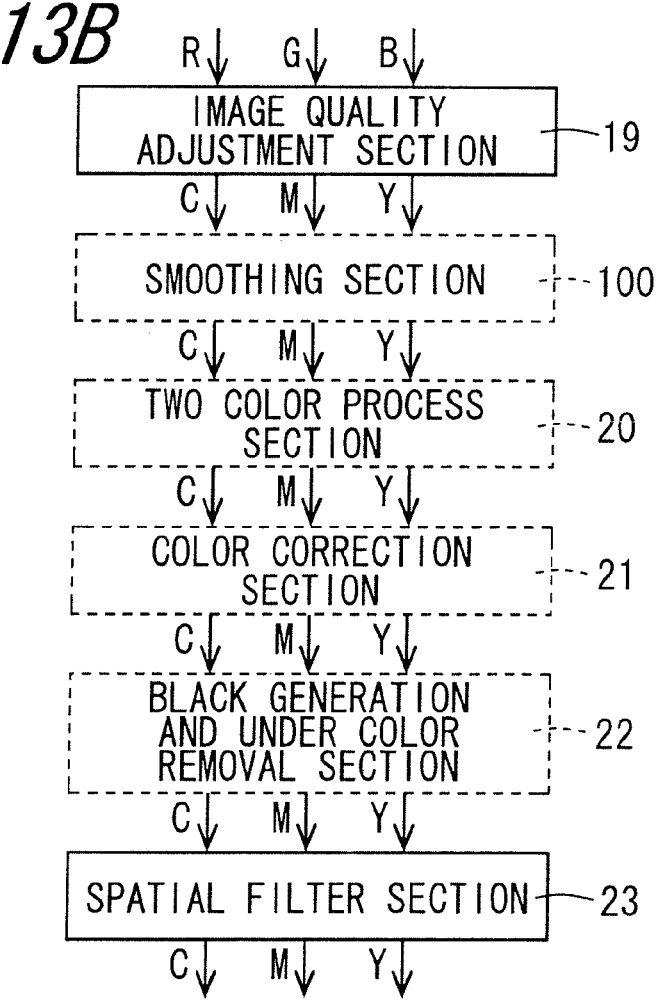

An image processing operation performed by the image processing apparatus 41 when the copier mode and the full-color mode or the copier mode and the single-color mode are designated is explained with reference to FIGS. 13A and 13B. FIGS. 13A and 13B are diagrams for explaining image processing in the full-color mode and the single-color mode. FIG. 13A is a diagram for explaining the image processing in the full-color mode. FIG. 13B is a diagram for explaining the image processing in the single-color mode. In the full-color mode and the single-color mode, in the image processing apparatus 41, processes by the A/D conversion section 10, the shading correction section 11, the input process section 12, the document type automatic discrimination section 13, the segmentation process section 14, the compression section 17, the segmentation class signal compression section 15, the decompression section 18, and the segmentation class signal decompression section 16 are the same as the processes in the two-color mode. Therefore, explanation thereof is omitted below. Further, in this embodiment, processes by the image adjustment section 19, the color correction section 21, the black generation and under color removal section 22 and the spatial filter section 23 in the full-color mode and the single-color mode are the same as the processes illustrated in FIGS. 8A and 8B. Therefore, explanation thereof will be omitted.

When the full-color mode is selected, as shown in FIG. 13A, the smoothing section 100 and the two color process section 20 directly pass, without applying any process to the image data of RGB outputted from the image quality adjustment section 19, the image data to the color correction section 21.

When the single-color mode is selected, the smoothing section 100 and the two color process section 20, the color correction section 21, and the black generation and under color removal section 22 directly pass, without applying any process to the image data of CMY outputted from the image quality adjustment section 19, the image data to the spatial filter section 23 as shown in FIG. 13B.

(2-2) During Preview Display

Figure 14B:
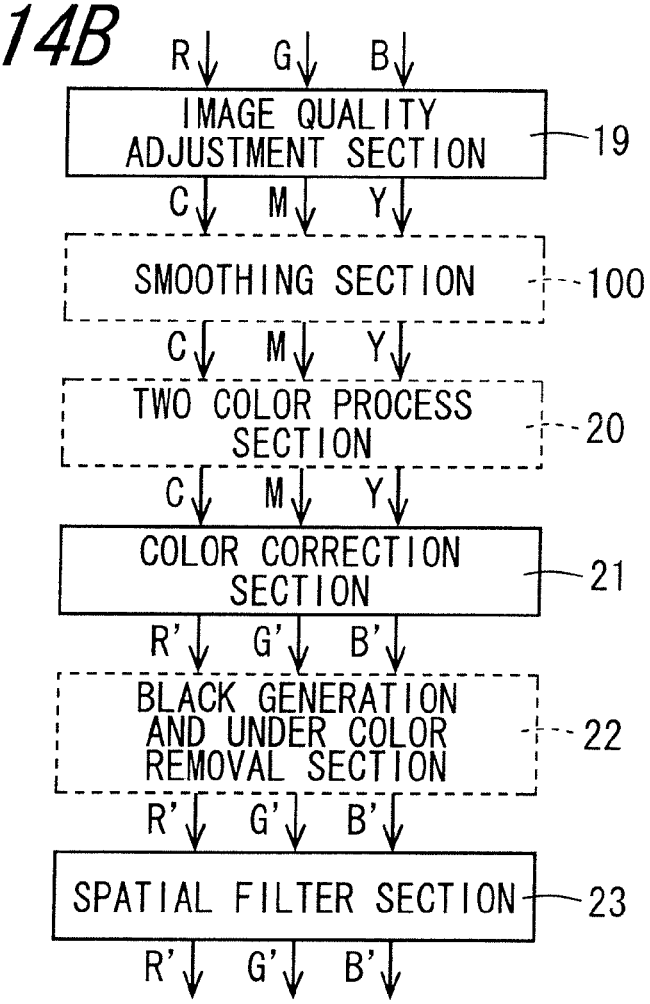

A preview display operation performed by the image processing apparatus 41 when the copier mode and the full-color mode or the copier mode and the single-color mode are designated is explained with reference to FIGS. 14A and 14B. FIGS. 14A and 14B are diagrams for explaining processes in performing preview display in the full-color mode and the single-color mode. FIG. 14A is a diagram for explaining processes in the full-color mode. FIG. 14B is a diagram for explaining processes in the single-color mode. In the full-color mode and the single-color mode, in the image processing apparatus 41, processes by the A/D conversion section 10, the shading correction section 11, the input process section 12, the document type automatic discrimination section 13, the segmentation process section 14, the compression section 17, the segmentation class signal compression section 15, the decompression section 18, and the segmentation class signal decompression section 16 are the same as the processes in the two-color mode. Therefore, explanation thereof is omitted below. Further, in this embodiment, processes by the image adjustment section 19, the color correction section 21, the black generation and under color removal section 22 and the spatial filter section 23 are the same as the processes illustrated in FIGS. 9A and 9B. Therefore, explanation thereof will be omitted.

When the full-color mode is selected, as shown in FIG. 14A, the smoothing section 100 and the two color process section 20 directly passes, without applying any process to the image data of RGB outputted from the image quality adjustment section 19, the image data to the color correction section 21.

During the preview display in the single-color mode, in the same manner as during the print process in the single-color mode, the image quality adjustment section 19 performs the process for converting the image data of RGB outputted from the decompression section 18 into image data of CMY that are complementary colors of RGB. When the single-color mode is selected, as shown in FIG. 14B, the smoothing section 100 and the two color process section 20 directly pass, without applying any process to image data of CMY outputted from the image quality adjustment section 19, the data to the color correction section 21.

The details of the smoothing section 100 which is a feature of the invention will be described below. Hereinafter, it is assumed that the image forming apparatus 40 is in the two-color mode. As described above, the smoothing section 100 performs the smoothing process on a predetermined pixel in the input image data of RGB before the conversion process in the two color process section 20. The image processing apparatus 41 can designate various pixels as the predetermined pixel.

In the image processing apparatus 41, for example, a pixel designated through the use of the operation panel of the image display device 5 by a user (for example, a range can be designated through the use of a touch panel or a range can be designated through the use of a keyboard or a mouse) in the input image data is set as the predetermined pixel on which the smoothing section 100 performs the smoothing process. In this case, when the image forming apparatus 40 is in the two-color mode, the image processing apparatus 41 displays an image based on the input image data on the image display device 5. The image processing apparatus 41 can set all the pixels in a predetermined range designated by the user as the predetermined pixel on which the smoothing section 100 performs the smoothing process. Accordingly, the user can designate any part of the image displayed on the image display device 5 as the predetermined pixel on which the smoothing section 100 performs the smoothing process.

The smoothing section 100 performs the smoothing process on the pixel designated as the predetermined pixel. The smoothing section 100 performs the smoothing process using smoothing filters such as a smoothing filter F1 and a smoothing filter F2 shown in FIGS. 15A and 15B.

FIGS. 15A and 15B are diagrams illustrating the smoothing filter F1 and the smoothing filter F2. In FIGS. 15A and 15B, the numerical values in the matrix represent filter coefficients. The smoothing filter F1 and the smoothing filter F2 employ a weight-averaging filter configured so that the filter coefficient closer to the center of the matrix have a larger value and the filter coefficient closer to the edge of the matrix has a smaller value, but may employ other smoothing filters.

The smoothing section 100 performs the smoothing process by applying the smoothing filters such as the smoothing filter F1 and the smoothing filter F2 to the input image data. More specifically, the smoothing section 100 performs the smoothing process, for example, using the following method of (K1) to (K7).

(K1) The entire pixels in the input image data is selected a pixel of interest one by one.

(K2) When the pixel of interest is a predetermined pixel on which the smoothing section 100 performs the smoothing process, processes of (K3) to (K6) are performed.

(K3) The pixel of interest is correlated with the center filter coefficient of the smoothing filter (for example, the smoothing filter F1) and the peripheral pixels of the pixel of interest in the input image data are correlated with the peripheral filter coefficients of the smoothing filter.

(K4) Products of the filter coefficients and the R density values of the pixels located at the corresponding positions are calculated.

(K5) A value is calculated by dividing the total value of the calculated values by the total value of the filter coefficients. The G density value and the B density value are similarly calculated.

(K6) The values calculated on the R density value, the G density value, and the B density value are set as the R density value, the G density value, and the B density value of the pixel having the same coordinate as the pixel of interest in the image data having been subjected to the smoothing process, respectively.

(K7) When the pixel of interest is not the predetermined pixel on which the smoothing section 100 performs the smoothing process, the R density value, the G density value, and the B density value of the pixel of interest are set as the R density value, the G density value, and the B density value of the pixel of interest of the pixel having the same coordinate as the pixel of interest in the image data having been subjected to the smoothing process.

The image data having been subjected to the smoothing process by the smoothing section 100 is outputted to the two color process section 20. The two color process section 20 determines the chroma value of each pixel constituting the image data of RGB inputted from the smoothing section 100, as described above. The two color process section 20 converts the input image data of RGB into image data of CMY, which is image data (two-color printing image data) for forming a two-color image containing two colors which are a chromatic color and an achromatic color, based on the determined chroma values. The two-color printing image data prepared by the two color process section 20 is outputted to the black generation and under color removal section 22 as described above.

In the image processing apparatus 41 having the above-mentioned configuration, a user can designate a pixel constituting gray data in the input image data as the predetermined pixel on which the smoothing section 100 performs the smoothing process. Therefore, when the gray data is composite gray data, it is possible to add the information on the colors of the pixels around the pixel of interest to the pixel of interest and averages the pixel of interest, by smoothing the pixel of interest in the composite gray data by the use of the smoothing section 100.

In this way, by smoothing (averaging) the pixels constituting the composite gray data, the two color process section 20 can easily determine the pixels constituting the composite gray data as the achromatic color. In the image processing apparatus according to the related art, the input image data is converted into the two-color printing image data in the state where the halftone-area pixels of the chromatic color constituting the composite gray data are determined as the chromatic color and thus the composite gray image is converted into an image in which the chromatic color and the achromatic color coexist. However, the image processing apparatus 41 can prevent such a problem. Therefore, the image processing apparatus 41 can convert the image data containing the composite gray data into the two-color printing image data which can form a gray image with high image quality.

Figure 16:
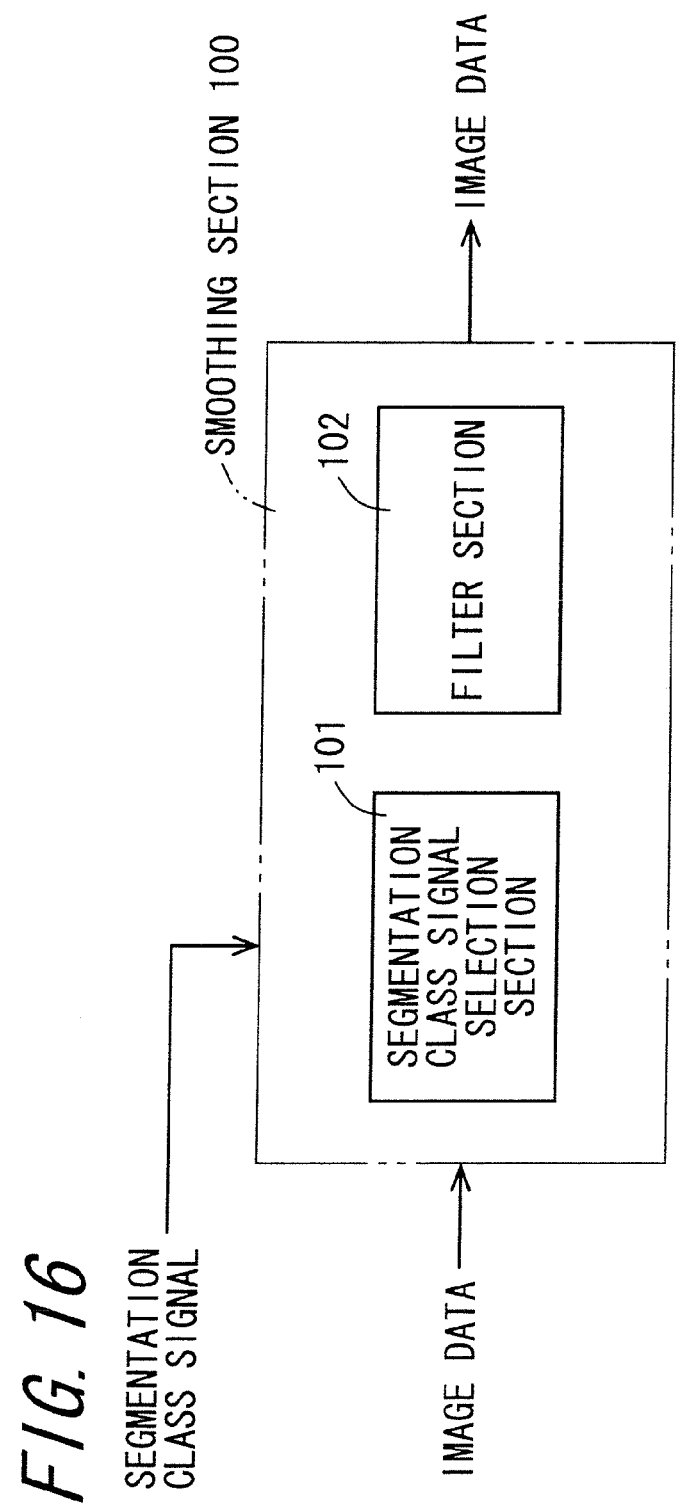
FIG. 16 is a block diagram illustrating the configuration of a smoothing section.

The image processing apparatus 41 is preferably constructed so as not to set the pixel designated by a user as the predetermined pixel on which the smoothing section 100 performs the smoothing process but to set a halftone-area pixel in the input image data as the predetermined pixel. For example, as shown in FIG. 16, the smoothing section 100 includes a segmentation class signal selection section 101 and a filter section 102, and smoothes the halftone-area pixels in the input image data based on the segmentation process result outputted from the segmentation process section 14. At this time, the segmentation process section 14 serves as a halftone determination section that determines whether a pixel in the image data is a halftone-area pixel before the conversion process in the two color process section 20.

The segmentation process section 14 performs the segmentation process using a segmentation method described in Japanese Unexamined Patent Publication JP-A 2002-232708. The segmentation method described in JP-A 2002-232708 is the same as the following method of (L1) to (L9).

(L1) The minimum density value and the maximum density value of a n×m (for example, 7 pixels×15 pixels) pixel block including the pixel of interest in the image data are calculated for each color component of RGB. The following steps of (L2) to (L8) are performed for each color component of RGB.

(L2) The maximum density difference is calculated using the minimum density value and the maximum density value calculated in (L1).

(L3) A total density busyness (for example, the total sum of the values calculated on neighboring pixels in a main scanning direction and a sub scanning direction) which is the total sum of absolute values of the density differences between the density value of the pixel of interest and the pixels around the pixel of interest is calculated.

(L4) The maximum density difference calculated in (L2) is compared with a predetermined maximum density threshold and the total density busyness calculated in (L3) is compared with a predetermined total density busyness threshold.

(L5) When the following conditions of "the maximum density difference<the maximum density difference threshold" and "the total density busyness<the total density busyness threshold" are satisfied, the pixel of interest is determined as belonging to a page background and photograph (continuous tone) area.

(L6) When the conditions of (L5) are not satisfied, the pixel of interest is determined as belonging to a text and halftone area.

(L7) When the pixel of interest determined as belonging to the page background and photograph area satisfies the condition of "the maximum density difference<a predetermined page background and photograph determination threshold", the pixel of interest is classified as a page background-area pixel. When the condition is not satisfied, the pixel of interest is classified as a photograph-area pixel.

(L8) When the pixel of interest determined as belonging to the text and halftone area satisfies the condition of "the total density busyness<(the maximum density difference×a predetermined text and halftone determination threshold)", the pixel of interest is classified as a text-area pixel. When this condition is not satisfied, the pixel of interest is classified as the halftone-area pixel.

(L9) After performing the segmentation process for each color component of RGB like (L1) to (L8), the area of the pixel of interest is determined based on the result of the segmentation process for each color component and a predetermined priority. The priority at the time of determining the area is set to, for example, the order of (M1) halftone, (M2) text, (M3) photograph, and (M4) page background. In this setting, for example, when the R component is a halftone-area pixel, the G component is a text-area pixel, and the B component is a page background-area pixel, one pixel of interest having been subjected to the segmentation process is determined as a halftone-area pixel.

The smoothing section 100 may not be configured to perform the smoothing process with reference to the result of the segmentation process, but may be configured to set all the pixels in the input image data as the predetermined pixel. In this case, the image processing apparatus 41 sets all the pixels in the input image data as the predetermined pixel on which the smoothing section 100 performs the smoothing process, when the image forming apparatus 40 is in the two-color mode and the document type of the original document read by the image input apparatus 2 is an original document (halftone document) comprising a printed-picture. The image processing apparatus 41 may be configured to set the document type of the original document read by the image input apparatus 2 to the document type designated through the use of the operation panel of the image display device 5 by the user, or may be configured to set the document type to the determination result in the document type automatic discrimination section 13. The document type automatic discrimination section 13 performs the segmentation using the same method as performed by the segmentation process section 14 and determines the document type using the segmentation result. In this case, it is sufficient if the document type can be determined. Accordingly, all the pixels are not used to determine the document type, but the determination of the document type is performed by sampling the pixels (sampling the segmentation result). Alternatively, the pixels having features around the threshold may be excluded at the time of the segmentation and the pixels of which the segmentation can be performed certainly may be selected to determine the document type.

The document type automatic discrimination section 13 stores the result of the segmentation process, the number of pixels determined as the page background-area pixel, the number of pixels determined as the text-area pixel, the number of pixels determined as the halftone-area pixel, and the number of pixels determined as the photograph-area pixel. The document type automatic discrimination section 13 determines the document type based on the stored numbers of pixels and a predetermined determination threshold. More specifically, the document type automatic discrimination section 13 determines the document type based on the following criteria of (N1) to (N5).

(N1) The image data in which the number of text-area pixels is 30% or more of the total number of pixels, the number of halftone-area pixels is less than 20% of the total number of pixels, and the number of photograph-area pixels is less than 10% of the total number of pixels is determined as a text document.

(N2) The image data in which the number of text-area pixels is less than 30% of the total number of pixels, the number of halftone-area pixels is 20% or more of the total number of pixels, and the number of photograph-area pixels is less than 10% of the total number of pixels is determined as a halftone document.

(N3) The image data in which the number of text-area pixels is less than 30% of the total number of pixels, the number of halftone-area pixels is less than 20% of the total number of pixels, and the number of photograph-area pixels is 10% or more of the total number of pixels is determined as a photograph document.

(N4) The image data in which the number of text-area pixels is 30% or more of the total number of pixels, the number of halftone-area pixels is 20% more of the total number of pixels, and the number of photograph-area pixels is less than 10% of the total number of pixels is determined as a text/halftone document.

(N5) The image data in which the number of text-area pixels is 30% or more of the total number of pixels, the number of halftone-area pixels is less than 20% of the total number of pixels, and the number of photograph-area pixels is 10% or more of the total number of pixels is determined as a text/photograph document.

When the document type determined in this way by the document type automatic discrimination section 13 is the halftone document, or when a user instructs that the document type is the halftone document, the smoothing section 100 performs the smoothing process on all the pixels in the input image data. As described above, the smoothing section 100 performs the smoothing process using the smoothing filter such as the smoothing filter F1 and the smoothing filter F2. The image data having been subjected to the smoothing process by the smoothing section 100 is inputted to the two color process section 20.

In this way, the image processing apparatus 41 performs the smoothing process on all the pixels in the input image data when the document type is the halftone document. When the gray image of the halftone document includes a composite gray image, it is possible to smooth the composite gray data in the input image data by performing the smoothing process on all the pixels in the input image data, without a user's designating the gray image area.

Accordingly, as described above, it is possible to average the pixels constituting the composite gray data. Therefore, it is possible to suppress the composite gray image from being converted into an image in which a chromatic color and an achromatic color coexist. As a result, it is possible to convert the image data containing composite gray data into two-color printing image data for forming a graph image with high image quality, without a user's designating the graph image area.

FIG. 16 is a block diagram illustrating the configuration of the smoothing section 100. The segmentation class signal selection section 101 selects all the pixels as the pixel of interest one by one. The result of the segmentation process outputted from the segmentation process section 14 is inputted to the segmentation class signal selection section 101 through the segmentation class signal decompression section 16. When the pixel of interest is a halftone-area pixel, the segmentation class signal selection section 101 determines the pixel of interest as the predetermined pixel on which the smoothing section 100 performs the smoothing process and outputs the coordinate of the pixel of interest to the filter section 102. When the pixel of interest is not a halftone-area pixel, the segmentation class signal selection section 101 sets the R, G, and B density values of the pixel of interest as the R, G, and B density values of the pixel having the same coordinate as the pixel of interest in the image data having been subjected to the smoothing process by the smoothing section 100.

The filter section 102 stores the smoothing filter such as the smoothing filter F1 or the smoothing filter F2. Based on the coordinate of the pixel of interest inputted from the segmentation class signal selection section 101 and the input image data inputted to the smoothing section 100, the filter section 102 performs the smoothing process on the pixel of interest of which the coordinate is inputted, using the smoothing filter as described above. The filter section 102 sets the R, G, and B density values acquired by the smoothing process as the R, G, and B density values of the pixel having the same coordinate as the pixel of interest in the image data having been subjected to the smoothing process.

Figure 17:
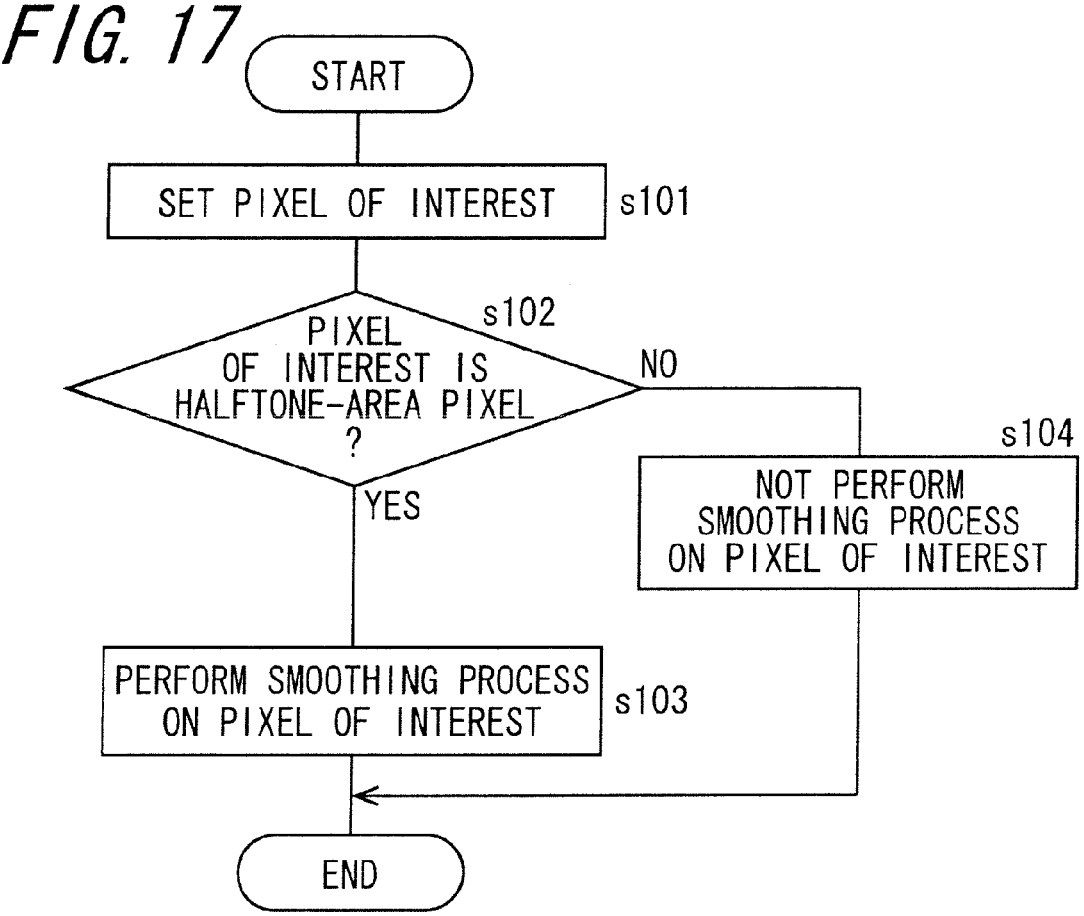
FIG. 17 is a flowchart illustrating processes on one pixel of interest in the smoothing section.

FIG. 17 is a flowchart illustrating processes on one pixel of interest in the smoothing section 100. First, the segmentation class signal selection section 101 sets a pixel in the input image data as the pixel of interest (step s101). Then, the segmentation class signal selection section 101 determines whether the pixel of interest is a halftone-area pixel (step s102). When it is determined in step s102 that the pixel of interest is a halftone-area pixel, the segmentation class signal selection section 101 outputs the coordinate of the pixel of interest to the filter section 102. The filter section 102 performs the smoothing process on the pixel of interest based on the coordinate of the pixel of interest inputted from the segmentation class signal selection section 101 and sets the R, G, and B density values acquired by the smoothing process as the R, G, and B density values of the pixel having the same coordinate as the pixel of interest in the image data having been subjected to the smoothing process (step s103). When it is determined in step s102 that the pixel of interest is not a halftone-area pixel, the filter section 102 does not perform the smoothing process on the pixel of interest and the segmentation class signal selection section 101 sets the R, G, and B density values of the pixel of interest as the R, G, and B density values of the pixel having the same coordinate as the pixel of interest in the image data having been subjected to the smoothing process by the smoothing section 100 (step s104). The smoothing section 100 ends the processes on one pixel of interest after the process of step s103 or s104 is finished.

The smoothing section 100 performs the process for one pixel of interest on all the pixels in the input image data and smoothes the halftone-area pixels in the input image data. Accordingly, the smoothing section 100 prepares image data in which the halftone-area pixels in the input image data are subjected to the smoothing process. The image data prepared by the smoothing section 100 is inputted to the two color process section 20.

In this way, in the image processing apparatus 41, the smoothing section 100 performs the smoothing process on the halftone-area pixels in the input image data using the result of the segmentation process outputted from the segmentation process section 14. Since the composite gray data is a set of the halftone-area pixels including a plurality of chromatic colors, the image processing apparatus 41 can smooth the composite gray data in the input image data without a user's designating the gray image area. Since the image processing apparatus 41 does not perform the smoothing process on all the pixels in the input image data, it is possible to smooth the composite gray data without making the text area or the continuous tone image area blur.

Accordingly, it is possible to average the pixels constituting the composite gray data as described above. Therefore, it is possible to suppress the composite gray image from being converted into an image in which chromatic colors and achromatic colors coexist. As a result, it is possible to convert the image data containing the composite gray data into the two-color printing image data which can form a gray image with high image quality, without a user's designating the gray image area.

In this way, the image processing apparatus 41 prepares the two-color printing image data for forming a gray image with high image quality using the image processing method comprising the smoothing step of performing the smoothing process on a predetermined pixel in the input image data of RGB and the two color process step of converting the image data smoothed in the smoothing step into the image data of CMY which is image data (two-color printing image data) for forming a two-color image containing two colors which are a chromatic color and an achromatic color.

The image processing apparatus 41 may store the smoothing filter F1 or the smoothing filter F2 as the smoothing filter used in the smoothing process of the smoothing section 100. The smoothing filter F1 is different from the smoothing filter F2 in the size of the matrix of the smoothing filter. As shown in FIG. 15A, the smoothing filter F1 has a relatively small filter size and is applied to a narrow range around the pixel of interest. By performing the smoothing process using the smoothing filter F1, it is possible to smooth an image with increased clearness.

As shown in FIG. 15B, the smoothing filter F2 has a relatively large filter size and is applied to a wide range around the pixel of interest. By performing the smoothing process using the smoothing filter F2, it is possible to smooth an image with higher smoothness. That is, the smoothing filter F2 has a strength of smoothing (smoothing strength) higher than that of the smoothing filter F1.

In the image processing apparatus 41, the smoothing section 100 may be configured to change the strength of smoothing when an instruction signal instructing to change the strength of smoothing is inputted from the outside of the image processing apparatus 41 (for example, when an instruction instructing to change the strength of smoothing is inputted through the operation panel of the image display device 5 by the user). For example, the smoothing section 100 may store both the smoothing filter F1 and the smoothing filter F2, may perform the smoothing process using the smoothing filter F1 when no instruction is inputted by the user, and may perform the smoothing process using the smoothing filter F2 when an instruction to increase the strength of smoothing is inputted by the user. For example, before the smoothing process in the smoothing section 100, the image processing apparatus 41 may be configured to display indications of "smooth" and "strong smooth" on the image display device 5 to urge the user to select the strength of smoothing. When the indication of "smooth" is pressed by the user, the image processing apparatus 41 causes the smoothing section 100 to perform the smoothing process using the smoothing filter F1 having a relatively low strength of smoothing. When the indication of "strong smooth" is pressed by the user, the image processing apparatus 41 causes the smoothing section 100 to perform the smoothing process using the smoothing filter F2 having a relatively high strength of smoothing.

The process of the smoothing section 100 in the image processing apparatus 41 in which the smoothing filter can be selected externally in this way will be described below. Here, it is assumed that the smoothing section 100 includes the segmentation class signal selection section 101 and the filter section 102 so as to perform the smoothing process on the halftone-area pixels using the result of the segmentation process in the document type automatic discrimination section 13. It is also assumed that the filter section 102 stores the smoothing filter F1 and the smoothing filter F2.

Figure 18:
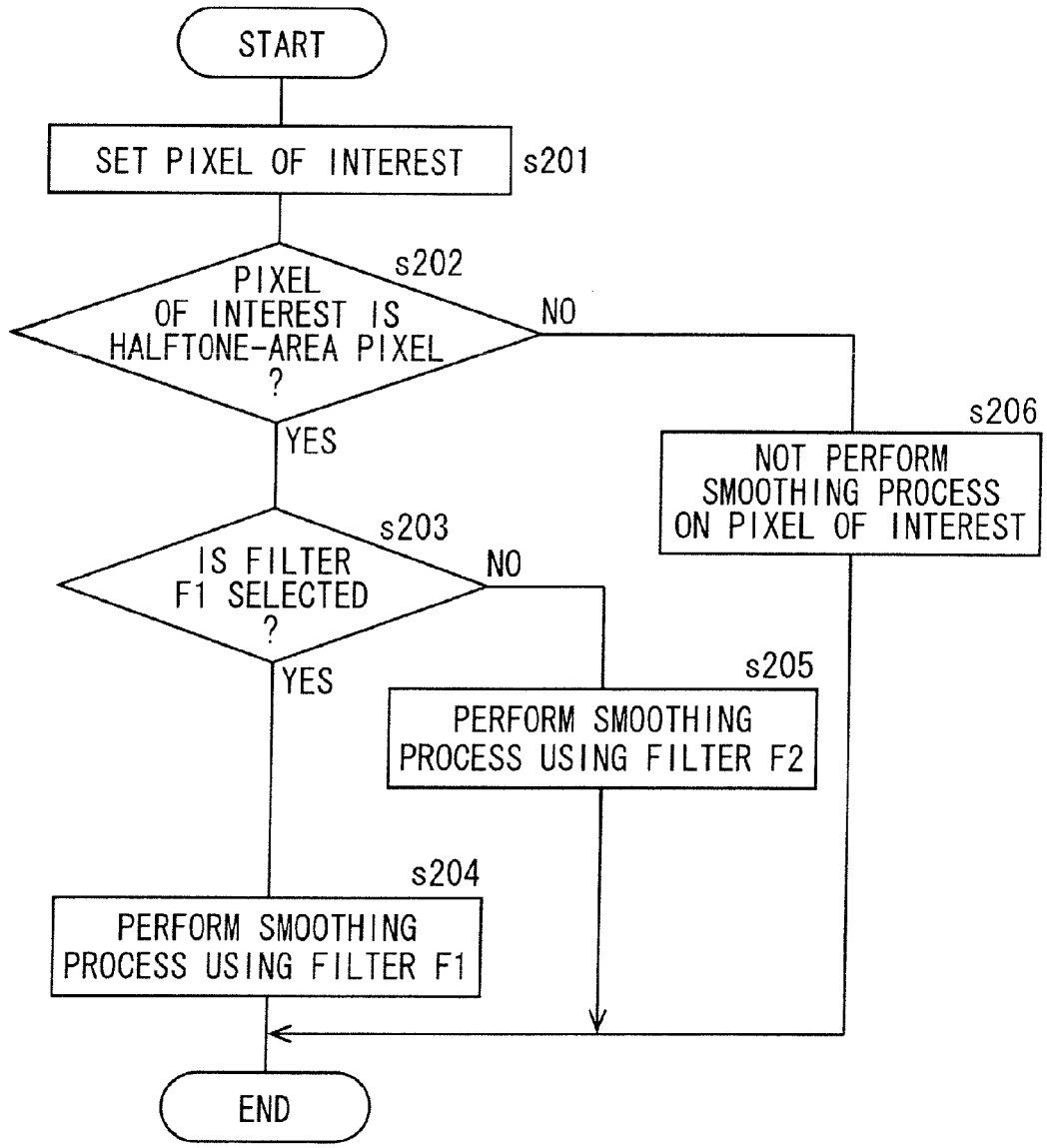
FIG. 18 is a flowchart illustrating processes on one pixel of interest in the smoothing section when the smoothing filter can be selected.

FIG. 18 is a flowchart illustrating processes on one pixel of interest in the smoothing section 100 when the smoothing filter can be selected. First, the segmentation class signal selection section 101 sets one pixel in the input image data as the pixel of interest (step s201). Then, the segmentation class signal selection section 101 determines whether the pixel of interest is a halftone-area pixel (step s202). When it is determined in step s202 that the pixel of interest is a halftone-area pixel, the segmentation class signal selection section 101 outputs the coordinate of the pixel of interest to the filter section 102.

The filter section 102 determines whether the smoothing filter selected by a user is the smoothing filter F1 or the smoothing filter F2 (step s203). When it is determined in step s203 that the smoothing filter selected by the user is the smoothing filter F1, the filter section 102 performs the smoothing process on the pixel of interest using the smoothing filter F1 based on the coordinate of the pixel of interest inputted from the segmentation class signal selection section 101 and sets the R, G, and B density values acquired in the smoothing process as the R, G, and B density values of the pixel having the same coordinate as the pixel of interest in the image data having been subjected to the smoothing process (step s204). When it is determined in step s203 that the smoothing filter selected by the user is the smoothing filter F2, the filter section 102 performs the smoothing process using the smoothing filter F2 based on the coordinate of the pixel of interest inputted from the segmentation class signal selection section 101 and sets the R, G, and B density values acquired in the smoothing process as the R, G, and B density values of the pixel having the same coordinate as the pixel of interest in the image data having been subjected to the smoothing process (step s205).

When it is determined in step s202 that the pixel of interest is not a halftone-area pixel, the filter section 102 does not perform the smoothing process on the pixel of interest and the segmentation class signal selection section 101 sets the R, G, and B density values of the pixel of interest as the R, G, and B density values of the pixel having the same coordinate as the pixel of interest in the image data having been subjected to the smoothing process by the smoothing section 100 (step s206). The smoothing section 100 ends the processes on one pixel of interest when the process of step s204, s205 or s206 is finished.

By constructing the image processing apparatus 41 in this way, the user can select the smoothing filter to be used in the smoothing process in the smoothing section 100. The smoothing filters F1 and F2 are only examples of the smoothing filter and the smoothing section 100 may employ other smoothing filters.

In addition, the image processing apparatus 41 may be configured to allow a user to select whether the image data should be outputted while viewing a preview when the selected smoothing filter is used. For example, the image processing apparatus 41 displays a preview when the smoothing section 100 performs the smoothing process using the smoothing filter selected by the user on the image display device 5. The user can select any of allowed output and inhibited output through the use of the operation panel of the image display device 5 while viewing the preview displayed on the image display device 5. At this time, the user may display an enlarged image obtained by partially enlarging the preview on the image display device 5 by operating the operation panel. The image processing apparatus 41 outputs the image data to the image output apparatus 4 only when the user selects the allowed output.

According to the image processing apparatus 41 thus configured, it is possible to select whether the image data should be outputted or not while viewing a preview when the selected smoothing filter is used. Accordingly, the user can select a proper smoothing filter to cause the smoothing section 100 to perform the smoothing process and to output the two-color printing image data for forming a gray image with higher image quality.

Figure 19:
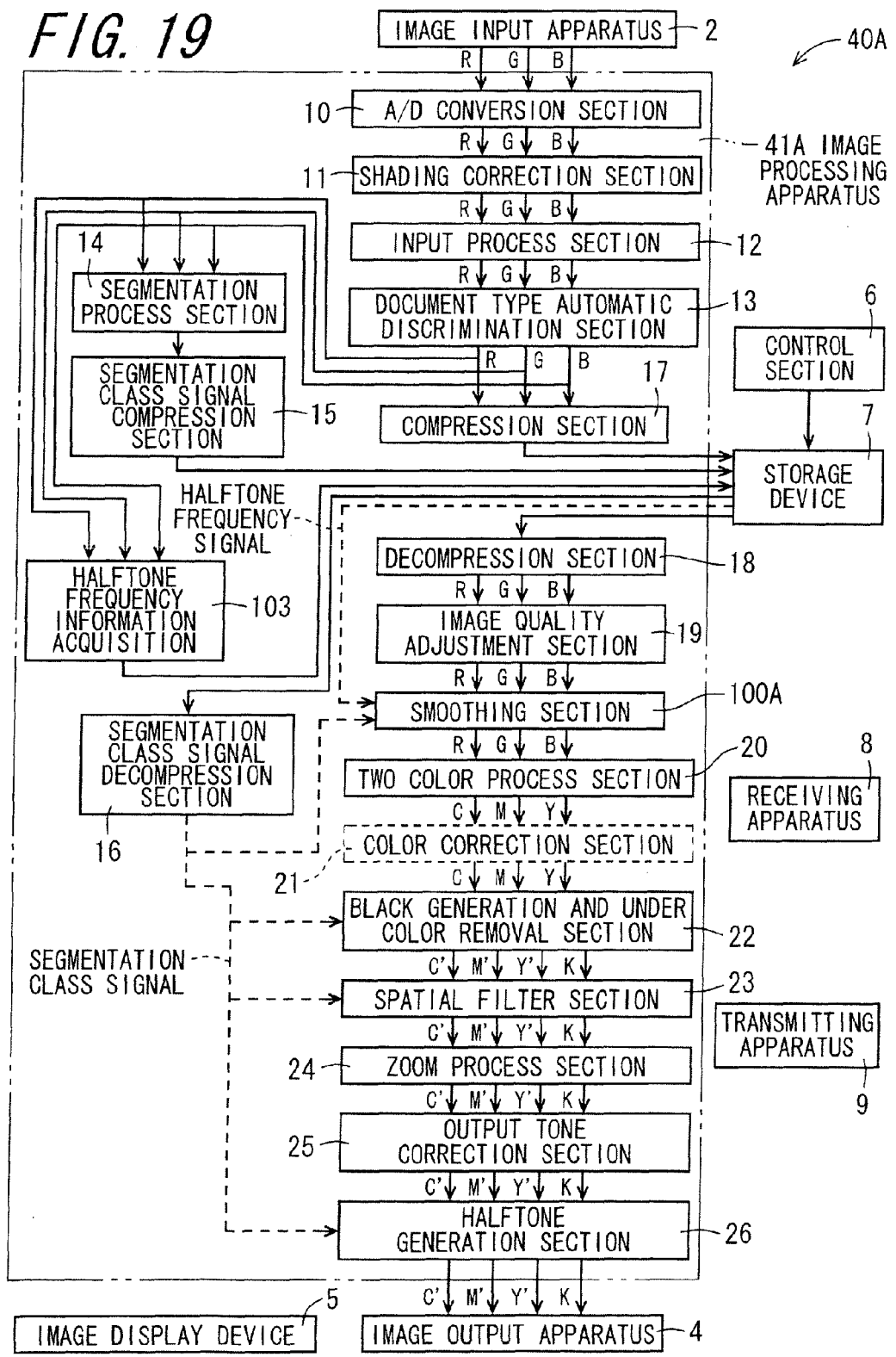
FIG. 19 is a block diagram illustrating the configuration of an image forming apparatus according to a fourth embodiment of the invention.

An image processing apparatus 41A included in an image forming apparatus 40A according to a fourth embodiment of the invention will be described below. FIG. 19 is a block diagram illustrating the configuration of the image forming apparatus 40A according to the fourth embodiment of the invention. The image forming apparatus 40A is similar to the image forming apparatus 40 mentioned above. Components corresponding to those of the image forming apparatus 40 are denoted by the same reference numerals and signs, and explanation thereof is omitted. The image forming apparatus 40A includes an image processing apparatus 41A instead of the image processing apparatus 41 included in the image forming apparatus 40.

The image processing apparatus 41A has the same configuration as the image processing apparatus 41, except that it includes the smoothing section 100A instead of the smoothing section 100 and further includes a halftone frequency information acquisition section 103. The halftone frequency information acquisition section 103 is a halftone frequency information acquisition section that acquires information on the halftone frequency (halftone frequency information) of a predetermined pixel on which the smoothing section 100A performs the smoothing process. The "halftone frequency" means a density of halftone dots at the time of forming an image and means the "halftone frequency in a predetermined range centered on a predetermined pixel" when a "halftone frequency of a predetermined pixel" is described in the invention.

The image processing apparatus 41A is configured so that the smoothing section 100A changes the strength of smoothing based on the halftone frequency information acquired by the halftone frequency information acquisition section 103 to perform the smoothing process. That is, while the image processing apparatus 41 included in the image forming apparatus 40 according to the third embodiment of the invention is an image processing apparatus in which the smoothing section 100 performs the smoothing process using the smoothing filter selected by a user, the image processing apparatus 41A included in the image forming apparatus 40A according to the fourth embodiment is an image processing apparatus in which the smoothing section 100A selects the smoothing filter used to the smoothing process based on the halftone frequency information from the halftone frequency information acquisition section 103.

For example, the image processing apparatus 41A is configured so that the halftone frequency information acquisition section 103 acquires the halftone frequency information of a halftone-area pixel in the image data using the segmentation class signal from the document type automatic discrimination section 13 and the smoothing section 100A sets the halftone-area pixel as the predetermined pixel to be smoothed and selects the smoothing filter to be used in the smoothing process based on the halftone frequency information. In this case, the image processing apparatus 41A includes the halftone frequency information acquisition section 103 in addition to the configuration of the image processing apparatus 41 and includes the smoothing section 100A shown in FIG. 20 instead of the smoothing section 100.

FIG. 20 is a block diagram illustrating the configuration of the smoothing section 100A. The smoothing section 100A includes a segmentation class signal selection section 101, a halftone frequency signal selection section 104, a high frequency halftone filter section 102A storing a smoothing filter F1, and a low frequency halftone filter section 102B storing a smoothing filter F2. The segmentation class signal selection section 101 is the same as that included in the smoothing section 100.

The halftone frequency information acquisition section 103 acquires the halftone frequency information of a predetermined pixel and outputs the acquired halftone frequency information to the storage device 7. In this embodiment, the predetermined pixel of which the halftone frequency information should be acquired is a halftone-area pixel. The halftone frequency information is, for example, the halftone frequency of the predetermined pixel or information on whether the halftone frequency of the predetermined pixel is equal to or greater than a predetermined threshold. In this embodiment, the halftone frequency information is information on whether the halftone frequency of a halftone-area pixel is equal to or greater than a predetermined threshold.

The halftone frequency information acquisition section 103 determines whether the halftone frequency of the halftone-area pixel as a pixel of interest is equal to or greater than a predetermined threshold (whether the halftone frequency is high or low).

The smoothing section 100A performs the smoothing process based on information (segmentation class signal), which is inputted to the segmentation class signal selection section 101, on whether the pixel of interest is a halftone-area pixel, information, which is inputted to the halftone frequency signal selection section 104, on whether the pixel of interest is a pixel in composite gray data, and information (halftone frequency signal) on whether the halftone frequency of the pixel of interest is high or low. The smoothing section 100A performs the smoothing process on the pixel of interest with a high frequency halftone as the halftone-area pixel using the smoothing filter F1 stored in the high frequency halftone filter section 102A. The smoothing section 100A performs the smoothing process on the pixel of interest without a high frequency halftone (that is, with a low frequency halftone) as the halftone-area pixel using the smoothing filter F2 stored in the low frequency halftone filter section 102B. The smoothing section 100A does not perform the smoothing process on the pixel of interest which is not a halftone-area pixel. The details of the smoothing section 100A will be described later.

The halftone frequency information acquisition process in the halftone frequency information acquisition section 103 roughly includes the following processes of (O1) to (O4).

(O1) The R density values of the pixels in a predetermined range including the pixel of interest in the image data (input image data of RGB) in a real space are subjected to the discrete Fourier transformation, whereby data (intensity spectrum data) indicating the intensities of the blocks in the frequency space is obtained.

(O2) The averages of the intensities of the blocks in two areas in the frequency space are calculated.

(O3) The averages in two areas are compared with each other and it is determined whether the halftone frequency in the pixel of interest in the R plane is equal to or greater than a predetermined threshold.

(O4) The processes of (O1) to (O3) are performed on the G plane and the B plane.

The halftone frequency information acquisition method in the halftone frequency information acquisition section 103 may employ other methods. Examples thereof include four methods of (P1) to (P4).

(P1) A method of performing the discrete Fourier transformation on the luminance value $Y(=0.3 \times R+0.59 \times G+0.11 \times B)$ of the pixel of interest in (O1) to acquire data (intensity spectrum data) indicating the intensities of the blocks in the frequency space, performing the same processes as (O2) and (O3), and determining whether the halftone frequency of the pixel of interest is equal to or greater than a predetermined threshold.

(P2) A method of calculating the average of the transition number of binary data using a predetermined threshold in a local block determined as a halftone area and determining the halftone frequency based on the average (which is described in Japanese Unexamined Patent Publication No. JP-A 2006-203703).

(P3) A method of detecting a halftone-area pixel by changing a threshold and determining whether the halftone frequency is high or low using the ratio of the number of halftone-area pixels (which is described in Japanese Unexamined Patent Publication No. JP-A 2004-328292).

(P4) A method of determining the halftone frequency based on the transition number of binary data (which is described in Japanese Unexamined Patent Publication No. JP-A 2006-197037).

Figure 21A:
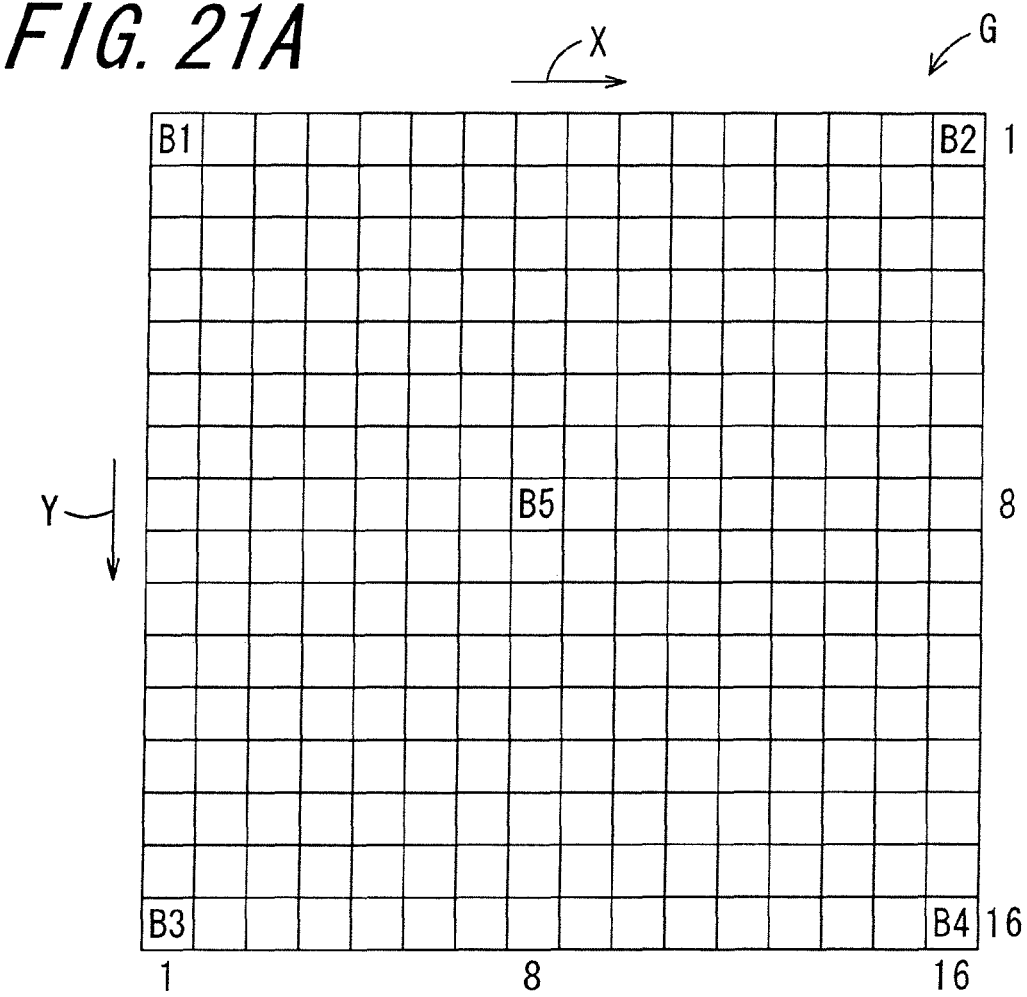
FIGS. 21A and 21B are diagrams illustrating a discrete Fourier transformation in a frequency space from a real space.
Figure 21B:
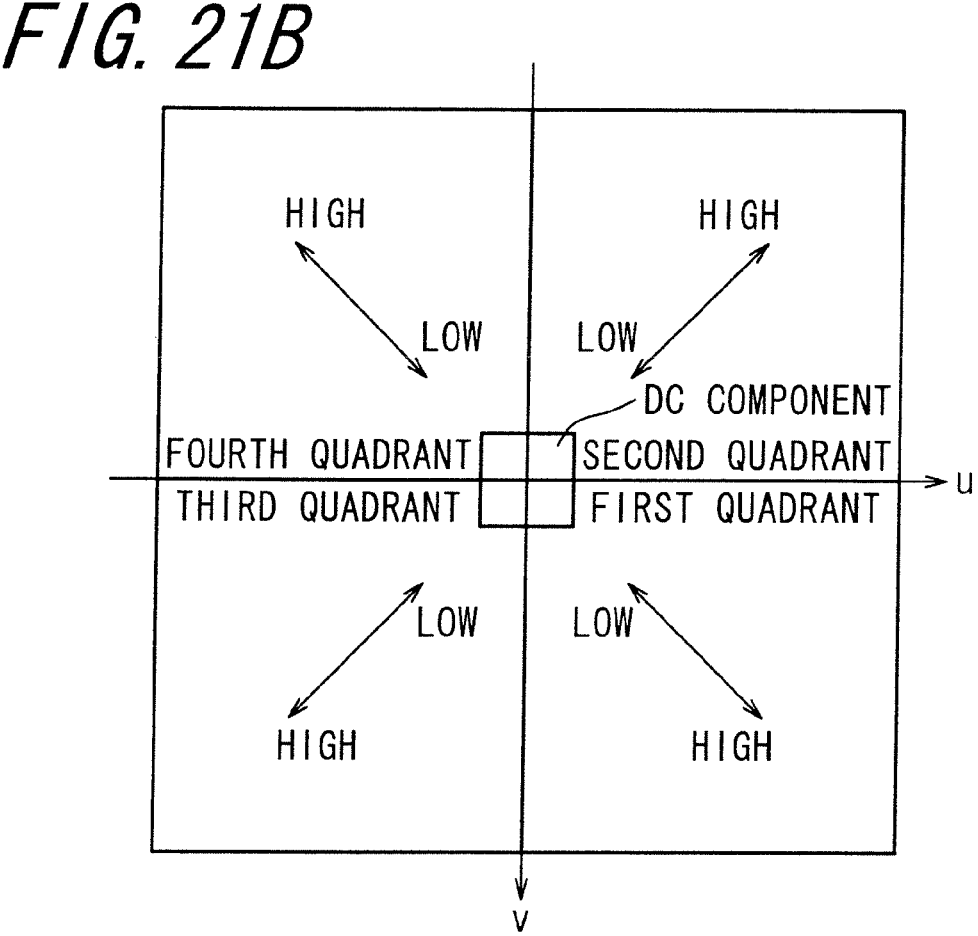

The processes of (O1) to (O4) in the halftone frequency information acquisition section 103 will be described in detail below. FIGS. 21A and 21B are diagrams illustrating the discrete Fourier transformation in the frequency space from the real space. In the above process (O1), the halftone frequency information acquisition section 103 assigns the coordinates (x, y) used in the Fourier transformation to the pixels in a predetermined range in the input image data by applying a pixel mask G thereto.

FIG. 21A shows the pixel mask G used in the Fourier transformation. The pixel mask G used in this embodiment includes plural pixels arranged in a rectangular shape and the number of pixels is 16×16 (=236). When the coordinate in the pixel mask is represented by (x, y), the pixel mask G is configured so that the coordinate of pixel B1 at the left-upper corner in FIG. 21A is (x, y)=(1, 1), the coordinate of pixel B2 at the right-upper corner is (x, y)=(16, 1), the coordinate of pixel B3 at the left-lower corner is (x, y)=(1, 16), the coordinate of pixel B4 at the right-lower corner is (x, y)=(16, 16), and the right direction X is a direction in which the x component increases, and the downward direction Y is a direction in which the y component increases. The pixel mask may include m×n pixels. However, in this embodiment, since the FFT (Fast Fourier Transform) is used as an algorithm used in the discrete Fourier transformation, m and n are set to k power of 2.

Pixel B5 (pixel located at (x, y)=(8, 8)) at the center of the pixel mask G is a pixel of interest. When the coordinate in the frequency space is (u, v), the R density value (the G density value when the G plane is subjected to the FFT, and the B density value when the B plane is subjected to the FFT) at the coordinate (x, y) is I(x, y), and the intensity thereof is |F(u, v)|, the FFT is performed using the following formula (9).

$$|F(u, v)| = \left| \sum_{x=1}^{16} \sum_{y=1}^{16} \exp\left\{2\pi j \left(\frac{x}{16}u + \frac{y}{16}v\right)\right\} \right| \quad (9)$$

(where $\pi$ represents the circular constant, and $j$ represents an imaginary number unit)

The halftone frequency information acquisition section 103 uses the intensity |F(u, v)| acquired by the formula (9) as the intensity corresponding to the position of the coordinate (u, v) in the frequency space to acquire intensity spectrum data. For example, in the frequency space, the intensity corresponding to the position at the coordinate (u, v)=(0, 0) (DC component) is |F(0, 0)|.

FIG. 21B shows the frequency space. In FIG. 21B, the frequency space is expressed by a coordinate system in which u increases in the right direction and v increases in the downward direction. The frequency in the direction in which the absolute values of u and v increase is a high frequency. In this coordinate system, the right-lower part is the first quadrant, the right-upper part is the second quadrant, the left-lower part is the third quadrant, and the left-upper part is the fourth quadrant. In this embodiment, data in the first quadrant will be described.

Figure 22A:
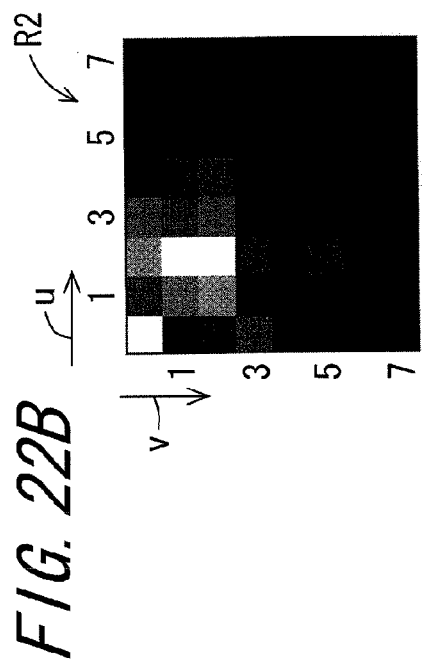
FIGS. 22A to 22D are diagrams illustrating an example of an FFT.

An example of the FFT in the halftone frequency information acquisition section 103 will be described. FIGS. 22A to 22D are diagrams illustrating an example of the FFT. FIG. 22A shows an original document image R1. The original document image R1 is a halftone image with 85 lines/inch.

Figure 22B:
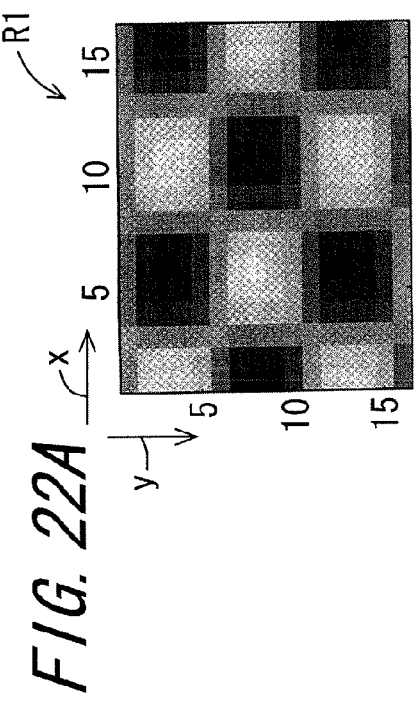
Figure 22C:
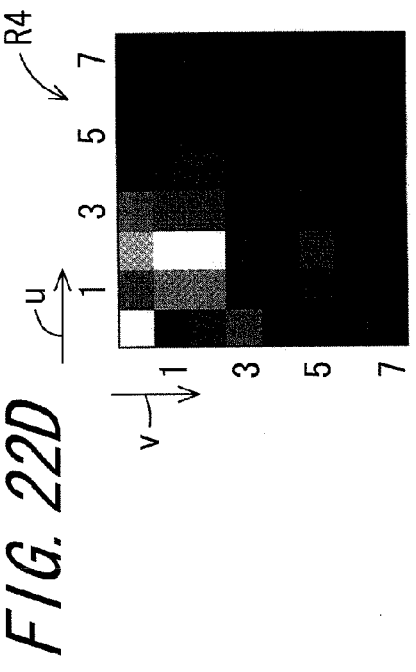
Figure 22D:
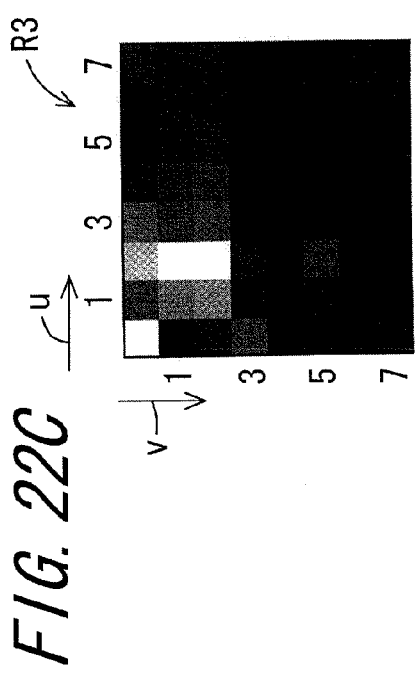

FIG. 22B shows intensity spectrum R2 in the first quadrant of the R plane. FIG. 22C shows intensity spectrum R3 in the first quadrant of the G plane. FIG. 22D shows intensity spectrum R4 in the first quadrant of the B plane.

In FIGS. 22B, 22C, and 22D, the position with high intensity |F(u, v)| (where the intensity |F(u, v)| is about 3,000) becomes bright (white) and the position with low intensity |F(u, v)| (where the intensity |F(u, v)| is about 0) becomes dark (black), whereby the intensity |F(u, v)| corresponding to the position of each coordinate in the first quadrant is expressed by brightness and darkness. As shown in FIGS. 22B, 22C, and 22D, intensity spectrums R2, R3, and R4 in the R plane, the G plane, and the B plane are very close to each other.

The halftone frequency information acquisition section 103 does not use the brightness and darkness information but the numerical value of the actual intensity |F(u, v)| in the planes. FIG. 23 is a diagram illustrating intensity spectrum R3a. In intensity spectrum R3a, intensity spectrum R3 in the first quadrant of the G plane is expressed by numerical values. The halftone frequency information acquisition section 103 determines whether the halftone frequency of the pixel of interest is equal to or greater than a predetermined threshold using the intensities |F(u, v)| at the positions in an 8×8 area like intensity spectrum R3a.

Figure 24:
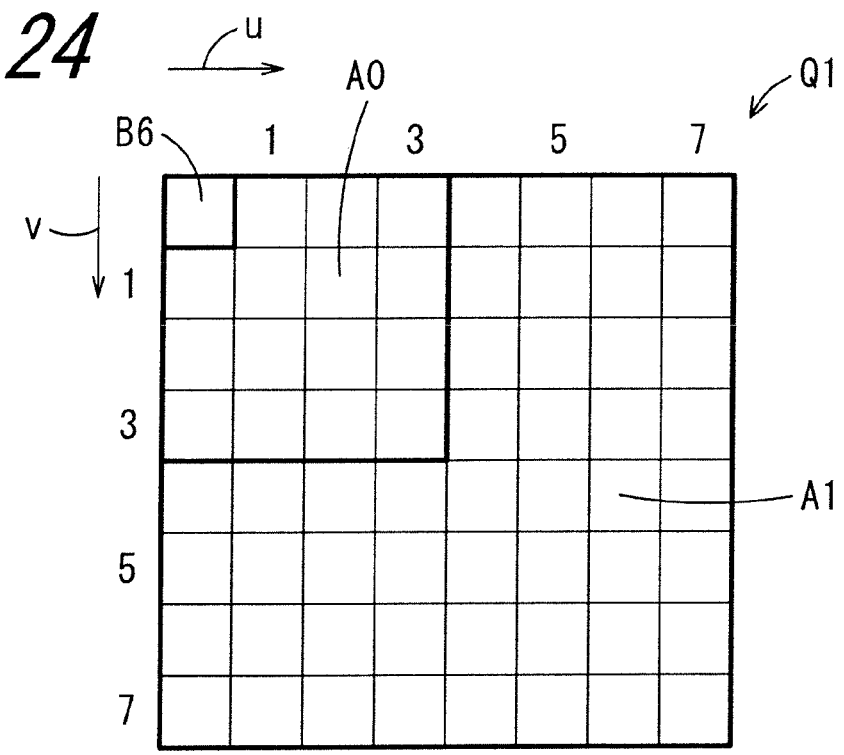
FIG. 24 is a diagram illustrating an area A0 and an area A1.

In the above process (O2), the halftone frequency information acquisition section 103 calculates the averages of the intensities |F(u, v)| in two areas A0 and A1 in the frequency space. FIG. 24 is a diagram illustrating an area A0 and an area A1. The area A0 is an area close to the side where the value of (u, v) decreases in the first quadrant Q1 and is an area obtained by excluding a DC component B6 from a 4×4 frequency area. The area A1 is an area obtained by excluding the DC component B6 and the area A0 from the first quadrant Q1.

The halftone frequency information acquisition section 103 calculates the average of the intensities |F(u, v)| in each of the area A0 and the area A1. For example, in intensity spectrum R3a, the average of the intensities |F(u, v)| in the area A0 is 1518.4 and the average of the intensities |F(u, v)| in the area A1 is 276.5625.

In the above processes (O3) and (O4), the halftone frequency information acquisition section 103 determines whether the halftone frequency of the pixel of interest is equal to or greater than the predetermined threshold for each plane by comparing the average of the intensities |F(u, v)| in the area A1 with the average of the intensities |F(u, v)| in the area A0. The halftone frequency information acquisition section 103 determines that the halftone frequency of the pixel of interest is low and less than the predetermined threshold when the average of the intensities |F(u, v)| in the area A0 is equal to or greater than the average of the intensities |F(u, v)| in the area A1, and determines that the halftone frequency of the pixel of interest is higher and equal to or greater than the predetermined threshold when the average of the intensities |F(u, v)| in the area A0 is less than the average of intensities |F(u, v)| in the area A1.

As in this embodiment, when the first quadrant Q1 is divided into the area A0 and the area A1 and the averages of the intensities |F(u, v)| in the areas are compared with each other, the predetermined threshold of the halftone frequency corresponds to, for example, 175 lines/inch. Therefore, in this embodiment, the halftone frequency information acquisition section 103 determines that the halftone frequency is low when the halftone frequency is less than 175 lines/inch, and determines that the halftone frequency is high when the halftone frequency is equal to or greater than 175 lines/inch. The image data in which the halftone frequency is less than 175 lines/inch is image data acquired by reading, for example, newspaper, a telephone book, a leaflet, and the like. The image data in which the halftone frequency is equal to or greater than 175 lines/inch is image data acquired by reading, for example, general print matters. In this embodiment, the threshold is set to 175 lines/inch, but the threshold of the halftone frequency may be set to another value. In this case, the range of the area A0 and the area A1 from which the average of the intensities |F(u, v)| is calculated can be changed. The invention is not limited to two kinds of a low frequency halftone and a high frequency halftone, but the halftone frequency may be classified into a low frequency halftone, a middle frequency halftone, and a high frequency halftone and the smoothing filters may be set to correspond to the halftone frequency.

In intensity spectrum R3a of the G plane, since the average of the intensities |F(u, v)| in the area A0 is 1518.4 and the average of the intensities |F(u, v)| in the area A1 is 276.5625, the average of the intensities |F(u, v)| in the area A0 is equal to or greater than the average of the intensities |F(u, v)| in the area A1. Therefore, the halftone frequency information acquisition section 103 determines that the halftone frequency in the G plane of the pixel of interest (the pixel located at the coordinate (x, y)=(8,8) in the original document image R1) in the input image data based on the original document image R1 is less than 175 lines/inch and it is a low frequency halftone.

Figure 25B:
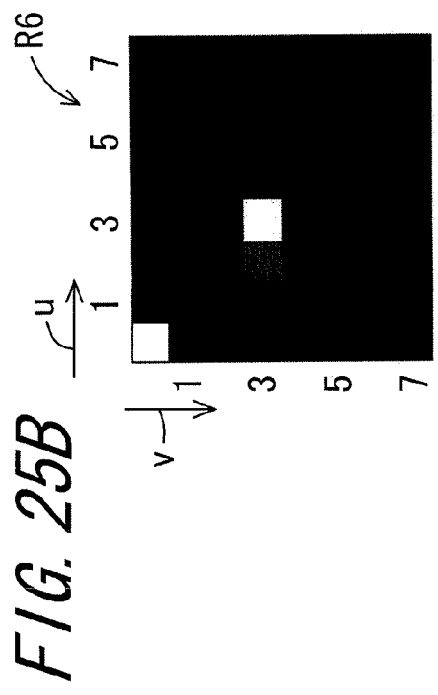
FIGS. 25A to 25D are diagrams illustrating the FFT on a halftone image with 150 lines/inch.
Figure 25D:
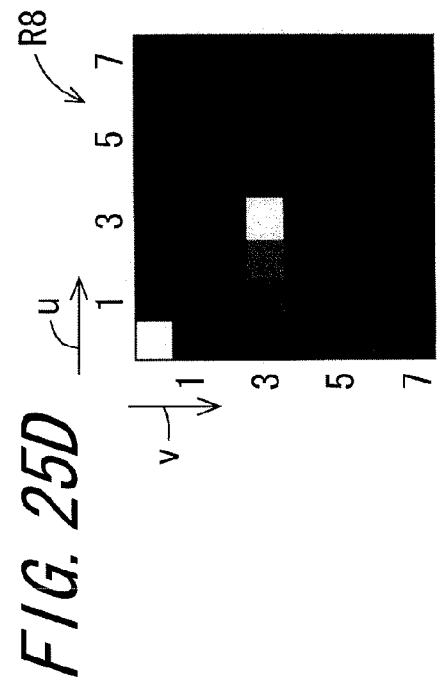
Figure 25A:
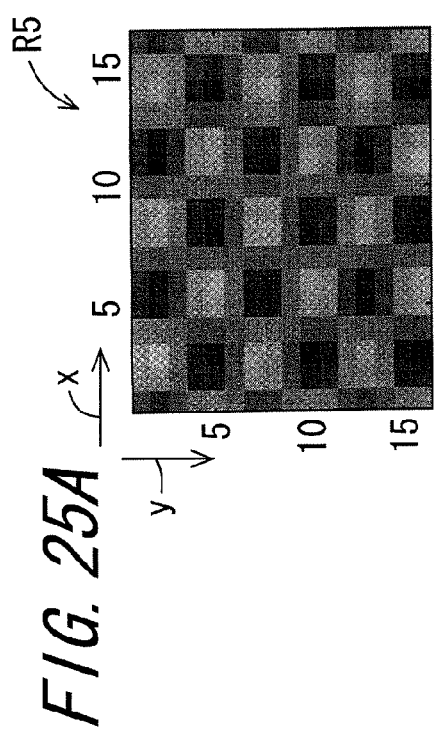
Figure 25C:
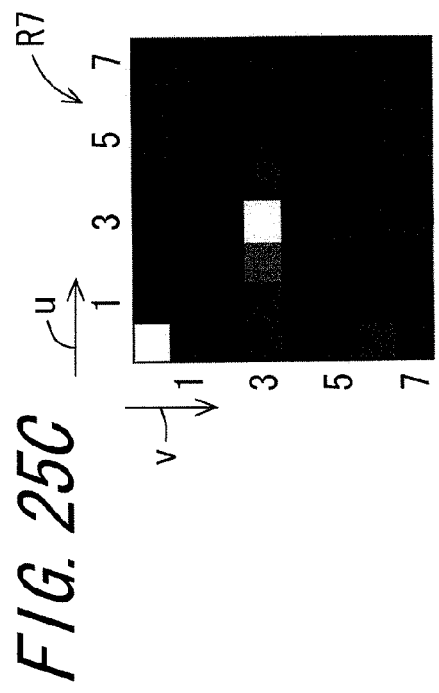

FIGS. 25A to 25D are diagrams illustrating the FFT on a halftone image with 150 lines/inch. FIG. 25A shows an original document image R5. FIG. 25B shows intensity spectrum R6 in the first quadrant of the R plane, FIG. 25C shows intensity spectrum R7 in the first quadrant of the G plane, and FIG. 25D shows intensity spectrum R8 in the first quadrant of the B plane. FIG. 26 is a diagram illustrating intensity spectrum R7a. In intensity spectrum R7a, intensity spectrum R7 in the first quadrant of the G plane is expressed by numerical values.

As described above, in intensity spectrum R7a of the G plane, the average of the intensities |F(u, v)| in the area A0 is 568.4667 and the average of the intensities |F(u, v)| in the area A1 is 154.4167. Therefore, in this case, the halftone frequency information acquisition section 103 determines that the halftone frequency of the pixel of interest is a low frequency halftone.

Figure 27B:
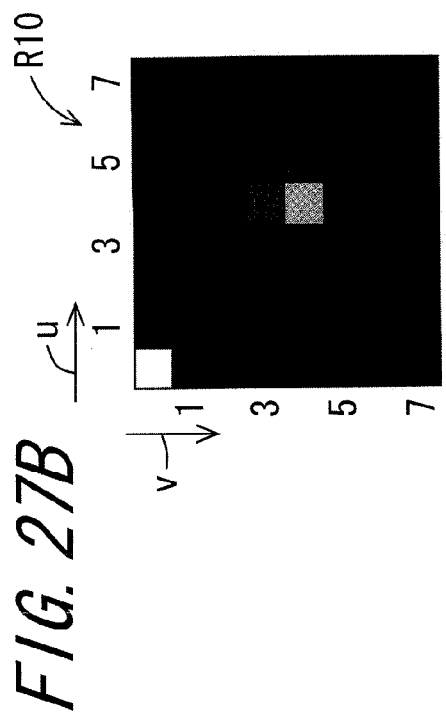
FIGS. 27A to 27D are diagrams illustrating the FFT on a halftone image with 200 lines/inch.
Figure 27D:
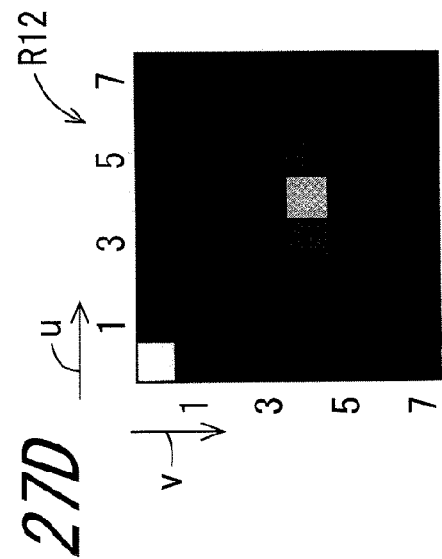
Figure 27A:
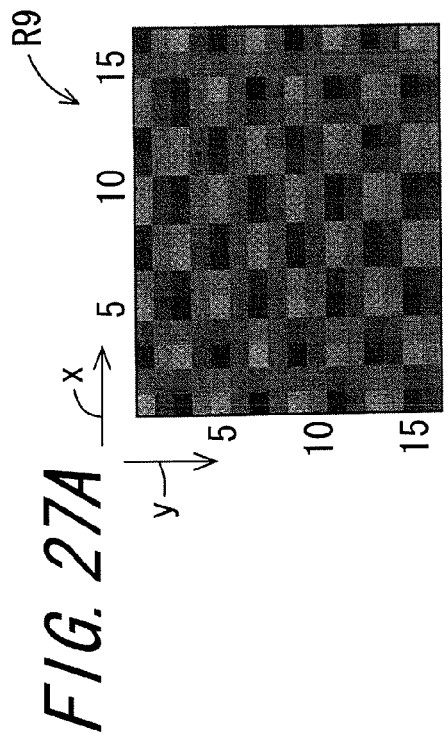
Figure 27C:
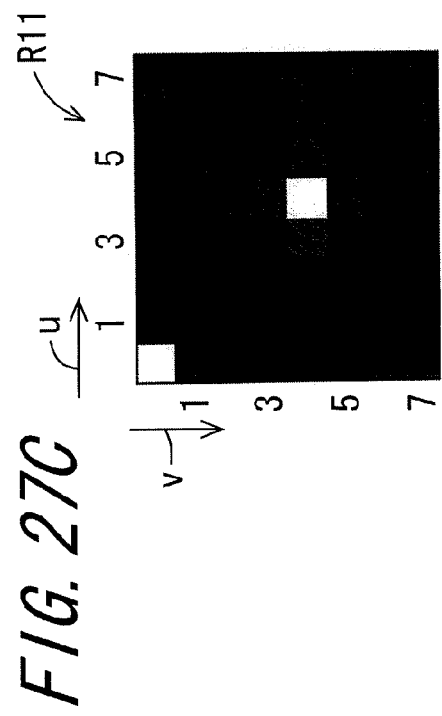

FIGS. 27A to 27D are diagrams illustrating the FFT on a halftone image with 200 lines/inch. FIG. 27A shows an original document image R9. FIG. 27B shows intensity spectrum R10 in the first quadrant of the R plane, FIG. 27C shows intensity spectrum R11 in the first quadrant of the G plane, and FIG. 27D shows intensity spectrum R12 in the first quadrant of the B plane. FIG. 28 is a diagram illustrating intensity spectrum R11a. In intensity spectrum R11a, intensity spectrum R11 in the first quadrant of the G plane is expressed by numerical values.

As described above, in intensity spectrum R11a of the G plane, the average of the intensities |F(u, v)| in the area A0 is 72.4 and the average of the intensities |F(u, v)| in the area A1 is 238.9583. Therefore, in this case, the halftone frequency information acquisition section 103 determines that the halftone frequency of the pixel of interest is a high frequency halftone.

The halftone frequency information acquisition section 103 determines whether the halftone frequency of all the halftone-area pixels are high or low, and outputs the information (halftone frequency signal) on whether the pixel of interest has a high frequency halftone or a low frequency halftone to the storage device 7.

The smoothing section 100A performs the smoothing process based on the segmentation class signal inputted through the segmentation class signal decompression section 16 from the segmentation process section 14 and the halftone frequency signal inputted through the storage device 7 from the halftone frequency information acquisition section 103.

The segmentation class signal selection section 101 selects all the pixels as the pixel of interest one by one. The result of the segmentation process outputted from the segmentation process section 14 is inputted to the segmentation class signal selection section 101 through the segmentation class signal decompression section 16. The segmentation class signal selection section 101 outputs the coordinate of the pixel of interest to the halftone frequency signal selection section 104 when the pixel of interest is a halftone-area pixel. When the pixel of interest is not a halftone-area pixel, the segmentation class signal selection section 101 sets the R, G, and B density values of the pixel of interest as the R, G, and B density values of the pixel having the same coordinate as the pixel of interest in the image data smoothed by the smoothing section 100A.

The halftone frequency signal acquired by the halftone frequency information acquisition section 103 is inputted to the halftone frequency signal selection section 104 through the storage device 7. When the pixel of interest of which the coordinate is inputted by the segmentation class signal selection section 101 has a high frequency halftone, the halftone frequency signal selection section 104 determines that the pixel of interest is the predetermined pixel on which the smoothing section 100A performs the smoothing process and outputs the coordinate of the pixel of interest to the high frequency halftone filter section 102A. When the pixel of interest of which the coordinate is inputted by the segmentation class signal selection section 101 does not have a high frequency halftone (that is, has a low frequency halftone), the halftone frequency signal selection section 104 determines that the pixel of interest is the predetermined pixel on which the smoothing section 100A performs the smoothing process and outputs the coordinate of the pixel of interest to the low frequency halftone filter section 102B.

The high frequency halftone filter section 102A stores a high frequency halftone smoothing filter such as the smoothing filter F1. The high frequency halftone smoothing filter means a smoothing filter having a low strength of smoothing and also means a smoothing filter that can effectively lower the intensity |F(u, v)| of the pixel of interest with a halftone frequency equal to or greater than a predetermined threshold (175 lines/inch in this embodiment) by performing the smoothing process using the smoothing filter. Based on the coordinate of the pixel of interest inputted from the halftone frequency signal selection section 104 and the input image data inputted to the smoothing section 100A, the high frequency halftone filter section 102A performs the smoothing process on the pixel of interest of which the coordinate is inputted, using the smoothing filter F1, similarly to the filter section 102. The high frequency halftone filter section 102A sets the R, G, and B density values acquired in the smoothing process as the R, G, and B density values of the pixel having the same coordinate as the pixel of interest in the image data having been subjected to the smoothing process.

The low frequency halftone filter section 102B stores a low frequency halftone smoothing filter such as the smoothing filter F2. The low frequency halftone smoothing filter means a smoothing filter having a high strength of smoothing and also means a smoothing filter that can effectively lower the intensity |F(u, v)| of the pixel of interest with a halftone frequency equal to or greater than a predetermined threshold (175 lines/inch in this embodiment) by performing the smoothing process using the smoothing filter. Based on the coordinate of the pixel of interest inputted from the halftone frequency signal selection section 104 and the input image data inputted to the smoothing section 100A, the low frequency halftone filter section 102B performs the smoothing process on the pixel of interest of which the coordinate is inputted, using the smoothing filter F2, similarly to the filter section 102. The low frequency halftone filter section 102B sets the R, G, and B density values acquired in the smoothing process as the R, G, and B density values of the pixel having the same coordinate as the pixel of interest in the image data having been subjected to the smoothing process.

Figure 29:
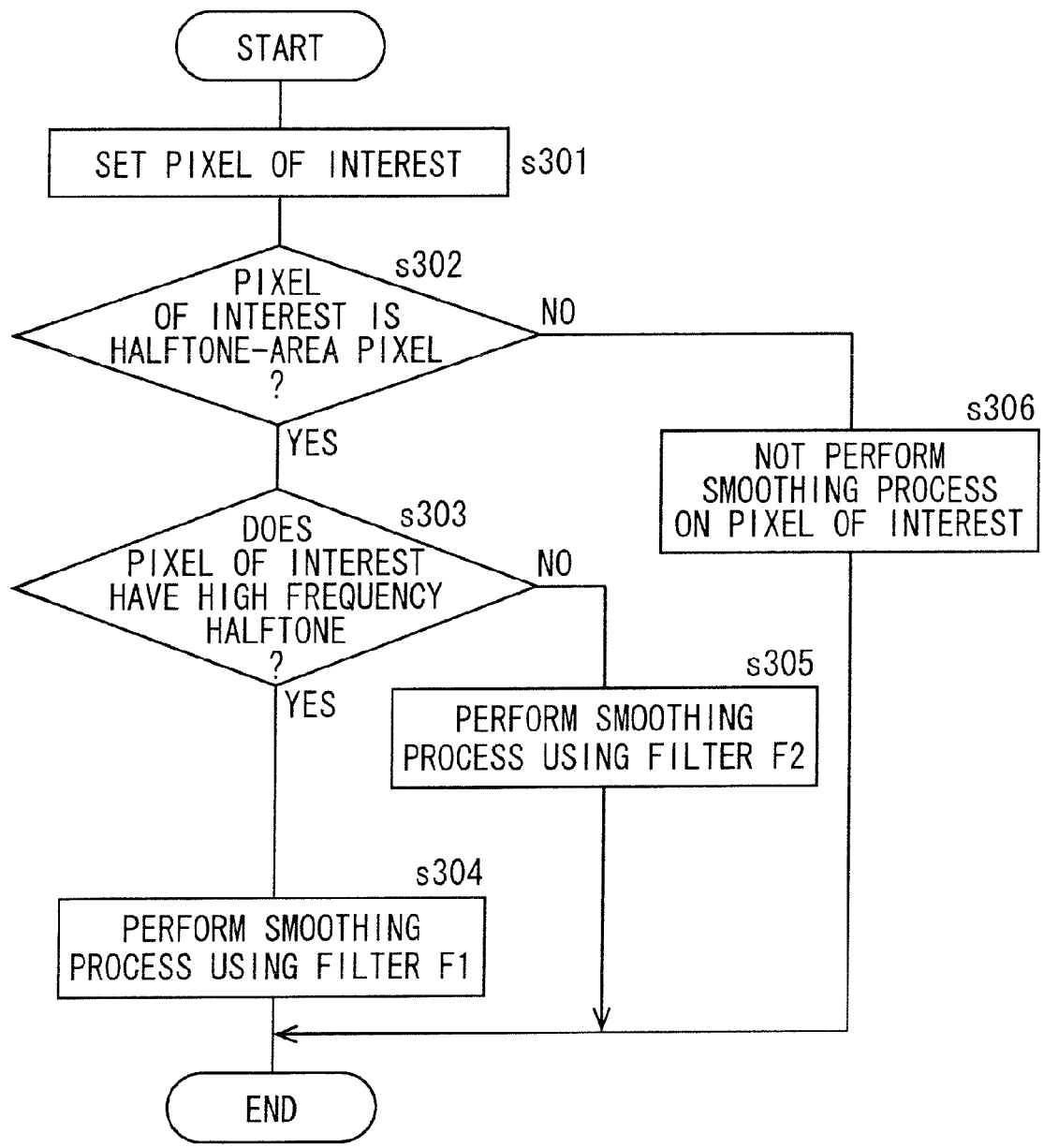
FIG. 29 is a flowchart illustrating a flow of processes performed on one pixel of interest by the smoothing section.

FIG. 29 is a flowchart illustrating processes performed on one pixel of interest by the smoothing section 100A. First, the segmentation class signal selection section 101 sets one pixel in the input image data as the pixel of interest (step s301). Then, the segmentation class signal selection section 101 determines whether the pixel of interest is a halftone-area pixel (step s302). When it is determined in step s302 that the pixel of interest is a halftone-area pixel, the segmentation class signal selection section 101 outputs the coordinate of the pixel of interest to the halftone frequency signal selection section 104.

The halftone frequency signal selection section 104 determines whether the pixel of interest of which the coordinate is inputted by the segmentation class signal selection section 101 has a high frequency halftone (step s303). When it is determined in step s303 that the pixel of interest has a high frequency halftone, the halftone frequency signal selection section 104 outputs the coordinate of the pixel of interest to the high frequency halftone filter section 102A. The high frequency halftone filter section 102A performs the smoothing process on the pixel of interest using the smoothing filter F1 based on the coordinate of the pixel of interest inputted from the halftone frequency signal selection section 104 and sets the R, G, and B density values acquired in the smoothing process as the R, G, and B density values of the pixel having the same coordinate as the pixel of interest in the image data having been subjected to the smoothing process (step s304).

When it is determined in step s303 that the pixel of interest does not have a high frequency halftone (that is, has a low frequency halftone), the halftone frequency signal selection section 104 outputs the coordinate of the pixel of interest to the low frequency halftone filter section 102B. The low frequency halftone filter section 102B performs the smoothing process on the pixel of interest using the smoothing filter F2 based on the coordinate of the pixel of interest inputted from the halftone frequency signal selection section 104 and sets the R, G, and B density values acquired in the smoothing process as the R, G, and B density values of the pixel having the same coordinate as the pixel of interest in the image data having been subjected to the smoothing process (step s305).

When it is determined step s302 that the pixel of interest is not a halftone-area pixel, the smoothing section 100A does not perform the smoothing process (step s306). More specifically, when it is determined in step s302 that the pixel of interest is not a halftone-area pixel, the segmentation class signal selection section 101 sets the R, G, and B density values of the pixel of interest as the R, G, and B density values of the pixel having the same coordinate as the pixel of interest in the image data smoothed by the smoothing section 100A.

The smoothing section 100A ends the processes on one pixel of interest when the process of step s304, s305, or s306 is finished.

The smoothing section 100A performs the processes performed on one pixel of interest on all the pixels in the input image data to smooth the halftone-area pixels in the input image data. Accordingly, the smoothing section 100A prepares image data in which the halftone-area pixels in the input image data are smoothed. The image data prepared by the smoothing section 100A is inputted to the two color process section 20.

In this way, in the image processing apparatus 41A, the smoothing section 100A selects the optimal smoothing filter based on the halftone frequency information acquired by the halftone frequency information acquisition section 103 and performs the smoothing process on the halftone area in the input image data. Therefore, when the input image data includes pixels constituting composite gray data, the image processing apparatus 41A can smooth the pixels constituting the composite gray data using the optimal smoothing filter every image data without a user's designating the strength of smoothing. Since the image processing apparatus 41A does not perform the smoothing process on all the pixels of the input image data but recognizes the halftone-area pixels and performs the smoothing process on the halftone-area pixels, it is possible to perform the smoothing process with high image quality without making the text area or the continuous tone image area blur.

Accordingly, it is possible to average the pixels constituting the composite gray data, similarly to the image processing apparatus 41. Therefore, it is possible to suppress the composite gray data from being converted into an image in which chromatic colors and achromatic colors coexist. As a result, it is possible to convert the image data containing the composite gray data into two-color printing image data for forming a gray image with higher image quality, without a user's designating the gray image area.

Similarly to the image processing apparatus 41, the image processing apparatus 41A may set a pixel in the range designated by a user as the predetermined pixel on which the smoothing section 100A performs the smoothing process. In this case, the image processing apparatus 41A sets the pixel in the range designated through the operation panel by the user as a pixel of interest and the halftone frequency information acquisition section 103 determines whether the halftone frequency of the pixel set as the pixel of interest is equal to or greater than a predetermined threshold. The smoothing section 100A performs the smoothing process based on the information (halftone frequency signal) on whether the pixel of interest inputted to the halftone frequency signal selection section 104 has a high frequency halftone or a low frequency halftone.

The smoothing section 100A performs the smoothing process on the pixel of interest which is a pixel in the range designated by the user and which has a high frequency halftone using the smoothing filter F1 stored in the high frequency halftone filter section 102A. The smoothing section 100A performs the smoothing process on the pixel of interest which is a pixel in the range designated by the user and which has a low frequency halftone using the smoothing filter F2 stored in the low frequency halftone filter section 102B. The smoothing section 100A does not perform the smoothing process on the pixel of interest which is not a pixel in the range designated by the user.

Similarly to the image processing apparatus 41, the image processing apparatus 41A may set all the pixels in the image data as the predetermined pixel on which the smoothing section 100A performs the smoothing process. In this case, the halftone frequency information acquisition section 103 of the image processing apparatus 41A determines whether the halftone frequency of the pixel as the pixel of interest is equal to or greater than a predetermined threshold, and the smoothing section 100A performs the smoothing process based on the information (halftone frequency signal), which is inputted to the halftone frequency signal selection section 104, on whether the pixel of interest has a high frequency halftone or a low frequency halftone.

The smoothing section 100A performs the smoothing process on the pixel of interest with a high frequency halftone using the smoothing filter F1 stored in the high frequency halftone filter section 102A. The smoothing section 100A performs the smoothing process on the pixel of interest with a low frequency halftone using the smoothing filter F2 stored in the low frequency halftone filter section 102B.

An image processing apparatus 41B included in an image forming apparatus 40B according to a fifth embodiment of the invention will be described below. FIG. 30 is a block diagram illustrating the configuration of the image forming apparatus 40B according to the fifth embodiment of the invention. The image forming apparatus 40B is similar to the image forming apparatus 40 mentioned above. Components corresponding to those of the image forming apparatus 40 are denoted by the same reference numerals and signs, and explanation thereof is omitted. The image forming apparatus 40B includes an image processing apparatus 41B instead of the image processing apparatus 41 included in the image forming apparatus 40.

Before performing the segmentation process and the document type discrimination process on image data of RGB inputted from the image input apparatus 2, the image processing apparatus 41B encodes and stores the image data of RGB in the storage device 7 and performs the document type discrimination process of the document type automatic discrimination section 13 or the segmentation process on the image data read and decoded from the storage device 7. The other configurations of the image processing apparatus 41B are the same as those of the image processing apparatus 41.

As still another embodiment of the invention, in order to cause a computer to function as the image processing apparatus 3, 31, 41, 41A, 41B, it is also possible to provide a program code to be executed by the computer (any one of an execution format program, an intermediate code program, and a source program) and a computer-readable recording medium having the program code recorded thereon. According to this embodiment, it is possible to portably provide a recording medium having recorded thereon a program code for performing the image processing method explained above.

Note that, as the recording medium, in order to perform processes by a microcomputer, a memory which is not shown, e.g., a ROM (Read Only Memory), itself may serve as a program medium, or alternatively, a program reading apparatus, although not shown, may be provided as an external storage apparatus and by inserting the recording medium thereinto, the apparatus may serve as a readable program medium.

In any case, a stored program code may be executed by a microprocessor accessing the program code, or in any case, a scheme may be employed in which a program code is read, the read program code is downloaded into a program storage area (not shown) of a microcomputer, and the program is executed. The program for download is stored in advance in a main body apparatus.

The above program medium is a recording medium configured to be separable from a main body, and may be a medium that fixedly carries a program code thereon, including a tape type, such as a magnetic tape or cassette tape, a disk type including a magnetic disk such as a floppy (registered trademark) disk or hard disk or an optical disk such as CD-ROM/MO (Magneto Optical disc)/MD (Mini disc)/DVD (Digital Versatile Disc), a card type, such as an IC (Integrated Circuit) card (including a memory card)/optical card, or a semiconductor memory such as a mask ROM, EPROM (Erasable Programmable Read Only Memory), EEPROM (Electrically Erasable Programmable Read Only Memory), or flash ROM.

Further, by having a system configuration capable of connecting a communication network including the Internet, the program medium may be a medium that carries thereon a program code such that a program code is downloaded from the communication network in a streaming manner. Note that when a program code is thus downloaded from the communication network, the program for download may be stored in advance in a main body apparatus or may be installed from another recording medium. Note also that the invention can also be implemented in the form of a computer data signal in which the above program code is embodied by electronic transmission and which is embedded in a carrier wave.

The recording medium is read by a program reading device included in a digital color image forming apparatus or a computer system, whereby the image processing method is executed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus comprising:
    a two color process section that converts input image data of RGB inputted by reading an original document into image data of CMY used to output a two-color image containing two colors which are a chromatic color and an achromatic color,
    the two color process section including:
    a luminance and chroma calculation section that calculates a luminance value and a chroma value based on the input image data of RGB;
    an image-data determination section that determines the input image data, the chroma value of which is equal to or greater than a predetermined threshold, as first input image data constituting the chromatic color in the two-color image and determines the input image data, the chroma value of which is less than the threshold, as second input image data constituting the achromatic color in the two-color image; and
    an output-color generation section that generates, with respect to the first input image data, the image data of CMY by adding the luminance value to the chroma value for each color component of CMY and generates, with respect to the second input image data, the image data of CMY composed of the luminance value for each color component of CMY.

2. The image processing apparatus of claim 1, wherein the two color process section further includes an extraction-color determination section that determines whether the input image data corresponds to an extraction color which is designated as a chromatic color to be outputted by a user and which is extracted from the original document based on pixel values of R, G, and B planes, and
    the image-data determination section determines the input image data, the chroma value of which is equal to or greater than the predetermined threshold and which is determined as corresponding to the extraction color by the extraction-color determination section, as the first input image data.

3. The image processing apparatus of claim 1, wherein the two color process section further includes a chroma adjustment process section that adjusts the chroma value to increase the chroma of the first input image data, and
    the output-color generation section generates, with respect to the first input image data, the image data of CMY by adding the luminance value to the chroma value adjusted by the chroma adjustment process section for each color component of CMY and generates, with respect to the second input image data, the image data of CMY composed of the luminance value for each color component of CMY.

4. The image processing apparatus of claim 1, further comprising a smoothing section that performs a smoothing process on a predetermined pixel in the image data of RGB before the conversion process in the two color process section.

5. The image processing apparatus of claim 4, further comprising a halftone determination section that determines whether a pixel in the image data of RGB is a halftone-area pixel before the conversion process in the two color process section, wherein the smoothing section sets the pixel determined as the halftone-area pixel by the halftone determination section as the predetermined pixel and performs the smoothing process on the predetermined pixel.

6. The image processing apparatus of claim 4, further comprising a halftone frequency information acquisition section that acquires information on a halftone frequency for the predetermined pixel, wherein the smoothing section changes a strength of smoothing to perform the smoothing process based on the information acquired by the halftone frequency information acquisition section.

7. The image processing apparatus of claim 4, wherein the smoothing section changes a strength of smoothing when an instruction signal instructing to change the strength of smoothing is inputted from an outside of the image processing apparatus.

8. An image forming apparatus comprising the image processing apparatus of claim 1.

9. An image processing method comprising:

a two color process step of converting input image data of RGB inputted by reading an original document into image data of CMY used to output a two-color image containing two colors which are a chromatic color and an achromatic color, the two color process step including:

a luminance and chroma calculation step of calculating a luminance value and a chroma value based on the input image data of RGB;

an image data determination step of determining the input image data, the chroma value of which is equal to or greater than a predetermined threshold, as first input image data constituting the chromatic color in the two-color image and determining the input image data, the chroma value of which is less than the threshold, as second input image data constituting the achromatic color in the two-color image; and an output-color generation step of generating, with respect to the first input image data, the image data of CMY by adding the luminance value to the chroma value for each color component of CMY and generating, with respect to the second input image data, the image data of CMY composed of the luminance value for each color component of CMY.

10. The image processing method of claim 9, further comprising a smoothing step of performing a smoothing process on a predetermined pixel in the image data of RGB before the conversion process in the two color process step, wherein in the two color process step, the smoothed input image data of RGB is converted into the image data of CMY for forming the two-color image containing two colors which are the chromatic color and the achromatic color.

11. A non-transitory computer-readable recording medium on which is recorded an image processing program for causing a computer to serve as the two color process section of the image forming apparatus of claim 1.

* * * * *